US010286792B2

(12) United States Patent
Shelton et al.

(10) Patent No.: US 10,286,792 B2
(45) Date of Patent: May 14, 2019

(54) METHODS AND APPARATUS FOR MANAGING RENEWABLE ENERGY SERVICES

(75) Inventors: John Christopher Shelton, Falls Church, VA (US); John Michael Zahurancik, Vienna, VA (US)

(73) Assignee: THE AES CORPORATION, Arlington, VA (US)

( * ) Notice: Subject to any disclaimer, the term of this patent is extended or adjusted under 35 U.S.C. 154(b) by 130 days.

(21) Appl. No.: 13/282,848

(22) Filed: Oct. 27, 2011

(65) Prior Publication Data

US 2012/0109401 A1 May 3, 2012

Related U.S. Application Data

(60) Provisional application No. 61/407,285, filed on Oct. 27, 2010, provisional application No. 61/407,293, (Continued)

(51) Int. Cl.
*G06F 19/00* (2018.01)
*B60L 11/18* (2006.01)
(Continued)

(52) U.S. Cl.
CPC ......... *B60L 11/1818* (2013.01); *B60L 3/0069* (2013.01); *B60L 3/04* (2013.01);
(Continued)

(58) Field of Classification Search
CPC .............. B60L 11/1842; B60L 11/1838; B60L 11/1824; B60L 11/1861; B60L 2230/40;
(Continued)

(56) References Cited

U.S. PATENT DOCUMENTS 5,111,128 A 5/1992 Branan, Jr. et al.
6,154,006 A 11/2000 Hatanaka et al.
(Continued)

FOREIGN PATENT DOCUMENTS

CN 1197256 A 10/1998
CN 1011356707 A 1/2009
(Continued)

OTHER PUBLICATIONS

IEEE NPL: Communications Requirements and Technology for Wind Farm Operation and Maintenance; First International Conference on Industrial and Information system, ICIIS 2006, Srilanka.*
(Continued)

*Primary Examiner* — Michael D Masinick
(74) *Attorney, Agent, or Firm* — Buchanan Ingersoll & Rooney PC

(57) ABSTRACT

Methods and apparatus for managing at least one renewable energy source for supply of power via an electric grid are disclosed. A method supplies power to mobile devices from the renewable energy source and balances power realized by the mobile devices with the supply of power from the renewable energy source by controlling the supply of power realized by the mobile devices. An apparatus includes a processor for monitoring power from the renewable energy source and sending signals to mobile devices connected to the electric grid to balance monitored power from the renewable energy source with power realized by the mobile devices. Another method identifies a fixed account associated with a grid connection point used by a plug-in electric vehicle for realizing power during a connection event; determines a quantity of energy realized during the event; and adjusts the account based on energy realized by the vehicle during the event.

21 Claims, 24 Drawing Sheets

Related U.S. Application Data filed on Oct. 27, 2010, provisional application No. 61/419,594, filed on Dec. 3, 2010, provisional application No. 61/421,782, filed on Dec. 10, 2010, provisional application No. 61/421,793, filed on Dec. 10, 2010, provisional application No. 61/424,534, filed on Dec. 10, 2010.

(51) Int. Cl.
| | | |
|---|---|---|
| *B60L 3/00* | (2019.01) | |
| *B60L 3/04* | (2006.01) | |
| *G06Q 30/04* | (2012.01) | |
| *G07F 15/00* | (2006.01) | |
| *G06Q 40/00* | (2012.01) | |
| *G06Q 10/06* | (2012.01) | |
| *G06Q 50/06* | (2012.01) | |
| *B60W 10/26* | (2006.01) | |
| *G06Q 20/40* | (2012.01) | |

(52) U.S. Cl.
CPC ....... *B60L 11/1825* (2013.01); *B60L 11/1838* (2013.01); *B60L 11/1842* (2013.01); *B60L 11/1844* (2013.01); *B60L 11/1846* (2013.01); *B60L 11/1848* (2013.01); *G06Q 10/06* (2013.01); *G06Q 30/04* (2013.01); *G06Q 40/12* (2013.12); *G07F 15/005* (2013.01); *G07F 15/008* (2013.01); *B60L 11/1824* (2013.01); *B60L 11/1861* (2013.01); *B60L 2230/12* (2013.01); *B60L 2230/16* (2013.01); *B60L 2230/22* (2013.01); *B60L 2230/28* (2013.01); *B60L 2230/30* (2013.01); *B60L 2230/40* (2013.01); *B60L 2240/545* (2013.01); *B60W 10/26* (2013.01); *G06Q 20/40* (2013.01); *G06Q 50/06* (2013.01); *Y02E 60/721* (2013.01); *Y02T 10/7005* (2013.01); *Y02T 10/7094* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01); *Y04S 50/00* (2013.01); *Y04S 50/12* (2013.01); *Y04S 50/16* (2018.05)

(58) Field of Classification Search
CPC ........ G07F 15/005; Y04S 50/16; Y04S 50/00; Y02T 90/128
USPC ....... 320/109, 106, 150, 107, 108, 125, 138, 320/128
See application file for complete search history.

(56) References Cited

U.S. PATENT DOCUMENTS

| | | | |
|---|---|---|---|
| 7,416,445 B1 | 8/2008 | Brown | |
| 7,618,291 B2 | 11/2009 | Standke | |
| 7,747,739 B2 | 6/2010 | Bridges et al. | |
| 8,080,898 B2 * | 12/2011 | Fukuhara | H02J 3/32 307/44 |
| 8,269,641 B2 | 9/2012 | Bauman et al. | |
| 8,359,126 B2 | 1/2013 | Tate, Jr. et al. | |
| 8,509,976 B2 | 8/2013 | Kempton | |
| 2002/0132144 A1 | 9/2002 | McArthur et al. | |
| 2005/0200457 A1 | 9/2005 | Bridgelall et al. | |
| 2007/0282495 A1 | 12/2007 | Kempton et al. | |
| 2008/0039979 A1 | 2/2008 | Bridges et al. | |
| 2008/0040479 A1 | 2/2008 | Bridge et al. | |
| 2008/0136371 A1 | 6/2008 | Sutardja | |
| 2008/0281663 A1 | 11/2008 | Hakim et al. | |
| 2008/0312782 A1 | 12/2008 | Berdichevsky et al. | |
| 2009/0030712 A1 | 1/2009 | Bogolea et al. | |
| 2009/0040029 A1 * | 2/2009 | Bridges et al. | 340/310.11 |
| 2009/0063680 A1 | 3/2009 | Bridges et al. | |
| 2009/0177580 A1 | 7/2009 | Lowenthal et al. | |
| 2009/0187495 A1 | 7/2009 | Bertness et al. | |
| 2009/0200988 A1 * | 8/2009 | Bridges et al. | 320/137 |
| 2009/0210357 A1 * | 8/2009 | Pudar | B60L 11/1816 705/412 |
| 2009/0267348 A1 | 10/2009 | Liebermann | |
| 2009/0326855 A1 | 12/2009 | Bartonek | |
| 2010/0017249 A1 * | 1/2010 | Fincham et al. | 705/8 |
| 2010/0076825 A1 | 3/2010 | Sato et al. | |
| 2010/0082464 A1 | 4/2010 | Keefe | |
| 2010/0109798 A1 | 5/2010 | Chu | |
| 2010/0114798 A1 | 5/2010 | Sirton | |
| 2010/0141203 A1 | 6/2010 | Graziano et al. | |
| 2010/0145540 A1 | 6/2010 | McKenna | |
| 2010/0145885 A1 * | 6/2010 | Graziano et al. | 705/412 |
| 2010/0185357 A1 * | 7/2010 | Mizumachi | 701/33 |
| 2010/0191585 A1 | 7/2010 | Smith | |
| 2010/0211643 A1 | 8/2010 | Lowenthal et al. | |
| 2010/0237985 A1 * | 9/2010 | Landau-Holdsworth et al. | 340/5.8 |
| 2010/0256846 A1 | 10/2010 | Shaffer | |
| 2011/0004358 A1 | 1/2011 | Pollack et al. | |
| 2011/0025267 A1 | 2/2011 | Kamen et al. | |
| 2011/0043355 A1 | 2/2011 | Chander et al. | |
| 2011/0130982 A1 * | 6/2011 | Haag | G01R 22/063 702/62 |
| 2011/0133693 A1 | 6/2011 | Lowenthal et al. | |
| 2011/0153131 A1 | 6/2011 | Kressner et al. | |
| 2011/0169447 A1 | 7/2011 | Brown et al. | |
| 2011/0175569 A1 | 7/2011 | Austin | |
| 2011/0196546 A1 | 8/2011 | Muller et al. | |
| 2011/0202418 A1 * | 8/2011 | Kempton et al. | 705/26.1 |
| 2011/0227755 A1 | 9/2011 | Hechtfischer et al. | |
| 2011/0254503 A1 | 10/2011 | Widmer et al. | |
| 2011/0258112 A1 | 10/2011 | Eder et al. | |
| 2011/0307109 A1 * | 12/2011 | Sri-Jayantha | G06Q 10/04 700/291 |
| 2012/0053871 A1 | 3/2012 | Sirard | |
| 2012/0075107 A1 | 3/2012 | Newman et al. | |
| 2012/0106672 A1 | 5/2012 | Shelton et al. | |
| 2012/0109402 A1 | 5/2012 | Shelton et al. | |
| 2012/0109403 A1 | 5/2012 | Shelton et al. | |
| 2012/0109797 A1 * | 5/2012 | Shelton et al. | 705/34 |
| 2012/0109798 A1 | 5/2012 | Shelton et al. | |
| 2013/0134774 A1 | 5/2013 | Kennedy | |
| 2013/0179061 A1 * | 7/2013 | Gadh et al. | 701/123 |
| 2013/0193918 A1 | 8/2013 | Sarkar et al. | |
| 2014/0114829 A1 * | 4/2014 | Forbes, Jr. | G05D 17/00 705/35 |
| 2015/0061578 A1 * | 3/2015 | Keeling | H02J 50/80 320/108 |

FOREIGN PATENT DOCUMENTS

| | | | |
|---|---|---|---|
| CN | 101436689 A | 5/2009 | |
| CN | 101668652 A | 3/2010 | |
| CN | 101828318 A | 9/2010 | |
| EP | 2426804 A1 * | 3/2012 | H02J 7/0027 |
| JP | 2009-70398 A | 4/2009 | |
| JP | 2009-80834 A | 4/2009 | |
| JP | 2009-176150 A | 8/2009 | |
| JP | 2010-158135 A | 7/2010 | |

OTHER PUBLICATIONS

Svoboda, Vojtech, et al. "Operating conditions of batteries in off-grid renewable energy systems." Solar Energy 81.11 (2007): 1409-1425. (Year: 2007).*

Papadopoulos, P., et al. "Distribution networks with electric vehicles." Universities Power Engineering Conference (UPEC), 2009 Proceedings of the 44th International. IEEE, 2009. (Year: 2009).*

An International Search Report and a Written opinion dated Jun. 29, 2012, issued in corresponding International application No. PCT/US2011/058081.

(56) References Cited

OTHER PUBLICATIONS

US. Office Action dated Aug. 1, 2013, issued in copending U.S. Appl. No. 13/283,006. (13 pages).
U.S. Office Action dated Aug. 12, 2013, issued in copending U.S. Appl. No. 13/282,958. (26 pages).
U.S. Office Action dated Aug. 14, 2013, issued in copending U.S. Appl. No. 13/282,900. (26 pages).
U.S. Office Action dated Apr. 30, 2013, issued in copending U.S. Appl. No. 13/282,900. (38 pages).
Saifur Rahman et al., Role of the Electric Vehicle as a Distributed Resource, IEEE 528-533 (2000).
M. El Chehaly et al., Advantages and Application of Vehicle to Grid Mode of Operation in Plug-In Hybrid Electric Vehicles, IEEE Electrical Power & Energy Conference (2009).
Scott B. Peterson et al., The economics of using plug-in hybrid electric vehicle batter packs for grid storage, 195 Journal of Power Sources 2377-2384 (2010).
GridPoint Electric Vehicle Management Solutions, Maintain Grid Reliability, http://www.gridpoint.com/smartchargingelectriccars.aspx. (Last accessed on Apr. 12, 2012)
Sharon Silke Carty, Battery leasing could help ease anxiety about hybrids, USA Today, http://www.usatoday.com/money/autos/2008-06-19-hybrid-battery-lease_N.htm. (Jun. 22, 2008).
U.S. Office Action issued in copending U.S. Appl. No. 13/282,958, dated Jan. 10, 2013.
Jun. 19, 2014 Office Action issued in U.S. Appl. No. 13/283,083.
Jul. 1, 2014 Office Action issued in U.S. Appl. No. 13/282,900.
U.S. Office Action dated Mar. 4, 2014, issued in copending U.S. Appl. No. 13/282,900. (24 pages).
U.S. Office Action dated Feb. 27, 2014, issued in copending U.S. Appl. No. 13/283,006. (11 pages).
Office Action issued by the U.S. Patent and Trademark Office in the U.S. Appl. No. 13/283,093, dated Nov. 25, 2014, U.S. Patent and Trademark Office, Alexandria, VA. (44 pages).
Office Action dated Jan. 16, 2015, by the Chinese Patent Office in corresponding Chinese Patent Application No. 201180062774.1, and an English Translation of the Office Action. (21 pages).
Office Action issued by the U.S. Patent and Trademark Office in the U.S. Appl. No. 13/283,083, dated Mar. 18, 2015, U.S. Patent and Trademark Office, Alexandria, VA. (27 pages).
Office Action issued by the U.S. Patent and Trademark Office in the U.S. Appl. No. 13/282,900, dated Mar. 25, 2015, U.S. Patent and Trademark Office, Alexandria, VA. (20 pages).
Jul. 13, 2015 Office Action issued in U.S. Appl. No. 13/282,900.
Office Action issued by the U.S. Patent and Trademark Office in the U.S. Appl. No. 13/283,093, dated May 11, 2015, U.S. Patent and Trademark Office, Alexandria, VA. (45 pages).
Office Action issued by the U.S. Patent and Trademark Office in the U.S. Appl. No. 13/283,093, dated Jan. 14, 2016, U.S. Patent and Trademark Office, Alexandria, VA. (53 pages).
Office Action issued on Nov. 5, 2015, by the State Intellectual Property Office of the People's Republic of China in the Chinese Patent Application No. 201180062774.1, and an English Translation of the Office Action. (20 pages).
Office Action dated May 5, 2016, by the State Intellectual Property Office, P.R. China in the Chinese Patent Application No. 201180062774.1, and an English Translation of the Office Action. (22 pages).
Extended European Search Report dated Feb. 19, 2018, by the European Patent Office in corresponding European Patent Application No. 17199153.2-1205. (9 pages).
First Office Action dated Aug. 29, 2017, by the State Intellectual Property Office of the People's Republic of China in corresponding Chinese Patent Application No. 201610038911.2 (18 pages).
Office Action issued by the U.S. Patent and Trademark Office in the U.S. Appl. No. 13/283,006 dated Sep. 7, 2017, U.S. Patent and Trademark Office, Alexandria, VA (57 pages).
Extended European Search Report dated Dec. 6, 2016, issued by the European Patent Office in European Application No. 11837084.0. (12 pages).

\* cited by examiner

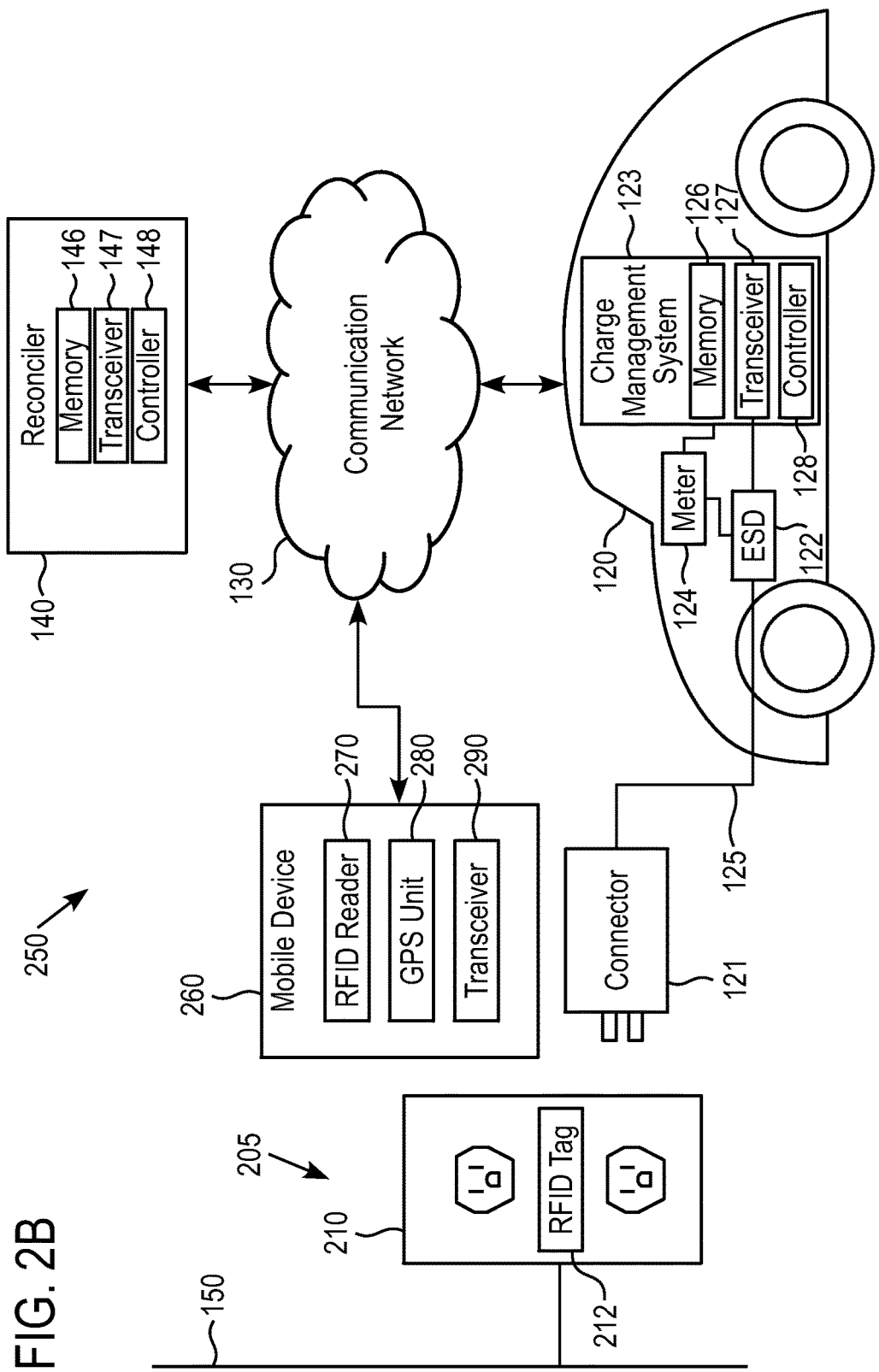

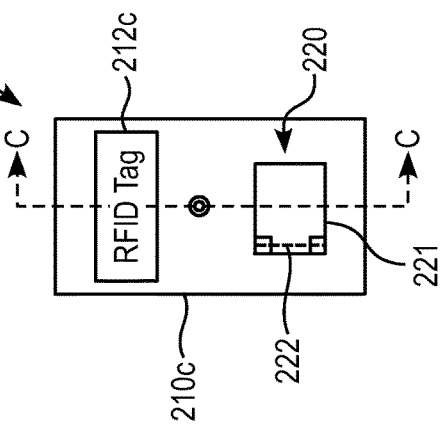
FIG. 4E
FIG. 4F
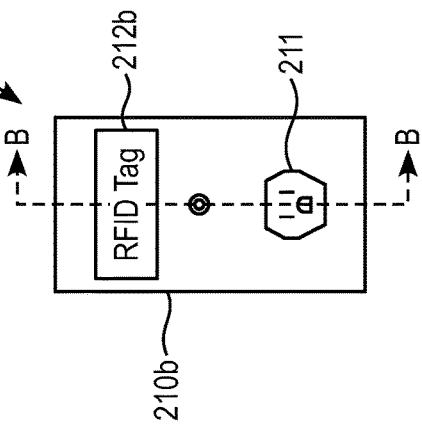
FIG. 4C
FIG. 4D
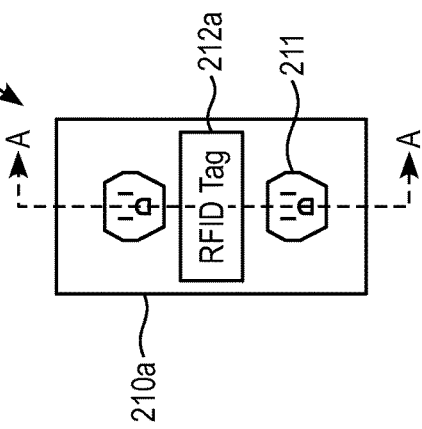
FIG. 4A
FIG. 4B

METHODS AND APPARATUS FOR MANAGING RENEWABLE ENERGY SERVICES

CROSS-REFERENCE TO RELATED APPLICATIONS

The present application claims the benefit of U.S. Provisional Appl. No. 61/407,285 entitled "Method and Apparatus for Reconciliation of a Charging Event," filed Oct. 27, 2010; U.S. Provisional Appl. No. 61/407,293, entitled "Methods and Apparatus for Identifying a Grid Connection Point Using a Tag," filed Oct. 27, 2010; U.S. Provisional Appl. No. 61/419,594, entitled "Methods and Apparatus for Managing Renewable Energy Services," filed Dec. 3, 2010; U.S. Provisional Appl. No. 61/421,782, entitled "Methods And Apparatus for Managing Energy Services From a Plurality of Devices," filed Dec. 10, 2010; U.S. Provisional Appl. No. 61/421,793, entitled "Methods and Apparatus for Managing Energy Services for Fixed and Mobile Assets," filed Dec. 10, 2010; and U.S. Provisional Appl. No. 61/424,534, entitled "Methods and Apparatus for Managing Energy Services for Fixed and Mobile Assets," filed Dec. 17, 2010; which are incorporated by reference herein in their entireties.

BACKGROUND OF THE DISCLOSURE

Field of the Disclosure

The field of the disclosure relates generally to energy services, and, more particularly, to renewable energy services for mobile devices.

Description of the Related Art

RFID tags and bar code tags are used in different applications to identify products for sale. In such applications, the barcode tags or the RFID tags are placed on sale products to identify the sale products, for example, to a point-of-sale system. Validation of the barcode tags or RFID tags occur from a reader (e.g., a barcode reader or an RFID reader) associated with the point-of-sale system to ensue proper identification of the sale product.

SUMMARY OF THE DISCLOSURE

The present disclosure is directed to exemplary methods, exemplary apparatus and exemplary systems that include an identification unit associated with an electrical outlet, and configured to present a unique identification for the electrical outlet.

The present disclosure is directed to exemplary methods, exemplary plug-in vehicles, exemplary charging stations and systems. One exemplary system includes a plug-in vehicle for connection to a charging station having a station connector. The plug-in vehicle includes an electric storage unit for storing electric power from (or via) the charging station, a plug-in vehicle connector configured to connect to the charging station for transfer of the electric power to or from the electric storage unit and an identification reader that is coupled to the plug-in vehicle connector for reading a unique identity presented by the charging station. The exemplary system also includes a charging station having an electrical power source for distributing electric power to the plug-in vehicle, a power source connector configured to connect to the plug-in vehicle connector for charging the plug-in vehicle and an identification tag configured to present a unique identification that is associated with the charging station to the plug-in vehicle.

The present disclosure is also directed to exemplary methods, apparatus and computer readable storage media. One exemplary method of identifying a grid connection point for bill processing of a charging event includes establishing an identity tag at the grid connection point that uniquely identifies the grid connection point, receiving, by a mobile charging device, identity tag information to uniquely identify the grid connection point, and monitoring, by the mobile charging device, charge event information indicating attributes of the charging event. The exemplary method further includes associating, by the mobile charging device, the charging event information with the identity tag information, as associated information and sending, by the mobile charging device, the associated information for reconciliation of billing accounts associated with the grid connection point and the mobile charging device.

The present disclosure is also directed to exemplary methods, apparatus and non-transitory computer readable medium. One exemplary method that manages at least one renewable energy source for supply of power via an electric grid includes: supplying power to mobile devices from the renewable energy source, via the electric grid; and balancing the power realized by the mobile devices with the supply of power from the renewable energy source by controlling the supply of power realized by the mobile devices. One other exemplary method includes: (1) identifying a fixed account that is associated with a grid connection point used by at least one plug-in electric vehicle for realizing power during a connection event; (2) determining, by the at least one plug-in electric vehicle, a quantity of the energy realized during the connection event; and (3) adjusting the identified fixed account based on the energy realized by the plug-in vehicle during the connection event. In yet another exemplary method, at least one plug-in electric vehicle is registered to a renewable energy account; and charged at grid connection points associated with respectively different fixed accounts (as a plurality of charging events) such that the energy consumed by the plug-in electric vehicle during the charging events is aggregated and the renewable energy account is billed, based on the aggregated energy consumed.

A further exemplary method for managing energy service for a mobile asset connected to a grid connection point during a connection event includes: determining, by the mobile asset, a quantity of the energy service realized during the connection event; identifying an account associated with the grid connection point; and adjusting the identified account based on the quantity determined by the mobile asset.

An additional exemplary method for managing energy service for an asset connected to a grid connection point of an electric grid includes: receiving, by an energy service controller, an indicator indicating at least one of: (1) an asset identifier that identifies the asset; or (2) an identifier that identifies the grid connection point connected to the asset; determining, by an energy service controller, a location of the asset on the electric grid based on the received indicator; determining, by the energy service controller, one or more operating conditions for realizing the energy service based on at least the determined location of the asset on the electric grid; and sending, by the energy service controller to the asset, the determined one or more operating conditions to realize the energy service. This method also includes identifying an account that is associated with the grid connection point based the indicator; and adjusting the identified account based on a quantity of energy services realized by the asset in accordance with the determined one or more operating conditions.

Another exemplary method for managing energy service for a plurality of assets of different types connected to grid connection points includes determining, by a respective asset of the plurality of assets, a quantity of the energy service realized by the respective asset during a connection event, responsive to the respective asset being of a first type, detecting a grid connection point identifier that identifies a grid connection point associated with the respective asset of the first type used for the connection event; and sending, by the respective asset, connection event information, wherein the connection event information includes at least one of: (1) the determined quantity of the energy service and an asset identifier, responsive to the respective asset not being of the first type; or (2) the determined quantity of the energy service and the detected grid connection point identifier, responsive to the respective asset being of the first type.

An exemplary billing apparatus for managing energy services realized by assets connected to grid connection points during connection events, includes an aggregation unit for: (1) receiving for each connection event an indicator indicating at least one of: (i) an asset identifier of an asset used during the connection event; or (ii) a grid connection point identifier of the grid connection point connected to the asset used during the connection event; (2) identifying, for each connection event, an account that is associated with the grid connection point based the indicator; and (3) aggregating the connection event information in accordance with the identified accounts; and a billing engine for adjusting the identified accounts based on the aggregated connection event information associated with the identified accounts.

A further exemplary method of managing energy service for a first type of asset connected to grid connection points includes: reporting, by a respective asset of the first type, an identifier associated with a grid connection point that establishes a location of the respective asset of the first type at the grid connection point on the electric grid; receiving, by the respective asset of the first type, one or more operating conditions for realizing the energy service, the received operating conditions being based on the established location of the respective asset of the first type on the electric grid; and operating the respective asset of the first type in accordance with the received one or more operating conditions to realize the energy service.

A further exemplary method of managing energy service for a mobile asset connected to a grid connection point of an electric grid includes: receiving, by an energy service controller, an identifier associated with the grid connection point connected to the mobile asset; and determining, by the energy service controller, a location of the mobile asset on the electric grid based on the received identifier. The method also includes: determining, by the energy service controller, one or more operating conditions for realizing the energy service in accordance with at least operating constraints associated with the determined location of the mobile asset on the electric grid; and sending, by the energy service controller to the mobile asset, the determined one or more operating conditions for realizing the energy service.

Another exemplary method of managing energy service for an asset connected to a grid connection point of an electric grid includes: receiving, by an energy service controller from the asset, an indicator; referencing, by the energy service controller, the indicator to determine a vicinity of the asset on the electric grid; and generating, by the energy service controller, a control signal including control information for realizing the energy service. The control signal information is based on operating constraint of the electric grid in a vicinity of the asset and operating constraint indicated by the received indicator. This exemplary method also includes sending, by the energy service controller to the asset, the control signal.

An additional exemplary method of managing energy service of a plurality of assets of different types connected to grid connection points includes: reporting, by a respective asset, connection information including an asset identifier, responsive to the respective asset being connected to a respective grid connection point; receiving, by the respective asset, one or more operating conditions for realizing the energy service. The received operating conditions are based on a predetermined location of the respective asset on the electric grid. The method also includes operating the respective asset in accordance with the received one or more operating conditions to realize the energy service.

A yet further exemplary method of managing an electric grid in which a plurality of mobile devices have an energy storage unit and are connected to respective grid connection points to realize energy services includes: reporting, by each respective mobile device, a connection of the respective mobile device to a grid connection point and constraints of the respective mobile device for realizing the energy services; receiving authorization, by the respective mobile device, for the energy services to be realized based on at least the reported constraints from the respective mobile device; and realizing, by the respective mobile device, the authorized energy services.

An exemplary mobile asset for realizing energy service includes: a communication module for reporting an identifier associated with the grid connection point that establishes a location of the mobile asset at the grid connection point on the electric grid, and for receiving one or more operating conditions for realizing the energy service, the received operating conditions being based on the established location of the mobile asset on the electric grid; and a processor for operating the mobile asset in accordance with the received one or more operating conditions to realize the energy service.

An exemplary energy service controller for managing energy service realized by a mobile asset connected to a grid connection point of an electric grid includes: a communication unit for receiving from the mobile asset an identifier associated with the grid connection point connected to the mobile asset; and a processor for determining a location of the mobile asset on the electric grid based on the identifier received by the communication unit, and for determining one or more operating conditions for realizing the energy service in accordance with at least operating constraints associated with the determined location of the mobile asset on the electric grid such that the communication unit sends to the mobile asset the determined one or more operating conditions for realizing the energy service.

Methods and exemplary adapters for realizing energy services by a device via a grid connection point are disclosed. One exemplary adapter includes a detection unit for measuring a quantity of energy services realized by the mobile device; an identification unit for detecting the identifier of the grid connection point electrically connected to the device; and a communication unit, coupled to the first and second detectors, to report connection event information including at least: (1) the quantity of the energy service realized by the device; (2) an identifier associated with the adapter; and (3) the identifier of the grid connection point.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWING FIGURES

The accompanying drawings, which are incorporated herein and form part of the specification, illustrate the present invention and, together with the description, further serve to explain the principles of the invention and to enable a person skilled in the relevant art(s) to make and use the invention. The exemplary embodiments are best understood from the following detailed description when read in conjunction with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 2B is a schematic diagram illustrating a system for identifying a GCP to a mobile device in accordance with a further exemplary embodiment;

FIG. 4A is a top view illustrating an electrical outlet in accordance with an exemplary embodiment;

FIG. 4B is a cross sectional view illustrating the electrical outlet of FIG. 4A taken along a line A-A;

FIG. 4C is a top view illustrating an electrical outlet in accordance with another exemplary embodiment;

FIG. 4D is a cross sectional view illustrating the electrical outlet of FIG. 4C taken along a line B-B;

FIG. 4E is a top view illustrating an electrical outlet in accordance with a further exemplary embodiment;

FIG. 4F is a cross sectional view illustrating the electrical outlet of FIG. 4E taken along a line C-C;

Figure 1:
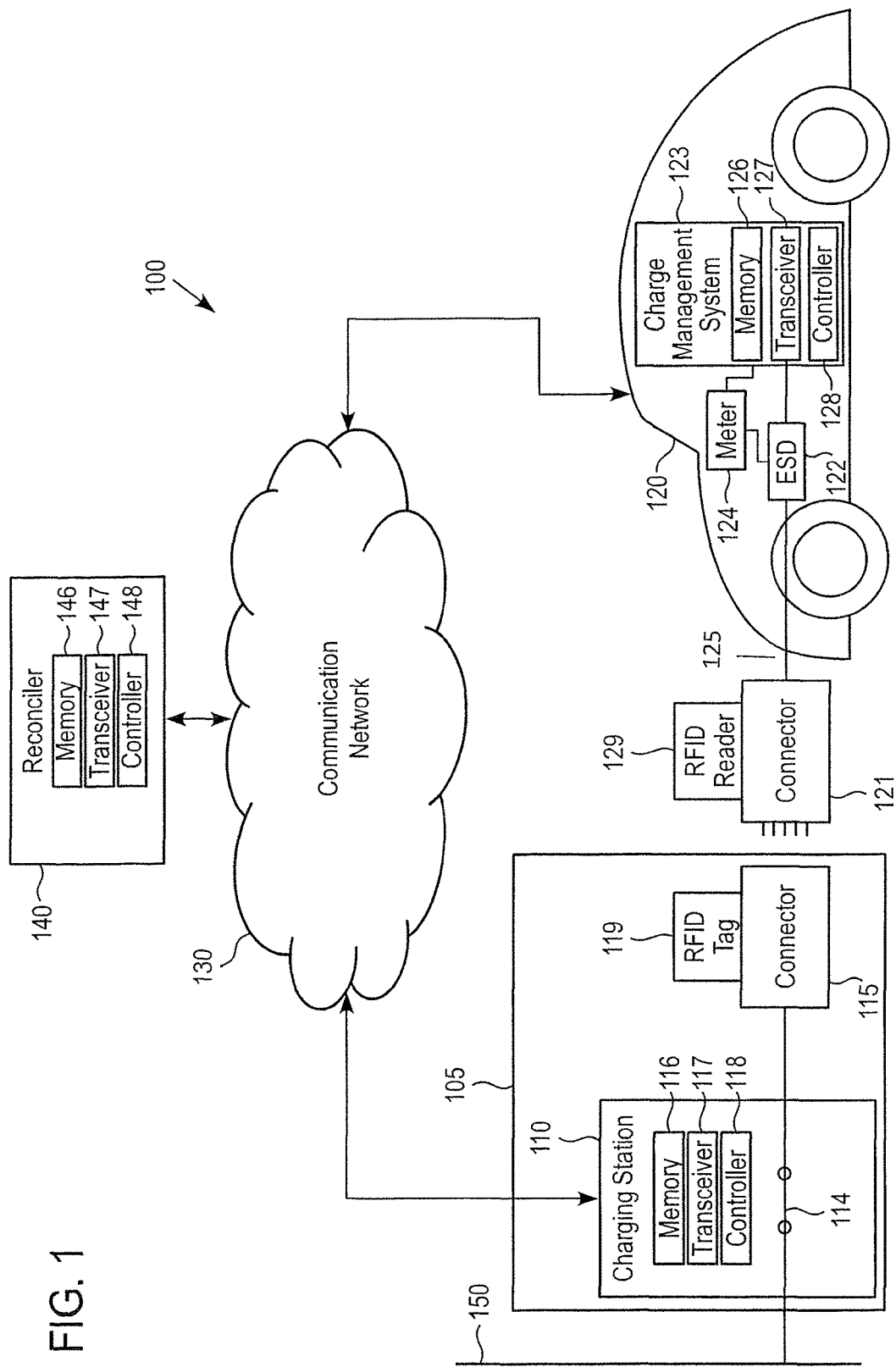
FIG. 1 is a schematic diagram illustrating a system for identifying a grid connection point (GCP) to a mobile device in accordance with an exemplary embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

Generally, validation of a sale occurs in a device (e.g., the point-of-sale system) operated by a merchant of the product for sale to ensure a proper sale of the product. For example, many retail stores use bar code systems to identify a product for sale to a point-of-sale system. The point-of-sale system may determine the sale price and may debit a credit account associated with the customer buying the product, thereby, validating the product's cost and the proper billing of the product.

In various exemplary embodiments, a grid connection point (or grid charging point) (GCP) may be identified to a mobile device such as a plug-in vehicle such that the plug-in vehicle manages the determination of the power stored and initiates bill reconciliation for a charging event for the mobile device. By identifying the GCP and charging event information, energy costs associated with charging the mobile device at many different GCPs may be aggregated to a billing account. Billing to the aggregated billing account may be at a fixed monthly rate or based on the actual energy consumed during charging. The account associated with each GCP may be adjusted (e.g., reduced) based on the energy consummated by the mobile device during specified events.

Although the mobile device is illustrated as charging from the GCP, one of skill in the art understands that the mobile device (e.g., plug-in vehicles (PEVs) including hybrid type vehicles) may supply power to the GCP and may be credited for the power and the billing of the customer account associated with the GCP may be adjusted (e.g., increased) based on the energy supplied by the mobile device during the specified event.

In certain exemplary embodiments, an electric utility may provide the reconciliation services to enable the reconciliation of energy costs associated with the specified events to the aggregated billing account and corresponding adjustment of energy costs for billing accounts associated with each of the GCPs used to charge or discharge the mobile device.

FIG. 1 is a schematic diagram illustrating a system 100 for identifying a GCP 105 to a mobile device (MD) 120 in accordance with an exemplary embodiment.

Referring to FIG. 1, system 100 may include the GCP 105, the MD 120 (e.g., PEV or other mobile electrical devices having an electric storage capability including, but not limited to, a battery driven power tool, a Personal Digital Assistant (PDA), a tablet computing device, an iPhone™, an iPod™, an iPad™, a device operating the Android operating system (OS) from Google Inc., a device running the Microsoft Windows® Mobile OS, a device running the Microsoft Windows® Phone OS, a device running the Symbian OS, a device running the webOS from Hewlett Packard, Inc., a mobile phone, a BlackBerry® device, a smartphone, a hand held computer, a netbook computer, a palmtop computer, a laptop computer, an ultra-mobile PC, a portable gaming system, or another similar type of mobile device having an electric storage capability), a communication network 130, a reconciler 140 and an electric grid 150. The GCP 105 may include a charging station 110, a grid connector 115 and an RFID tag 119. The reconciler 140 may include a memory 146, a transceiver 147 and a controller 148.

MD 120 may include a mobile connector 121, an Energy Storage Device (ESD) 122, a Charge Management System (CMS) 123, and a meter device 124.

In certain exemplary embodiments, functions of the CMS 123 may be performed by an existing controller of the MD 120. For example, in a PEV the functions of the CMS 123 may be performed by a vehicle management system (not shown).

The mobile connector 121 may be, for example, a J772 connector for PEVs or any other connector capable of charging the MD 120. The mobile connector 121 may electrically couple to the ESD 122 via a power cable. The CMS 123 may operatively couple (e.g., via wired or wireless communications) to the ESD 122 and the meter device 124. The CMS 123 may monitor operational indicators of the ESD 122 from the ESD 122 and the power consumption of the MD 120 from the meter device 124. For example, the CMS 123 may monitor operational indicators such as: (1) the state-of-charge (SOC) of the ESD 122; (2) the charging current of the ESD 122; (3) the voltage of the ESD 122; and/or (4) the temperature of the ESD 122, among others. The CMS 123 may determine and may control, based on the monitored indicators and/or power consumption, a charging profile to: (1) reduce charging time of the ESD 122; (2) ensure charging safety of the ESD 122; and (3) maintain the ESD's operational life (e.g., battery life).

Although the meter device 124 is illustrated as separate from the ESD 122, it is contemplated that the meter device 124 may be integrated with the ESD 122.

The CMS 123 may include a memory 126, a transceiver 127 and a controller 128. The memory 126 (e.g., a non-transitory medium) may store program code (or instructions) for execution by the controller 128 of control algorithms for controlling the MD 120 (e.g., PEV) and for processing information from a RFID reader 129. The information from the RFID reader 129 to the CMS 123 may be communicated using either wired or wireless communications.

Each of the transceivers 117, 127 and 147 may send communications (using any protocol including but not limited to TCP/IP and Bluetooth) to other transceivers 117, 127 and 147 and wireless devices (including the RFID reader 129, PDAs, notebooks, and laptops (see identification device 260 in FIG. 2B)) directly or via the communication network 130. Each of the transceivers 117, 127 and 147 may receive communications from other transceivers 117, 127 and 147 and wireless devices directly or via the communication network 130.

The RFID reader 129 may be coupled to the mobile connector 121, for example, via a sleeve or other fastener (not shown) at the mobile connector 121. By providing the RFID reader 129 at or adjacent to the mobile connector 121, the distance between the RFID reader 129 and the RFID tag 119 at the GCP 105 may be minimized and the RFID reader 129 and the RFID tag 119 of the GCP 105 may be in contact or within a range of 10 meters, in this example.

The RFID tag 119, which may be fixed in a predetermined position, may include an integrated directional antenna (not shown) to increase the operational range of the RFID tag 119 in a predetermined direction (e.g., a direction associated with the MD 120). For example, the operational range may be increased in the direction associated with a predetermined parking location for a PEV being charged.

Although the RFID reader 129 is illustrated as positioned on the mobile connector 121, it is contemplated that other positions are possible including at the MD 120 (e.g., on or in the MD or the PEV) or in a portable device in communication (e.g., wired or wireless communication) with the MD 120 or charging station 110.

The RFID tag 119 may be an active RFID tag powered via the grid connector 115 or a battery (not shown) or a passive RFID tag powered via transmissions from the RFID reader 129. The RFID tag 119 may be mounted on the grid connector 115 to be read by the RFID reader 129 when the RFID reader 129 is within the operating range of the RFID tag 119 and/or in response to the mobile connector 121 mating with the grid connector 115 (e.g., by triggering the RFID reader via a connection closed by the mating of the mobile connector 121 and the grid connector 115.

The meter device 124 may measure power (KWh) drawn by the MD 120. The memory 126 may store meter readings (e.g., measurements) associated with the initiation and/or end of each charging session to determine the power consumed (stored) during the charging session. For example, the CMS 123 may read the meter device 124 at the end of each charging session and may store the readings in the memory 126. Responsive to the end of a charging session, the CMS 123 may determine the power stored by the MD 120 and may send the determined power along with other charging event information including the RFID tag identification information, time and date, among others to the reconciler 140 via the transceiver 127 of the MD 120, the communication network 130 and the transceiver 147 of the reconciler 140.

The CMS 123 may send the determined power and charging event information to the reconciler 140 after each charging event or may send the determined power and charging event information to the reconciler 140 at predetermined times or in response to a triggering command from the reconciler 140.

Although antennas are not shown in FIG. 1 for brevity, each transceiver 117, 127 and 147 communicating wirelessly may be coupled to at least one antenna for such wireless communications.

Although the RFID tag 119 is shown, it is contemplated that any device which uniquely identifies the GCP 105 may be used including a bar code, or other tagging technology such as a unique audio or visual tag and an audio or image recognition system to uniquely identify the GCP 105.

Although RFID reader 129 is shown, it is contemplated that any device which reads the tag associated with the GCP 105 may be used. It is contemplated that several different tags may be incorporated into the system 100 to each uniquely identify the GCP 105. For example, the tag associated with the GCP 105 may include both a bar code tag and an RFID tag such that a reader associated with the MD 120 may read at least one of the bar code tag or the RFID tag.

The charging station 110 may include a memory 116, the transceiver 117 and a controller 118. The memory 116 may store program code for execution by the controller 118 of control algorithms to control, for example, communications via the transceiver 117 and the charging of MDs 120 via the switch 114. The transceiver 117 may send communications to devices on the communication network 130 (including the MD 120 and/or the reconciler 140 and may receive communications from these devices including the MD 120 and/or the reconciler 140. The switch 114, based on control signals from the controller 118, may selectively connect the utility grid 150 to the grid connector 115 to enable charging of the MD 120 or may selectively disconnect the utility grid 150 from the grid connector 115 to disable (or block) charging of the MD 120.

Although switch 114 is shown as a one pole switch, it is contemplated that other switching configurations are possible to selectively connect the utility grid 150 to particular circuits of the MD 120 or to selectively disconnect the utility grid 150 from the particular circuits of the MD 120. It is also contemplated that the power supplied from the utility grid may be multi-phase power (e.g., 2 phase power) and the switch may include multiple poles corresponding to multiple phases of the power and optionally ground.

Although the charging station 110 is shown to be grid-connected, it is contemplated that the charging station 110 may be connected to any power source for generating electrical power including: (1) alternating current (AC) sources such as AC generators; or (2) direct current (DC) sources such as batteries, fuel cells, and photovoltaics, among others. It is also contemplated that an inverter (not shown) may be used with AC sources to convert AC power to DC power prior to charging of the ESD 122 of the MD 120.

The reconciler 140 may register the unique identifier tag of the charging station 110 with a corresponding customer account (not shown). For example, a user may correspond the RFID tag 119 to the grid connector 115 and may register the RFID tag 119 to the GCP 105 via registration software, for example provided from a self service portal via a web browser application on the Internet.

The reconciler 140 may communicate with a plurality of charging stations 110 and MDs 120 to authorize charging sessions using the registered information. For example, after RFID tag information (e.g., a unique identifier of the GCP 105) is read by the MD 120, the RFID tag information and information identifying MD 120 may be sent to the reconciler 140 for authorization to charge (or discharge) the MD 120. The information may be sent to the reconciler 140 from the MD 120 in a communication session established between the MD 120 and the reconciler 140 via transceiver 127 of the CMS 123 and transceiver 147 of the reconciler 140 and the communication network 130.

Although the reconciler 140 is shown communicating with one MD 120 and one GCP 105, it is contemplated that the reconciler 140 may communicate with any number of MDs and GCPs. It is also contemplated that the reconciler 140 may perform reconciliation processes for billing accounts associated with the GCPs that correspond to particular RFID tags.

The MD 120 may receive an authorization code from the reconciler 140 to enable the charging session. The MD 120 may establish a communication session between the MD 120 and the charging station 110 (as a direct communication) via transceiver 127 of the CMS 123 and transceiver 117 of the charging station 110, or (as an indirect communication) using the communication network 130, transceiver 127 of the CMS 123 and transceiver 117 of the charging station 110. The MD 120 may communicate the authorization code to the charging station 110 such that the controller 118 of the charging station 110 may control the switch 114 to close to enable charging of the MD 120.

Although the MD 120 may provide the authorization code to the charging station 110, it is contemplated that any set of communications may be used such that the charging station 110 receives authorization directly or indirectly from the reconciler 140. Although an authorization code is illustrated, it is contemplated that other communication may be used for authorization of the MD to charge including, for example, a digital certificate from the reconciler 140.

The reconciler 140 may include in memory 146 account and billing information associated with the MDs 120 in system 100 to determine based on pre-established rules whether to authorize (e.g., automatically without user input) a charging session including whether an account associated with the MD 120 may be active and whether a prepayment or a credit may be associated with the active account.

Although the charging station 110 is illustrated as controlling the switch 114, it is contemplated that functions of the charging station 110 may be provided by the reconciler 140 via the communication network 130. For example, the reconciler 140 may control the switch 114 directly via a control signal from the reconciler 140 via the communication network 130.

Figure 2A:
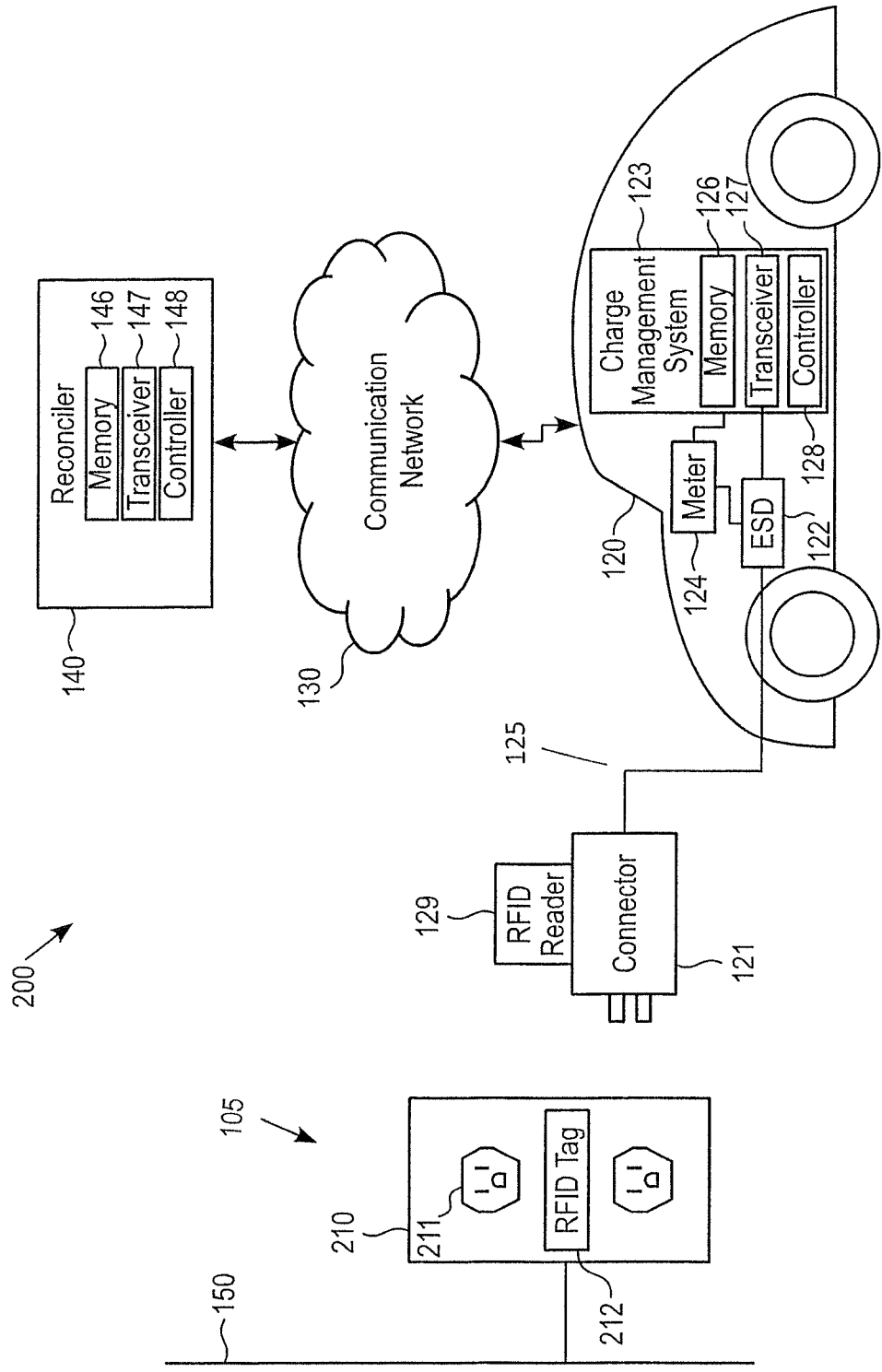
FIG. 2A is a schematic diagram illustrating a system for identifying a GCP to a mobile device in accordance with another exemplary embodiment.

FIG. 2A is a schematic diagram illustrating a system 200 for identifying a GCP 105 to the MD 120 in accordance with another exemplary embodiment.

Referring to FIG. 2A, the system 200 may include the GCP 105 (e.g., an electrical outlet), the MD 120, the communication network 130 and the reconciler 140. The operation of system 200 is similar to the operation of system 100 except that the GCP 105 (e.g., electrical outlet) may not include the charging station 110. The electrical outlet 105 is electrically connected to an electrical supply 150, for example, the electric utility grid. The electrical outlet 105 may include an electrical outlet cover 210, an electrical receptacle 216 and an RFID tag 212.

In certain exemplary embodiments, the RFID reader 129 may be triggered to communicate with the RFID tags 212 within operational range based on one of the triggering conditions: (1) subsequent to electrical connection of the mobile connector 121 with the electrical receptacle 211 (e.g., based on or responsive to the mobile connector 121 electrically connecting to the electrical outlet 105); (2) responsive to release of a power cable 125 from a power cable storage unit (not shown); (3) responsive to attachment of the power cable 125 to the MD 120; (4) responsive to placing the MD 120 in a charging mode; (5) responsive to the MD 120 (e.g., a mobile vehicle) being placed in a parked mode (e.g., in which the transmission is placed in park) and/or (6) responsive to the MD being turned off (e.g., the ignition switch to mobile vehicle 120 being turned off). For example, the controller 128 of the MD 120 may control (e.g., trigger) the RFID reader 129 to read the RFID tag 212 (e.g., the unique identification information of RFID tag 212) associated with electrical outlet 205 in response to one of the triggering conditions.

The controller 128 of the MD 120 may communicate via the transceivers 127 and 147 and the communication network 130 to the controller 148 of the reconciler 140 and may send the RFID tag information and charging event information to the reconciler 140 after a charging session ends. The reconciler 140 may adjust the billing account associated with the electrical outlet 105 based on the charging event information from the MD 120 and may aggregate each charging event associated with the MD 120 to one aggregated billing account for the MD 120. For example, the RFID tag 212 may act as an identifier of the GCP 105 to enable the reconciler 140 to adjust the billing account associated with the GCP 105. A relationship table may be provided in the memory 146 of the reconciler 140. The relationship table may correspond the GCP identifiers to customer billing accounts.

The reconciler 140 may allow registration of the unique identifier tag of the electrical outlet 205 with a corresponding customer account.

It is contemplated that the billing account associated with the MD 120 may be billed at a fixed fee (e.g., a monthly, semi-annual, annual or periodic fee) and that the adjustment of the billing account associated with the GCP 105 may be based on differential meter readings from the meter device 124 of the MD 120 (which corresponds to the energy supplied by the GCP 105 (electrical outlet) during charging of the ESD 122.

FIG. 2B is a schematic diagram illustrating a system 250 for identifying the GCP 105 to the MD 120 in accordance with a further exemplary embodiment.

Referring to FIG. 2B, the system 250 includes the GCP 105, the MD 120, the communication network 130, and the reconciler 140. The functions of system 250 are similar to those of system 200 except that the mobile connector 121 may not include an RFID reader 129 and an identification device 260 (e.g., separate from the MD 120) may be used for identification of an identification tag 212 (e.g., an RFID tag). The identification device 260 may be mobile and may include an RFID reader 270, a global positioning system (GPS) unit 280 and a transceiver 290. The identification device 260 may be a personal digital assistant (PDA), a notebook computer, a laptop computer or other processing device. The identification device 260 may be triggered via the controller 128 of the MD 120 to read the RFID tag 212 using the RFID reader 260. For example, the transceiver 290 may communicate via the communication network 130 and the transceiver 127 of the MD 120 to automatically read (without user intervention) the RFID tag 212.

In certain exemplary embodiments, the identification device 260 may alert the user of the identification device 260 from the controller 128 of the MD 120 to move within an operational range of the RFID tag 212 and/or to trigger a reading of the RFID tag 212. The GPS unit 280 may be used with the RFID reader 270 to locate the MD 120 during reading of the RFID tag 212. The RFID tag information associated with the GCP (electrical outlet) 105 and the location information from the GPS unit 280 may be sent via the transceiver 290, the communication network 130 and the transceiver 127 of the MD 120 to the controller 128 of the MD 120. The RFID tag information and location information may be stored in the memory 126 of the MD 120. After a charging session, other charging event information (e.g., the power consumed, the peak power consumed, the initial charging time, the charging end time, and/or the date, among others) may be associated with the RFID tag information and location information of the electrical outlet 105. The charging event information may be sent to the reconciler 140 via the transceiver 127 of the MD 120, the communication network 130 and the transceiver 147 of the reconciler 140 to enable the reconciliation of the customer billing account associated with the electrical outlet 105 and the customer billing account associated with the MD 120.

Although the RFID tag 212 associated with the electrical outlet 205 and the RFID reader 270 associated with the identification device 260 are shown, it is contemplated that other identification tags and other readers may be used. For example, a bar code tag may be used at electrical outlet 205 and a bar code reader may be incorporated in identification device 260 to uniquely identify electrical outlet 205 to the identification device 260 and the MD 120. It is also contemplated that the identification device 260 may include an imager (not shown), as the bar code reader, to image the bar code associated with the electrical outlet 205. In such a system, the identification device 260 or the MD 120 may include recognition software to recognize the bar code imaged by the imager of identification device 260 to uniquely identify the bar code associated with the electrical outlet 205.

In certain exemplary embodiments, the RFID reader 129 or 270 may broadcast a transmission to acquire the unique identifiers of the charging stations 110 or the electrical outlets 205. Each respective charging station 110 or electrical outlet 205 receiving the broadcast transmission may send a return transmission indicating a unique identifier of the respective charging station 110 and/or the respective electrical outlet 205. The RFID reader 129 or 270 may include a signal level measurement unit (not shown) that may measure return signal strength of each return transmission from a respective charging station 110 and/or the respective electrical outlet 205 and a closest determination unit (no shown) that may determine a closest charging station 110 or electrical outlet 205 based on the measured returned signal strength of each return transmission.

In certain exemplary embodiments, the RFID reader 129 or 270 may include the GPS unit 280 for determining a global position of the RFID reader 129 or 270 such that the global position of the RFID reader 129 or 320 is matched to a closest global position associated with one of the respective charging stations 110 or the respective electrical outlets 205 to determine a closest charging station 110 or a closest electrical outlet 205.

Figure 3:
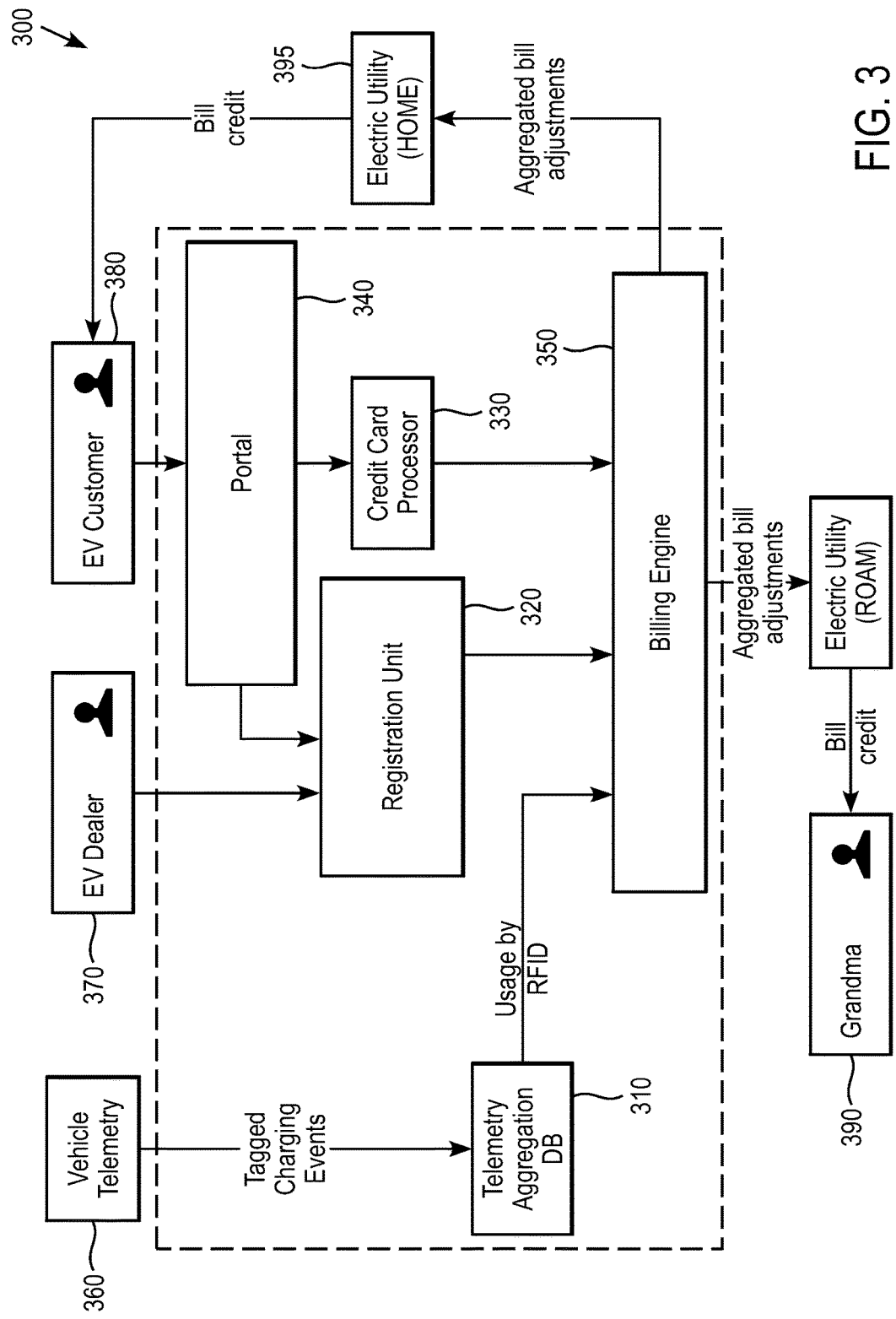
FIG. 3 is a block diagram illustrating a system for managing billing adjustments in accordance with exemplary embodiment.

FIG. 3 is a block diagram illustrating a system 300 for managing billing adjustments in accordance with an exemplary embodiment.

Referring to FIG. 3, system 300 may include a telemetry aggregation database 310 (e.g., a vehicle telemetry aggregation database), a registration unit 320, a credit card processor 330, a portal 340 (e.g., a self-service portal) and a billing engine 350. Vehicle telemetry 360 (or the CMS 123) may provide tagged charging events (e.g., the charging event information including the unique identifier of the electric vehicle 120 tagged with the unique identifier from the RFID tag 119 or 212 associated with the GCP 105) to the telemetry aggregation database 310. The telemetry aggregation database 310 may aggregate the tagged charging events for each electric vehicle 120 (e.g., the MD) and may send to the billing engine 350 the tagged charging events based on (e.g., or parsed by) the unique identifier associated with the GCP 105.

An electric vehicle dealer 370 or the vehicle factory may install vehicle telemetry 360 and on-board RFID readers 129 (or barcode readers) in new electric vehicles and service providers may retrofit the vehicle telemetry 360 and the on-board RFID 129 (or barcode readers) to existing electric vehicles. The electric vehicle dealer 370 (or another responsible entity) may report (or register) the installation of the vehicle telemetry 360 and the on-board RFID readers 129 of a particular electric vehicle 120 to the registration unit 320 based on a unique identifier associated with the particular electric vehicle. For example, each electric vehicle 120 may have an associated unique identifier which may be registered by the electric vehicle dealer 370 to initially register a new billing account associated with the electric vehicle 120.

An electric vehicle customer (or user) 380 may register for a charging service from, for example an electric utility, which may aggregate the billing for charging or discharging of the electric vehicle 120 to a separate, aggregated billing account associated with the electric vehicle 120. The electric vehicle customer 380 may receive or may purchase one or more of: (1) tags (e.g., identification tags such as RFID tags and/or barcode tags) to retrofit to existing electrical outlet covers (via adhesive or other fasteners, among others); (2) electrical outlet covers that include such identification tags and may be retrofit to existing electrical outlets; and/or (3) electrical outlets that include such tags for installation. The electric vehicle customer 380 may install or retrofit the tags, electrical outlet covers and/or the electrical outlets at charging locations where charging may occur and may register each identification tag to the customer billing account to be associated with the identification tag.

For example, a user may register the RFID tag 212 to the electric utility meter associated with the GCP 105 or a utility billing account number via registration software to uniquely match the RFID tag 212 to the billing account of a customer (e.g., to associate the RFID tag 212 with the utility meter serving the GCP 105). The registration may include logging into the portal 340 to provide registration information indicating the correspondence of the RFID tag to the electric meter or billing account number via a web browser application over, for example, the communication network 130 or the Internet.

The registration information entered by the electric vehicle dealer 370 to setup the tag reader identifier of the electric vehicle 120 in the registration unit 320 may be matched to the unique identifier on the tag reader to verify and to authorize a particular electric vehicle customer 380 in the registration unit 320. After the particular electric vehicle customer 380 is verified and authorized, the particular electric vehicle customer may register each tag identifier associated with a customer billing account in the registration unit 320.

The electric vehicle customer 380 may associate a credit card account to the billing account associated with the electric vehicle 120. The electric vehicle customer 380 may establish the association using the credit card processor 330 via the portal 340. For example, a web browser may be provided with software to enable the association of the credit card account with the billing account to facilitate payment for or credit to a credit account in accordance with an agreement for charging services (e.g., charging or discharging of the electrical vehicle 120).

The billing engine 350 may receive the aggregated usage of each electric vehicle 120 by the tag identifier from the telemetry aggregation database 310, the registration information associated with the tag reader and the tag identifiers from the registration unit 350 and credit account (or debit account) information from the credit processor 330. The billing engine 350 may aggregate the bill adjustments for each billing customer associated with tagged charging events using the aggregated usage.

The billing engine 350 may also aggregate the usage associated with the billing account of the electric vehicle customer 380. For example, when a particular electric vehicle customer 380 charges the electric vehicle 120 at GCP 105, the RFID tag 212 having a unique identifier that may be associated with a relative (e.g., Grandma) of the electric vehicle customer 380, the billing engine 350 may adjust the billed consumption associated with the billing account of the relative (Grandma) based on any consumption from or any supply of power to the electrical outlet 105 (e.g., associated with Grandma's billing account) used or provided by the electric vehicle 120. The billing engine 350 may also adjust the billed consumption associated with the electric vehicle 120 based on any consumption from or any supply of power to the electric vehicle 120 during the billing period.

The billing adjustment to the relative's billing account may be a cost or a credit depending on whether the electric vehicle 120 in aggregate for the tagged events associated with the relative's billing account during a billing period consumed power or in aggregate for the tagged events associated with the relative's billing account supplied power to the utility grid 150 (or other electric network).

The billing adjustment to the electric vehicle's billing account may be a cost or a credit depending on whether the electric vehicle 120 in aggregate during the billing period consumed power or in aggregate supplied power to the utility grid 150.

When the electric vehicle customer 380, for example, charges the electric vehicle 120 at home 395, the same billing adjustment process occurs for the billing account associated with the home 395 and the billing account associated with the electric vehicle 120.

The billing adjustment for each tagged changing event associated with the tag identifiers associated with a particular billing account may be aggregated to generate an aggregated billing adjustment. For example, when two or more electric vehicles 120 use one tag 212 associated with a particular billing account, the billing engine 350 may generate an aggregated billing adjustment based on the two or more electric vehicles 120. It is also contemplated that one or more tags 212 may be associated with a common billing account and the tagged charging events associated with each of the one or more tags 212 may be aggregated by the billing engine 350.

Although one vehicle telemetry 360 is shown providing tagged charging events, it is contemplated that tagged charging events may be received from any number of electric vehicles with vehicle telemetry.

Although two location have been illustrated for charging of an electric vehicle (e.g., the relative's location 390 and the electric vehicle customer's location 395), it is contemplated that the electric vehicle 120 may charge at any number of locations having tag identifiers to allow reconciliation of billing accounts.

FIGS. 4A and 4B are a top view illustrating an electrical outlet 205a in accordance with an exemplary embodiment and a cross-sectional view illustrating the electrical outlet 205a along a line A-A.

FIG. 4B, to reduce the complexity, does not show fastener 217 for attachment of an electrical outlet cover 210a to an electrical receptacle 216 via fastener recess 214.

Referring to FIGS. 4A and 4B, the electrical outlet 205a may include the electrical outlet cover 210a and a pair of electrical sockets 211 integral to the electrical receptacle 216. The electrical outlet cover 210a may include, for example, two openings configured to be closed by the pair of electrical sockets 211. The electrical outlet cover 210a may include a fastener opening 218 in a middle portion of the electrical outlet cover 210a to fasten via a fastener (not shown) the electrical outlet cover 210a to the electrical receptacle 216. The electrical outlet 205a may include a housing 215, for example, which may be set into a wall or other structure such that the electrical receptacle 216 may be set at least partially inside the housing 215 with a pair of flanges 219 extending from the housing 215. Fastening holes 220 in the flange 219 may be used with fasteners (e.g., screws) (not shown) to fasten the electrical receptacle 216 to the wall or other mounting structure.

Although an electrical outlet is shown with a pair of electrical sockets 211, it is contemplated that other socket configurations are possible including electrical outlets with any number of sockets or with such sockets in other relative locations within the housing such as a double socket side-by-side configuration, a single socket configuration and/or a triple socket using a vertical, horizontal or triangular configuration, for example.

The electrical outlet 205a may include an RFID tag 212a mounted on electrical outlet cover 210a for communication with the RFID reader 129 or 270, for example.

It is contemplated that the RFID tag 212a may be attached to the electrical outlet cover 210a after the electrical outlet cover 210a has been fastened to the electrical receptacle 216. For example, the RFID tag 212a may be retrofit to the electrical outlet 205a or an existing conventional electrical outlet after the electrical outlet 205a or the existing conventional outlet is operational.

Although the RFID tag 212a is shown covering the fastener opening 218, it is contemplated that the RFID tag 212a may be located anywhere on or adjacent to electrical outlet 205a as long as the RFID tag 212a does not interfere with one or more of the electrical sockets 211.

Although the RFID 212a is shown in FIGS. 4A and 4B, it is contemplated that a bar code (or bar code tag) may be used instead of the RFID tag 212a or in combination with the RFID tag 212a. In such a combination tag, the electronics (not shown) associated with the RFID tag 212a may be embedded in RFID tag 212a and the bar code may be provided on a surface of the RFID tag 212a to provide the combined functionality of an RFID tag 212a and a bar code.

Although the RFID 212a is illustrated as covering the fastener opening 218 and fastener 217, it is contemplated that the fastener 217 (see FIG. 4D) may fasten the RFID tag 212a and electrical outlet cover 210a to the electrical receptacle 216.

FIGS. 4C and 4D are a top view illustrating an electrical outlet 205b in accordance with another exemplary embodiment and a cross-sectional view illustrating the electrical outlet 205b along a line B-B.

Referring to FIGS. 4C and 4D, the electrical outlet 205b may include an electrical outlet cover 210b, an RFID tag 212b and the electrical receptacle 216. The electrical receptacle 216 is the same as that described in FIGS. 4A and 4B. The electrical outlet cover 210b may include a hole 213 closed by the electrical socket 211, another hole 218 coincident with the fastener recess 214 of the electrical receptacle 216 for fastening with the fastener 217. The electrical outlet cover 210b may include a portion 230b that may be raised above other portions of the electrical outlet 205b and shaped to conform with and to cover one of the electrical sockets 211. The portion 230b of the electrical outlet cover 210b may cover one of the electrical sockets 211 and may cause the electrical socket 211 to be inaccessible from the front of the electrical outlet 205b. The RFID tag 212b may be embedded in the portion 230b for reading by the RFID reader 129 and 270. The electrical outlet cover 210b may be compatible with a conventional receptacle to retrofit the RFID tag 212b into a conventional electrical outlet.

In certain exemplary embodiments, a conventional electrical outlet cover may be replaced with a replacement cover (e.g., the electrical outlet cover 210a, 210b, or 210c) to enable unique identification of a GCP 105a, 105b, or 105c.

Although the RFID tag 212b is shown in FIGS. 4C and 4D, it is contemplated that a bar code may be provided instead of or in combination with the RFID tag 212b.

FIGS. 4E and 4F are a top view illustrating an electrical outlet 205c in accordance with a further exemplary embodiment and a cross-sectional view illustrating the electrical outlet 205c along a line C-C.

Referring to FIGS. 4E and 4F, the electrical outlet 205c is similar to the electrical outlet 205b except that the electrical outlet cover 210c includes a pivotable socket cover 220 to selectively cover (and/or seal) a corresponding electrical socket 211. The socket cover 220 may include a pivot arm 221 which may pivot about a pivot axis 222 to selectively allow access to the corresponding electrical socket 211 when in an open position and to selectively block access to (e.g., cover and/or seal from the external environment) the corresponding socket 211 when in a closed position.

Although one electrical outlet and one pivotable socket cover is shown, it is contemplated that any number of electrical sockets 211 and pivotable socket covers may be included in the electrical outlet 205c. Each socket cover 220 may selectively cover (and/or seals) a corresponding electrical socket 211.

Although the RFID tag 212a, 212b and 212c are shown attached via the fastener 217 or, for example, adhesively mounted to the electrical outlet cover, it is contemplated that the RFID tag may be clipped to the electrical outlet cover or may slidably engage with the electrical outlet cover via a set of mating grooves (not shown) to hold the RFID tag. Other configurations having different fasteners are also possible.

Although the electrical outlets shown include a three prong plug and receptacle configuration generally used to supply 120 Volt Alternating Current (VAC) in the United States, it is contemplated that electrical outlet for other plug configurations and other country standard may be implemented including, for example, the 220 VAC standard in Europe and the 240 volt standard in the United States. For example, the configuration may include standards set forth by the National Electrical Manufactures Association (NEMA) and International Electrotechnical Commission (IEC) (e.g., standard 60320).

Although the electrical outlets shown do not illustrate a Ground Fault Interrupter (GFI), it is contemplated that the electrical outlets may include a GFI to interrupt power to the MD when a ground fault is detected.

Figure 5:
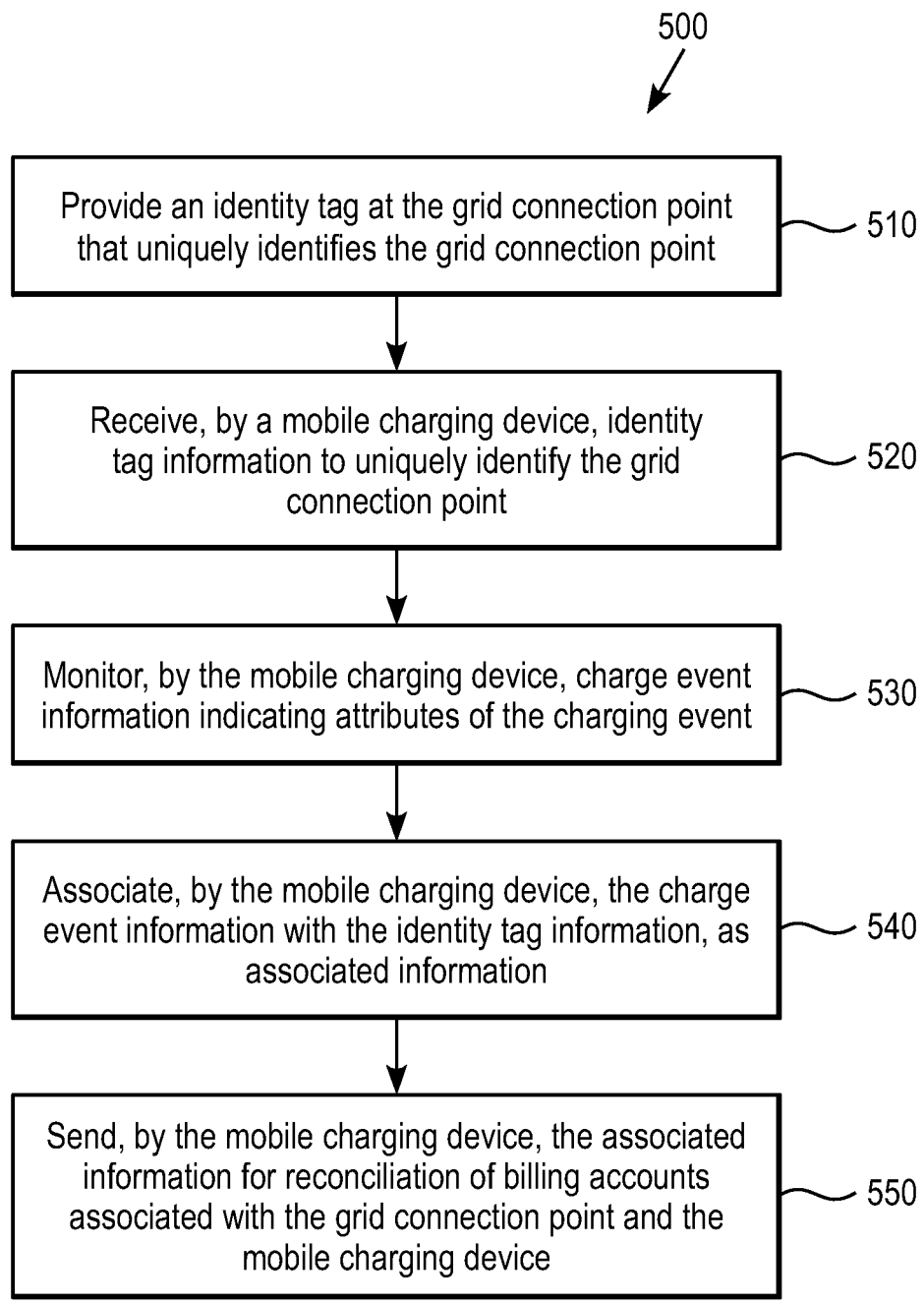
FIG. 5 is a flowchart illustrating a method of associating charging event information with information of an identity tag in accordance with exemplary embodiments.

FIG. 5 is a flowchart illustrating a method 500 of associating charging event information with information of an identity tag in accordance with exemplary embodiments.

Referring to FIG. 5, in step 510, an identity tag (e.g., an RFID tag or bar code) may be provided (established) at a GCP 105. In step 520, MD 120 may receive identity tag information to uniquely identify the GCP 105. In step 530, MD (e.g., mobile charging device 120) may monitor for charging event information indicating attributes of the charging event. In step 540, mobile charging device 120 may associate the charging event information with identity tag information, as associated information. In step 550, mobile charging device 120 may send the associated information for reconciliation of billing accounts associated with the GCP 105 and the mobile charging device 120.

Figure 6:
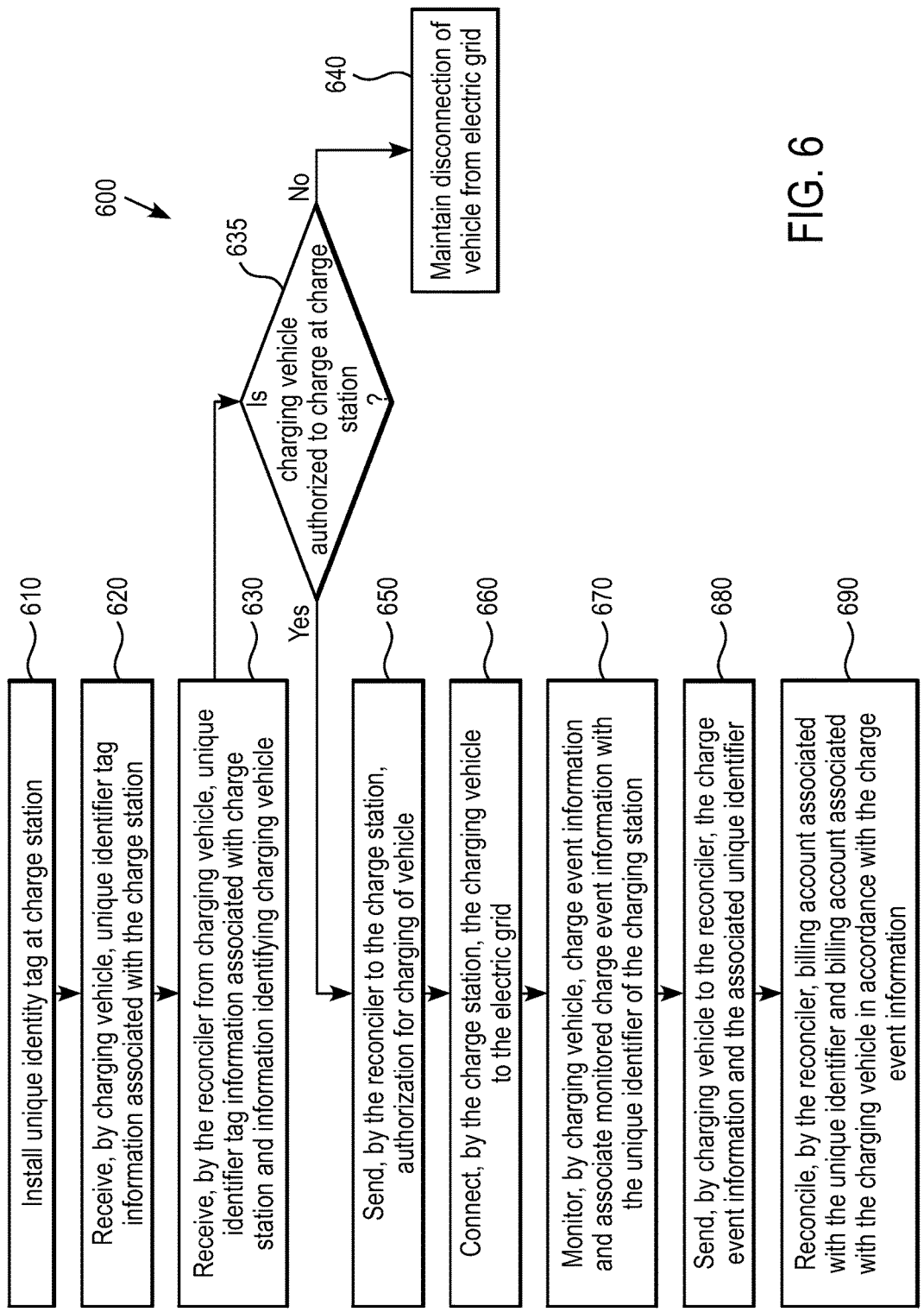
FIG. 6 is a flowchart illustrating a method of managing a charging event in accordance with exemplary embodiments.

FIG. 6 is a flowchart illustrating a method 600 of managing a charging event in accordance with exemplary embodiments.

Referring to FIG. 6, in step 610, a unique identity tag may be installed at the charging station 110. In step 620, the MD (e.g., the charging vehicle) may receive the unique identifier tag information associated with the charging station 110. In step 630, the reconciler 140 may receive from the charging vehicle 120 the unique identifier tag information associated with the charging station 110 and information identifying the charging vehicle 120. In step 635, the reconciler 140 may determine whether the charging vehicle 120 is authorized to charge at the charging station 110. For example, reconciler 140 may determine whether the charging vehicle has an active billing account and whether the active billing account has sufficient funds available to cover the fees associated with charging the charging vehicle 120.

If the charging vehicle 120 is not authorized to charge at the charging station 110, the charging station 110 may maintain the disconnection of the charging vehicle 120 from the electric grid 150, in step 640.

If the charging vehicle 120 is authorized to charge at the charging station 110, in step 650, the reconciler 140 may send to the charging station 110 an authorization for charging of the charging vehicle 120.

Although the authorization may be sent directly to the charging station 110 from the reconciler 140, it is contemplated that such authorization may be sent in the form of an authorization code or authorization message and may be sent to (routed to) the charging station 110 via the charging vehicle 120.

In step 660, the charging station 110 may connect the charging vehicle 120 to the power supply or utility electric grid 150. In step 670, the charging vehicle 120 may monitor/store the charging event information (e.g., the energy consumed during power storage by the ESD 122, the peak energy draw during the charging session, the unique identifier of the charging vehicle 120 and the GCP 105, the charging session start time, the charging session end time and/or the date of the charging session). In step 680, the charging vehicle 120 may send to the reconciler 140, the charging event information and the associated unique identifier of the GCP 105 (e.g., including electric outlet 210 or the charging station 110).

In step 690, the reconciler 140 may reconcile the billing account associated with the unique identifier of the charging station 110 and the billing account associated with the vehicle 120 in accordance with the charging event information. For example, the billing account associated with the unique identifier may be charged (or credited): (1) a fixed monthly amount for charging services; (2) a fixed amount per charging session or supply event; or (3) based on actual consumed (supplied) power during each charging session or supply event. The billing account associated with the unique identifier of the charging station 110 may be adjusted (e.g., credited or debited) based on the actual consumed/supplied power during a charge session or supply event of the electric vehicle 120.

Figure 7:
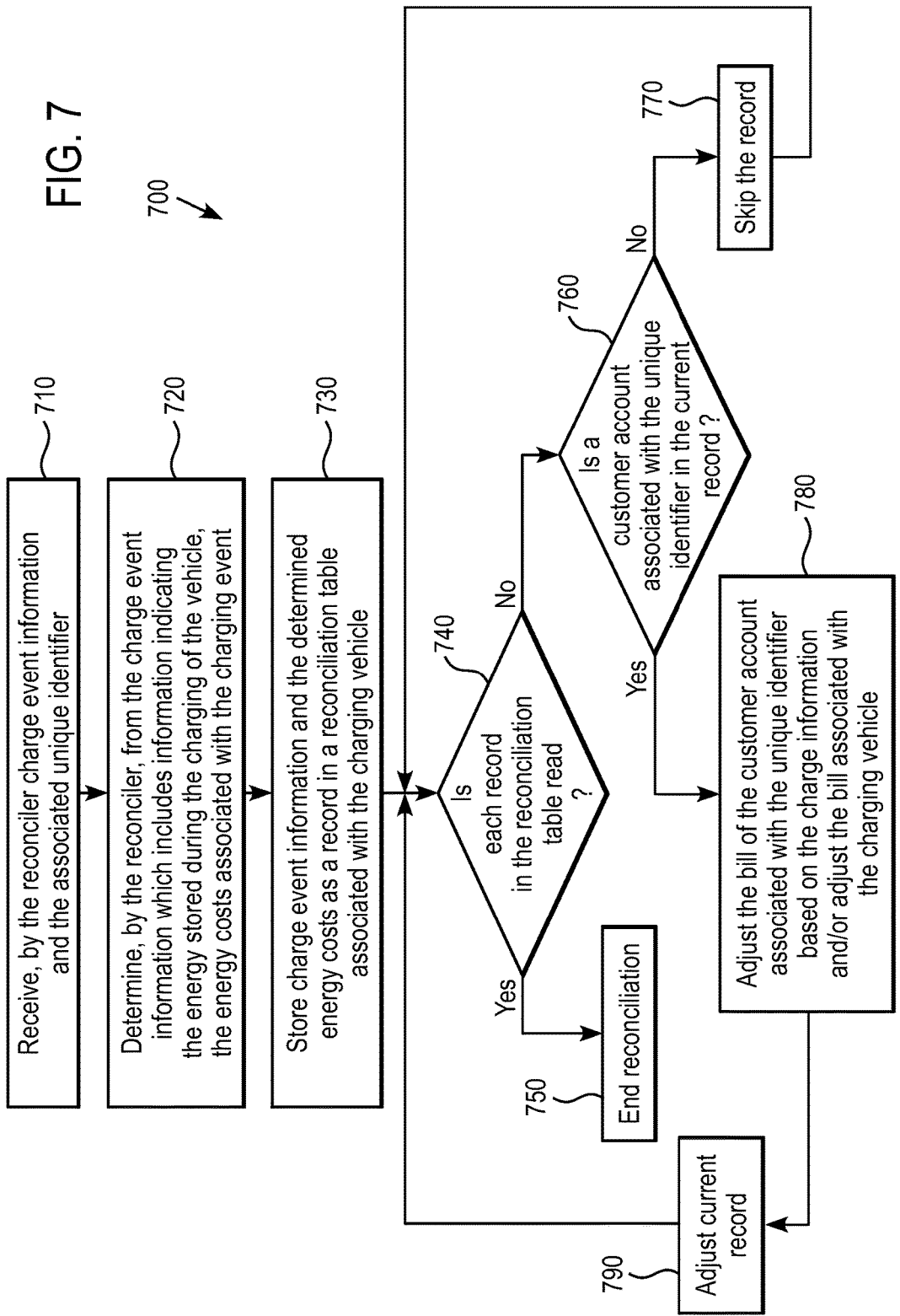
FIG. 7 is a flowchart illustrating a method of reconciling billing associated with a charging event in accordance with exemplary embodiments.

FIG. 7 is a flowchart illustrating a method 700 of reconciling billing associated with a charging event in accordance with exemplary embodiments.

Referring to FIG. 7, the reconciler 140 may receive the charging event information and the associated unique identifier of the charging station 110 or the electrical outlet 205 in step 710. In step 720, the reconciler 140 may determine from the charging event information, which includes information indicating the energy stored/supplied during the charging or discharging of the charging vehicle 120, the energy cost associated with the charging event. In step 730, the reconciler 140 may store charging event information and the determined energy costs as a record in a reconciliation table (not shown) of memory 146 associated with the charging vehicle 120. In step 740, the controller 148 of the reconciler 140 may determine whether each record in the reconciliation table of the memory 146 associated with a particular charging vehicle has been read.

For example, if the billing associated with a customer account occurs monthly, records associated with charging events are added to the reconciliation table in the memory 146 for each charging event during a respective month. The information in reconciliation table of memory 146 is read out after the end of the billing period to aggregate billings associated with each charging event to the customer account associated with the charging vehicle 120. If all records in the reconciliation table have been read, the reconciliation process is ended in step 750. If each record in the reconciliation table is not read, in step 760, the controller 148 of the reconciler 140 may determine whether a customer account associated with the unique identifier of the charging station 110 or electrical outlet 205 is associated with an active customer account. If the unique identifier in the current record is not associated with an active customer account, the record may be skipped in step 770 and processing may transfer to step 740.

In step 780, the reconciler 140 may adjust the bill of the customer account associated with the unique identifier of the charging station 110 or the electrical outlet 205 based on charging event information and/or may adjust the bill associated with the charging vehicle 120. Processing may then transfer to step 790. For example, the bill adjustment for the customer account associated with the unique identifier of the charging station 110 may be based on a fixed adjustment, or the energy consumed or supplied during the charging event. In step 790, the reconciler 140 may adjust the current record to the next record in the reconciliation table of the memory 146 and may transfer processing to block 740.

Although billing adjustments have been described as based on consumption to or supply from the MD, it is contemplated that the adjustment of the billing accounts (associated with the MD and/or the customer account associated with the connection of the vehicle) may be based on one or more of: (1) the energy stored during the charging event; (2) a time associated with the charging event; (3) VAR support associated with the charging event; and/or (4) whether the mobile charging device or a grid manager controls charging event parameters including, for example, energy draw.

Figure 8:
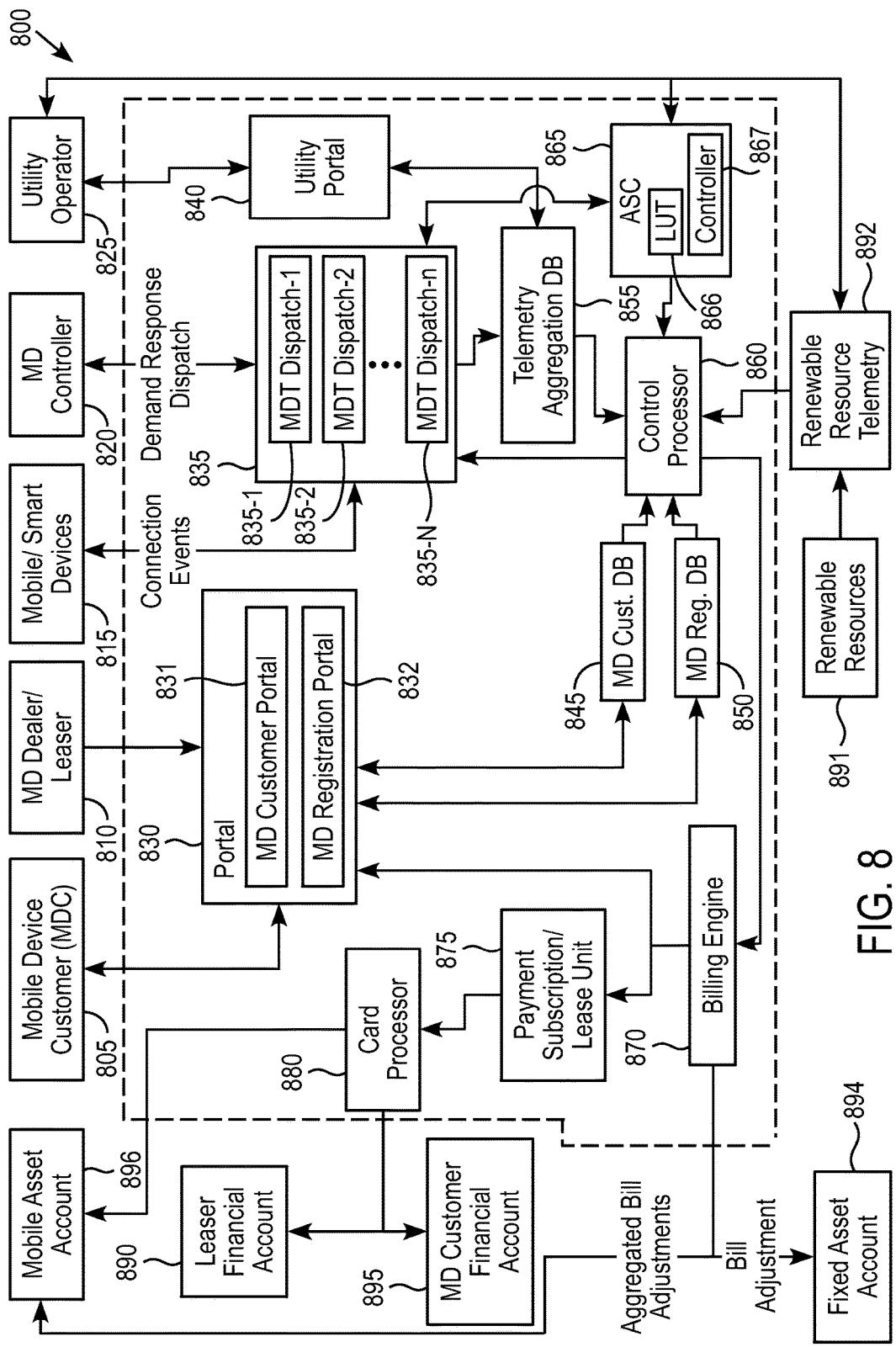
FIG. 8 is a block diagram illustrating a system for managing energy services in accordance with exemplary embodiments.

FIG. 8 is a block diagram illustrating a system 800 for managing energy services in accordance with exemplary embodiments.

Referring to FIG. 8, system 800 may include a portal 830, a Telemetry Receiver and Energy Service Dispatcher (TRESD) 835, a utility portal 840, a Mobile Customer Database (MCD) 845, a Mobile Registration Database (MRD) 850, a Aggregated Telemetry Database (ATD) 855, a control processor 860, an ancillary services controller ASC 865, a billing engine 870, a Payment Subscription and Lease Unit (PSLU) 875, and a card processor 880.

A mobile device (MD) dealer 810 (e.g., electric vehicle dealer) or the MD factory may install MD telemetry (e.g., vehicle telemetry) including an on-board RFID reader (and/or barcode reader) in new MDs 815. The MD dealer 810 may install or retrofit smartphones 260 and 815 with RFID or barcode reading capabilities, for example, by installing: (1) RFID readers 270 (or barcode readers) in the smartphones 260 and 815 or by using imagers of the identification device 260 and 815 to capture an image of a bar code. The smartphones 815 may use image recognition software to detect the unique identifier associated with the bar code in the captured image.

The MD dealer 810 (or another responsible entity) including, for example, a MD customer 805 may report (or register) the installation of the MD telemetry and/or the RFID reader 129 or 270 associated with a particular MD 120 or smartphone 815 using the MD registration portal 832 based on a unique identifier associated with the particular MD 120 or 815. For example, each MD (and/or smartphone) 120 and 815 may have an associated unique identifier which may be registered by the MD dealer 810 to initially register a new mobile asset account 896 associated with the MD 120.

The registration information entered by the MD dealer 810 (or MD customer 805) to setup the tag reader identifier of the MD 120 in the MD registration database 850 may be matched to the unique identifier on the tag reader to verify and to authorize a particular MD customer 805 in the MD customer portal 831. After the particular MD customer 805 is verified and authorized, the particular MD customer 805 may register each tag identifier (bar code or RFID tag) to a fixed asset account 894 (e.g., customer billing account associated with a fixed electric utility meter) via the MD customer portal 831 in the MD registration database 850.

The MD customer 805 may associate a credit, debit or prepayment account 895 to a mobile asset account 896 of the MD 120 for payment/credit associated with the energy services of the MD 120. The MD customer 805 may establish this association in the MD customer database 850 using the MD customer portal 831. For example, a web browser may be provided with software to enable the association of the credit card account 895 with the mobile asset (e.g., MD) account 896 to facilitate payment for or credit to a credit account in accordance with an agreement for energy services (e.g., charging or discharging of the electrical vehicle 120 or other ancillary services).

The MD customer 805 or MD user (e.g., electric vehicle customer) may register for renewable energy services, for example, from an electric utility or renewable energy supplier using portal 830. The renewable energy services may include primary services provided by the renewable energy source 891 or a power generator including, for example, charging services to charge the MD 120 or ancillary services provided by the MD 120 including, for example, (1) energy supply services by discharging the MD 120; (2) regulating service provided by the MD 120 to regulate the electric grid 150 in response to power fluctuations caused by the renewable energy source 891 and/or power generators, (2) frequency control services provided by the MD 120 to adjust frequency of the electric grid 150 in response to under frequency or over frequency conditions caused by the renewable energy source 891 and/or the power generators; and/or (3) VAR control services provided by the MD 120 to adjust power factor in response to a power factor of the electric grid 150 below a threshold level.

The MDs or smartphones 120 and 815 may provide tagged connection events (or charging events) (e.g., connection event information including the unique identifier of the MD 120 tagged with the unique identifier from the bar code or the RFID tag 119 or 212 associated with the GCP 105) via the TRESD 835 to the ATD 855. The TRESD 835 may include a plurality of MD telemetry and dispatch units (MDTDUs) 835-1, 835-2, . . . 835-N with open or proprietary MD telemetry/communication standard and device standard for communication of vehicle telemetry (e.g., real-time or near real time vehicle telemetry) between the MDs and/or smartphones 120 and 815 and respective MDTDUs 835-1, 835-2, . . . 835-N. For example, MDTDU-1 835-1 may communicate with a first group of MDs 120 using a first communication/device standard and MDTDU-2 835-2 may communicate with a second group of MDs 120 using a second communication/device standard.

The MD 120 may send its tagged connection events or the smartphone 815 may send the associated MDs 120 tagged connection events to the appropriate MDTDU 835-1, 835-2, or 835-N of the TRESD 835. The TRESD 835 may provide the tagged connection events to the ATD 855, which may aggregate the tagged connection events parsed by the unique identifier of the MD 120 and/or parsed by the unique identifier from the bar code or RFID tag 119 or 212 associated with the GCP 105 (e.g., corresponding to the fixed asset account 894 of the GCP 105). The ATD 855 may format the tagged connection event information into a format common for storage of the records (e.g., all records) in the ATD 855.

The ATD 855 may send the aggregated records of the connection events to the control processor 860, which may provide the aggregated connection event information in the format used by the billing engine 870 to adjust the fixed asset accounts 894 and bill the mobile asset accounts 896.

Although the aggregated connection event information is shown as being sent via the control processor 860 to the billing engine 870, it is contemplated that a data interface may be established between the ATD 855 and the billing engine 870 to send the aggregated connection event information to the billing engine 870 in a format used by the billing engine 870 to bill customers.

In certain exemplary embodiments, the billing processor may include the billing engine 870 and the ATD 855 (or an aggregation unit). The ATD 855, for example, may: (1) receive for each connection event an indicator indicating at least one of: (i) a device (or asset) identifier of the device (or asset) 120 used during the connection event to realize energy service; or (ii) a GCP identifier of the GCP 105 connected to the asset 120 used during the connection event; (2) identify an account that is associated with the GCP 105 based the indicator; and (3) aggregate the connection event information in accordance with the identified accounts such that the billing engine 870 may adjust the identified accounts in accordance with (e.g., based on) the aggregated connection event information associated with the identified accounts. The ATD 855 may store records. Each of the stored records may include at least one of: (1) a predetermined account associated with each respective asset 120 of a fixed asset type and an asset identifier of the respective asset 120 of a fixed asset type that identifies the respective asset 120; or (2) an account associated with a respective GCP identifier for each asset 120 of a mobile asset type. The ATD 855, responsive to the indicator not indicating the GCP identifier, may determine (e.g., identify) the predetermined account that is associated with the fixed asset 120 for realizing the energy service during the connection event. The billing engine 870 may adjust the predetermined account based on a determined quantity of energy services realized by the asset 120.

The billing engine 870 may aggregate the billing for energy services including charging or ancillary services of the MD 120 to a separate, aggregated billing account (e.g., the mobile asset account) associated with the MD 120 (e.g., electric vehicle). The MD customer 380 or 805 may receive or may purchase one or more of: (1) tags (e.g., identification tags such as RFID tags and/or barcode tags) to retrofit to existing electrical outlet covers; (2) electrical outlet covers that include such identification tags and may be retrofit to existing electrical outlets; and/or (3) electrical outlets that include such tags for installation. The MD customer 380 or 805 may install or may retrofit the tags, electrical outlet covers and/or the electrical outlets at a charging location where charging may occur and may register each identification tag to the customer billing account to be associated with the identification tag (e.g., a fixed asset account).

For example, a user may register the RFID tag 212 to the electric utility meter associated with the GCP 105 or a utility billing account number via registration software to uniquely match the RFID tag 212 to the fixed asset account of the customer (e.g., to associate the RFID tag 212 with the utility meter serving the GCP 105). The registration may include logging into the portal 340 or 830 to provide registration information indicating the correspondence of the RFID tag to the electric meter or fixed asset account number via a web browser application.

In certain exemplary embodiments, the billing engine 870 may receive the aggregated usage of each electric vehicle 120 parsed by the tag identifier (associated with a fixed asset account) via the control processor 860 from the ATD 855, and the registration information associated with the tag reader 129 or 270 and the RFID tags 119 or 212 from the MD registration database 850.

The control processor 860 may receive, via the PSLU 875, credit account (or debit account) information stored in the MD customer database 845 to indicate the financial status of the MD 120 (e.g., mobile asset device). For example, the MD customer 805 may: (1) pay for charging or be credited for ancillary services by using the MD customer portal 831 to establish a credit account; (2) check the prepayment amount in the mobile asset account; and/or (3) increase the prepayment amount using the MD customer portal 831. The MD customer 805 may initiate or change registered services, for example, from charging services only to charging and ancillary services, for example.

It is contemplated that different types of bundled services may be offered including, for example: (1) charging services (e.g., time-of-use charging or real-time or near real-time control of charging, among others), (2) discharging services (e.g., time-of-use discharging or real-time or near real-time control of discharging, among others); (3) spinning reserve services; (4) regulation services; (4) VAR support services; (5) frequency regulation services; (6) capacity services; and/or (7) leasing services (for leasing the MD 120 or ESD 122 of the MD 120). It is contemplated that such services may be bundled or may be offered separately and that the MD customer 805, via the MD customer portal 831, may register for any number of different service offerings.

The billing adjustments (e.g., aggregated billing adjustments) may be posted by the billing engine 870 to the mobile asset accounts 896 and to the fixed asset accounts 894 for each MD customer 805 and/or for each fixed asset customer associated with a tagged connection event. The PSLU 875 may receive the aggregated adjustments (e.g., charges or credits) to the mobile asset accounts 896 for each MD customer 805 and may determine other associated charges or credits for each mobile asset account 896. For example, the mobile asset account 896 may have one or more fixed charges (e.g., periodic charges, such as monthly or annual taxes, subscription charges and/or lease charges, among others). The PSLU 875 may post the fixed charges to the appropriate mobile asset accounts 896.

The billing adjustment to a respective mobile asset account 896 may be a cost or a credit depending on whether the MD 120 in aggregate had a credit or a cost for energy services realized during the billing period.

In certain exemplary embodiments, the billing engine 870 may provide the aggregated adjustments to the PSLU 875 and the PSLU 875 may post the fixed charges and the aggregated billing adjustments to the mobile asset accounts 896.

The card processor 880 (e.g., credit, debit and/or prepayment processor) may interface with external financial accounts (e.g., leasers financial accounts 890 and/or MD financial accounts 895) to debit or credit such accounts for the services provided between the MD 120 and system 800. In certain exemplary embodiments, it is contemplated that the MD customer 805 may maintain a prepayment credit in the mobile asset account 896 which may be maintained by automatic charges to the MD financial account 895.

The billing engine 350 or 870 and/or the PSLU 875 may update the MD customer database 845 in real time, periodically or, as requested via the portal 830 regarding billing information (e.g., including account balance, energy service usage by service offering, and/or reconciliation of renewable resource telemetry 892, among others). For example, the update information may include: (1) the connection event information; (2) the associated energy services realized at each connection event; and (3) if renewable energy sources 891 are associated with a connection event, the type, quantity, and price of the renewable energy sources 891 realized by the MD 120 during the connection event. If the service offering is base on real-time pricing of the service, the price may be determined by the control processor 860 based on pricing signals sent from the utility operator 825 via the ASC 865 or from the renewable resource telemetry 892 of a renewable energy source 891.

In certain exemplary embodiments, the utility operator 825 may set a price for each energy service offered and may negotiate with power generators, renewable energy sources and/or demand side generators and consumers to satisfy the offered energy services. The utility operators 825 may communicate the service offering to the billing engine 350 or 870 and/or the PSLU 875 and may provide billing information directly to the portal 830 upon an authenticated MD customer's request.

The MD customer portal 831 may also provide information regarding the subscription for one or more services, the terms of the subscription, lease of equipment under the subscription, the location, date and time of each connection event and/or adjustments for the fixed asset accounts 894 for each connection event, among others. It is contemplated that other information may additionally or, in the alternative, be provided from the portal 830 including other information regarding each connection event such as: (1) the meter identifier; (2) the MD identifier; (3) the RFID or barcode identifier; and/or (4) the plug identifier associated with a respective connection event.

The MD customer portal 831 may be configured to enable downloading of the information in one or more common formats (e.g., to enable the customer to view and/or analyze to information on a computer) including, for example, sending the information to the MD controller 820 (e.g., in the MD 120) for display to the MD customer 805 and/or for analysis by the MD controller 820 to improve operating efficiency of the MD 120 for future energy services to be realized. The MD customer portal 831 may be configured to directly provide viewing and/or analysis of energy services information via a web browser for each connection event, for each energy service over a time specified by the MD customer 805 or in aggregate for the MD customer 805 (e.g., for a plurality of energy services or for all energy services) based on, for example, user input from the web browser.

Figure 9:
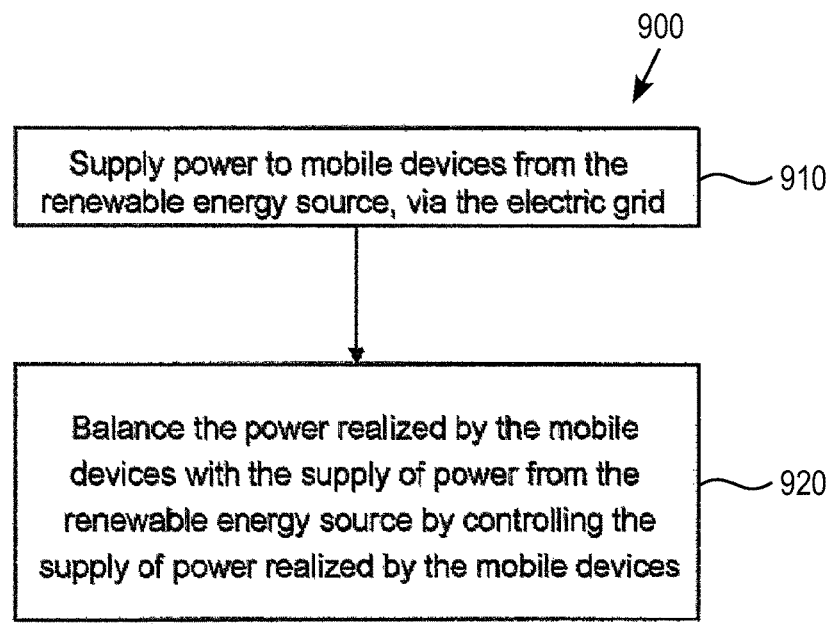
FIG. 9 is a flowchart illustrating a method of managing at least one renewable energy source in accordance with exemplary embodiments.

FIG. 9 is a flowchart illustrating a method 900 of managing at least one renewable energy source 891 in accordance with exemplary embodiments.

Referring to FIG. 9, the method 900 may include managing the at least one renewable energy source 891 for supply of power via the electric grid 150. In step 910, the renewable energy source 891 may supply power to MDs 120 via the electric grid 150. In step 920, the control processor 860 may control the balancing of the power realized by the MDs 120 with the supply of power from the renewable energy source 891 using real-time or near real-time telemetry information from: (1) the MD controllers 820 of the MDs 120 and from the renewable resource telemetry 892. The control processor 860, for example, may control the power realized by the MDs 120. For example, power output changes from the renewable energy sources 891 measured by the renewable resource telemetry 892 may be offset by controlling the power realized by the MDs 120 connected to the GCPs 105 and/or 205 such that the MDs 120 (e.g., a portion or all of the MDs 120) are controlled to: (1) reduce power consumption from the electric grid 150; (2) increase the power consumption from the electric grid 150; (3) reduce power supplied to the electric grid 150; and/or (4) increase the power supplied to the electric grid 150.

The renewable resource telemetry 892 may aggregate telemetry information into a common format from any number of renewable energy sources 891 and may send the renewable resource information in the common format to the control processor 860. The renewable resource information may include a regulation signal, output power, power factor, and/or frequency measurements for the renewable energy sources 891. The control processor 860, for each respective MD 120 used for balancing of the power on the electric grid 150 (e.g., the MDs 120 connected to the GCPs 105 or 205), may: (1) determine an operating condition (e.g., operating point or set point) for the respective MD 120 in accordance with the measured power; and (2) send the determined operating condition to the respective MD 120 via the appropriate MDTDU 835-1, 835-2, . . . 835-N. The MDs 120 that receive their determined operating condition may adjust their current operating condition to the determined operating condition.

For example, the control processor 860 may continuously monitor the measured power from the renewable energy source 891 and may: (1) periodically (e.g., repeatedly and/or continuously) determine the operating conditions for the respective MDs 120; and (2) send the determined operating conditions to the respective MDs 120 via the appropriate MDTDU 835-1, 835-2, . . . 835-N. The control processor 860 may control the adjustment of the current operating condition of the respective MDs 120 to the determined operating condition for the respective MDs 120 such that the aggregate power realized by the MDs 120 follows or substantially follows the power output from the renewable energy source or sources 891 measured by the renewable resource telemetry 892.

In some exemplary embodiments the determination, sending and adjustment operations may be repeated based on the measured power from the renewable energy source 891 such that the aggregate power realized by the MDs 120 substantially follows the generation (output) from the renewable energy source 891.

In certain exemplary embodiments, the control processor 860 may monitor power from the renewable energy source 891, for example, as a signal from the renewable resource telemetry 892. The control processor 860 may send a signal to each MD 120 used to balance the supply of power on the electric grid 150 to control (e.g., to adjust) the power realized by those MDs 120.

Although processing of the determined operating conditions is disclosed as occurring at the control processor 860, it is contemplated that it may occur at the MDTDU 835. In this exemplary embodiment, the control processor 860 may assign aggregated operating points for each of the MDTDUs 835-1, 835-2, . . . 835-N such that each respective MDTDUs 835-1, 835-2, . . . 835-N may determine operating points for their registered MDs 120 that are connected to the electric grid 150 based on the assigned, aggregated operating point for each MDTDUs 835-1, 835-2, . . . 835-N. In certain exemplary embodiments, the MDTDUs 835-1, 835-2, . . . 835-N may each send (e.g., periodically or continuously) to the control processor 860 an estimated range for their aggregated operating point (e.g., the power (or power profile over time) to be realized by their aggregated MDs 120) so that the control processor 860 may determine the proper assignment of aggregated operating points for each of the MDTDUs 835-1, 835-2, . . . 835-N.

The MD controller 820 via the meter device may validate with the appropriate MDTDUs 835-1, 835-2 . . . 835-N and/or the control processor 860 that the MDs 120 actually adjusted their current operating conditions to the determined operating conditions. It is contemplated that the contractual arrangements between or among the utility operator 825, the renewable energy sources 891, the control processor 860, the MDTDUs 835-1, 835-2, . . . 835-N and/or the MDs 120 may include contractual incentives for adjusting and/or penalties for not adjusting the current aggregated operating points to the determined aggregated operating points to follow the power supply curve of the renewable energy sources 891.

In certain exemplary embodiments, the MD controller 820 (or CMS 123) may include a communication module (e.g., transceiver 127) for communication to MDTDUs 835-1, 835-2, . . . 835-N or reconciler 140 for reporting the identifier (e.g., RFID or barcode identifier) associated with the GCP 105 to establish a location of the MD or mobile asset 120 at the GCP 105 on the electric grid 150, and to receive one or more operating conditions for realizing the energy service. The received operating conditions may be based on the established location of the MD (or mobile asset) 120 on the electric grid 150. The MD controller 820 (or CMS 123) may also include a processor (e.g., controller 128) for operating the mobile asset 120 in accordance with the received one or more operating conditions to realize the energy service.

The communication module 127 may receive a signal indicating one or more energy services that are offered to the mobile asset 120 and the processor 128 may select one of the offered energy services, as the energy service to be realized. The processor 128 may be in direct or indirect communications (e.g., via MDTDU 835-1, 835-2, or 835-N) with the ASC or Energy Service Controller (ESC) 865 such that the processor 128 and the ASC or ESC 865 (e.g., controller 867) may negotiate (set) a quantity of the selected energy service to be realized.

In certain exemplary embodiments, the ESC 865 may include a processor 148 or 867 and a communication unit 147 for receiving from the mobile asset 120 an indicator. The processor 148 or 867 may: (1) determine a location of the mobile asset 120 on the electric grid 150 based on the indicator received by the communication unit 147; (2) determine one or more operating conditions for realizing the energy service in accordance with at least operating constraints associated with the determined location of the mobile asset 120 on the electric grid 150. The communication unit 147 may send to the mobile asset 120 the determined one or more operating conditions for realizing the energy service.

In certain exemplary embodiments, the communication unit 147 may receive an indicator indicating one of: (1) an identifier of the asset (e.g., when the asset is of a fixed asset type); or (2) the identifier of the GCP 105 connected to the asset 120 (e.g., when the asset is of a mobile asset type). The processor 148 may model the electric grid 150 in the vicinity of a predetermined location of the electric grid 150 when the indicator indicates the asset 120, as a fixed asset type, or may model the electric grid 150 in the vicinity of the location of the GCP 105 or 205 of the electric grid 150 when the indicator indicates the identifier of the GCP 105 or 205 connected to the asset 120.

The control processor 860 and/or the MDTDUs 835-1, 835-2, . . . 835-N may select the determined operating condition of each respective MD (or mobile asset) 120 such that at least the operating constraints of the electric grid 150 and/or each of the MDs 120 may not be exceeded (e.g., may be satisfied).

In certain exemplary embodiments, the control processor 860 may be distributed processing in other devices in the system 800, may be a plurality of processors associated with: (1) different renewable energy sources 891; (2) different MDTDUs 835-1, 835-2, . . . 835-N; (3) different geographic areas or operating regions of the electric grid 150; and/or (4) different billing engines 870, among others. For example, the system 800 may include any number of: (1) utility operators; renewable energy sources 891, MDTDUs 835; ASCs 865, billing engines 870, and/or databases 845 and 850.

In certain exemplary embodiments, in response to the power output changes from the renewable energy sources 891 decreasing, the control processor 860 or the MDTDUs 835-1, 835-2, . . . 835-N may: (1) select one or more of the MDs 120 that do not have operating constraints which prevent: (i) a reduction of the power consumption by the MDs 120 from the electric grid 150; and/or (ii) an increase of the power supplied by the MDs 120 to the electric grid 150 and (2) control an adjustment of the power realized by the selected one or more MDs 120 to offset the decreasing power output from the renewable energy sources 891.

In various exemplary embodiments, in response to the power output changes from the renewable energy sources 891 increasing, the control processor 860 or the MDTDUs 835-1, 835-2, . . . 835-N may: (1) select one or more of the MDs 120 that do not have operating constraints which prevent: (i) an increase of the power consumption by the MDs 120 from the electric grid 150; and/or (ii) a decrease of the power supplied by the MDs 120 to the electric grid 150; and (2) control the adjustment of the power realized by the selected one or more MDs 120 to offset the increasing power output from the renewable energy sources 891.

It is contemplated that the renewable energy source 891 may include one or more of: (1) a wind generator; (2) a hydroelectric generator; (3) a geothermal generator; (4) a wave generator; (5) a current generator; (6) a photovoltaic generator; and/or (7) a solar thermal generator.

Although the measured power from the renewable energy sources 891 is disclosed as offset using the MDs 120, any portion of the measured power may be offset. For example, the electric grid 150 may include one or more energy storage units and the balancing of the power realized by the MDs 120 with the supply of power from the renewable energy sources 891 may be based on the power output by the renewable sources 891 including power consumed or supplied by the one or more energy storage units (e.g., net of the contributions from electric grid-connected energy storage units).

In certain exemplary embodiments, the balancing of the power realized by the MDs with the supply of power from the renewable energy source 891 may include the control processor 860 or the MDTDUs 835-1, 835-2, . . . 835-N: (1) modeling the supply of power realizable by each respective MD 120 based on operating constraints of the electric grid 150 and operating constraints of the MD 120, as model results; (2) aggregating the model results for each respective device 120, as an aggregated model result; and (3) comparing the aggregated model result to the measured output of the renewable energy resources 891 or electric grid 150 to determine an adjustment to the power realized by each of the respective MDs 120.

Figure 10:
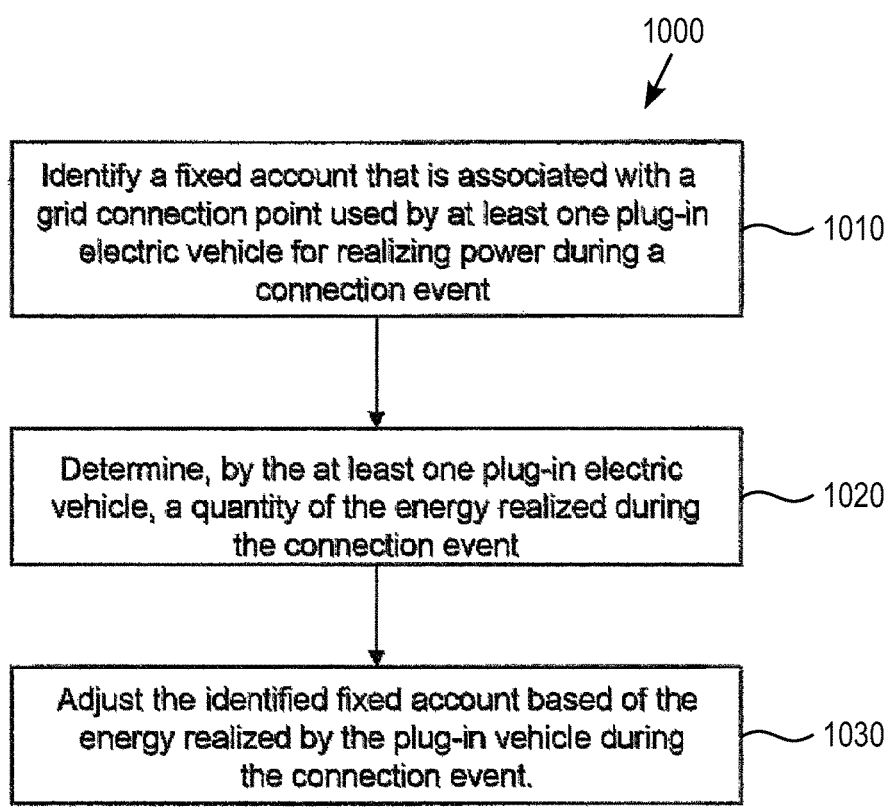
FIG. 10 is a flowchart illustrating a method of managing renewable energy services in accordance with exemplary embodiments.

FIG. 10 is a flowchart illustrating a method 1000 of managing renewable energy services in accordance with exemplary embodiments.

Referring to FIG. 10, the method 1000 may manage renewable energy services for plug in-vehicles 120. In step 1010, the control processor 860 or the billing engine 870 may identify a fixed asset account 894 that is associated with the GCP 105 used by at least one plug-in electric vehicle 120 for realizing power during a connection event. In step 1020, the plug-in electric vehicle 120 may determine a quantity of the energy realized during the connection event. In step 1030, the billing engine 870 using connection event information from the plug-in electric vehicle 120 or smartphones 815 associated with the plug-in electric vehicle 20 may adjust the identified fixed asset account 894 based on the energy realized by the plug-in electric vehicle 120 during the connection event.

Figure 11:
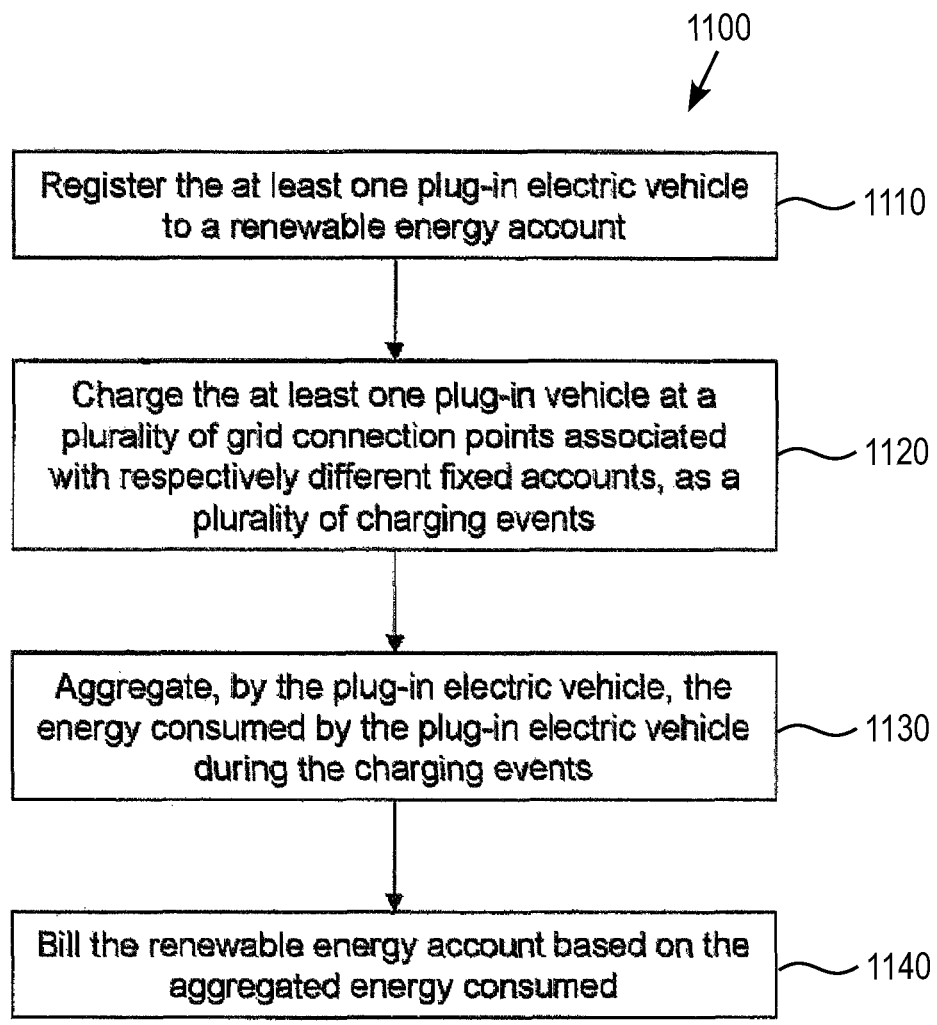
FIG. 11 is a flowchart illustrating a method of managing renewable energy services in accordance with other exemplary embodiments.

FIG. 11 is a flowchart illustrating a method 1100 of managing renewable energy services in accordance with other exemplary embodiments.

Referring to FIG. 11, in step 1110, one or more plug-in electric vehicles 120 may be registered via MD registration portal 832 of the portal 830 to a renewable energy account and the registration stored in MD registration database 850. The registration may be completed by the MD dealer/leaser 810 or the MD customer 805 using, for example, unique security codes associated with the plug-in electric vehicle 120.

In step 1120, the plug-in electric vehicle 120 may be charged at a plurality of the GCPs 105 and/or 205 associated with respectively different fixed asset accounts 894, as a plurality of charging events. In step 1130, the MDTDU 835, the ATD 855 or the control processor 860 may aggregate the energy consumed by the plug-in electric vehicle 120 during the plurality of charging events (e.g., for a billing period) and, in step 1140, the PSLU 875 and/or billing engine 870 may bill the renewable energy account 896 (e.g., mobile asset account) based on the aggregated energy consumed.

Although FIG. 11 refers to the charging of a plug-in electric vehicle 120, it is contemplated that the plug-in electric vehicle 120 may be provided with or may provide other energy services including ancillary energy service such as discharging to the electric grid 150 and grid regulation services, such as frequency regulation service and spinning reserve service, among others.

Although one MD controller 820 is shown providing tagged connection events, it is contemplated that tagged connection events may be received from any number of electric vehicles with vehicle telemetry.

Figure 12:
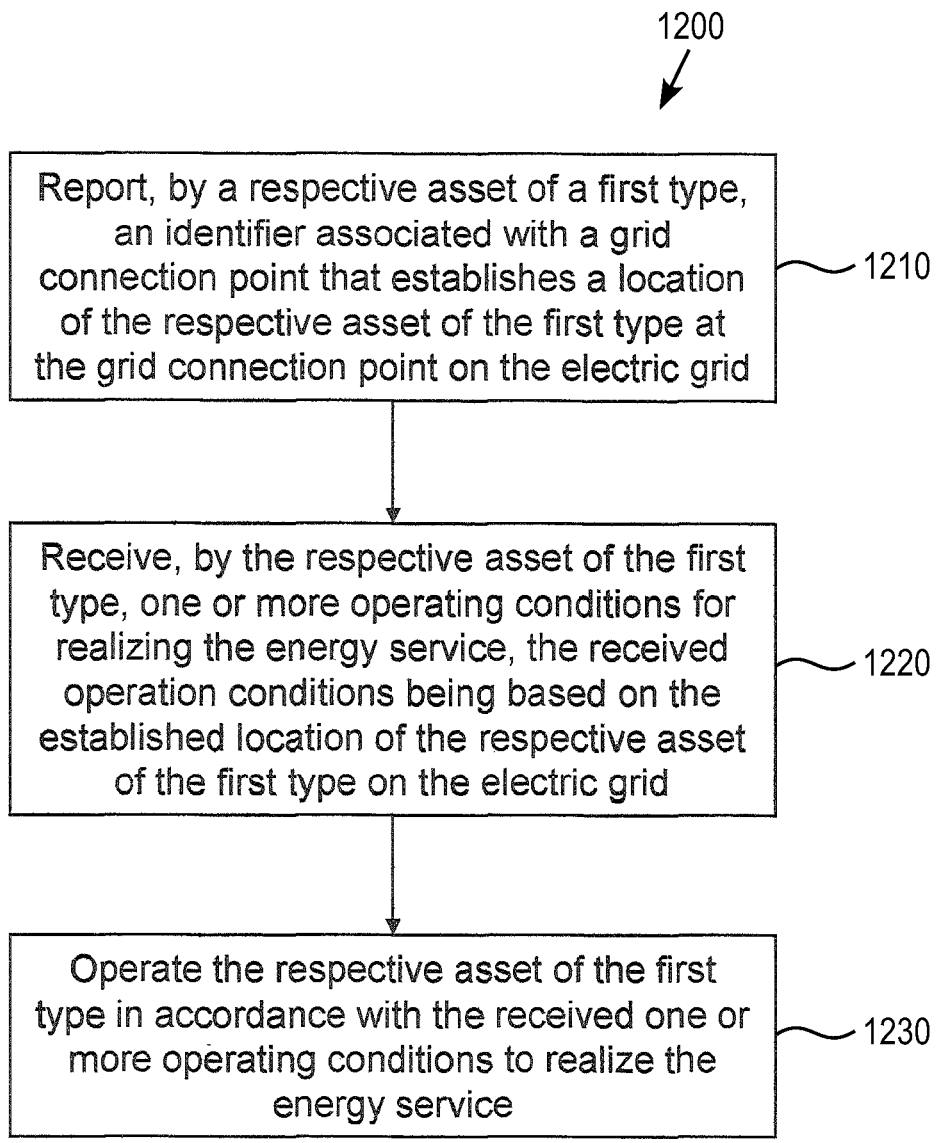
FIG. 12 is a flowchart illustrating a method of managing energy services in accordance with exemplary embodiments.

FIG. 12 is a flowchart illustrating a method 1200 of managing energy services in accordance with exemplary embodiments.

Referring to FIG. 12, the method 1200 may manage energy service for a first type of asset 120 (e.g., mobile assets) that are connected to the GCPs 105. In step 1210, a respective asset of a first type 120 (e.g., a mobile asset or MD) may report an identifier associated with a GCP 105. The identifier may establish a location of the respective asset of the first type 120 at the GCP 105 on the electric grid 150. In step 1220, the respective asset of the first type 120 may receive one or more operating conditions for realizing the energy service. The received operating conditions may be based on the established location of the respective asset of the first type 120 on the electric grid 150. In step 1230, the respective asset of the first type 120 may be operated in accordance with the received one or more operating conditions to realize the energy service.

It is contemplated that different classes or types of assets may be established such that operations for energy services associated with different classes or types may vary. For example, the assets may be classified into mobile and fixed assets based on the mobility of an asset (e.g., whether the asset can move from one GCP 105 to another GCP 105). As other examples, the assets may be classified based on energy storage/consumption capability, ramp rates, time-of-use, and/or energy service capabilities, among others.

In certain exemplary embodiments, a mobile asset 120 may receive a signal indicating one or more energy services that are offered to the mobile asset 120 and the mobile asset 120 may select one of the offered energy services, as the energy service to be realized.

In various exemplary embodiments, the mobile asset 120 in communication with (e.g., negotiating with) the ASC 865 may set a quantity of the selected energy service to be realized and the ASC 865 may control (e.g., provide operating conditions for) the mobile asset 120 to achieve the set quantity of the selected energy service.

The energy services (or ancillary services) offered, for example, may include: (1) a service to provide power from the mobile asset 120 to the GCP 105; (2) a spinning reserve service from the mobile asset 120; (3) a frequency support service from the mobile asset 120; (4) a regulation service from the mobile asset 120; and/or (5) a VAR support service from the mobile asset 120.

In certain exemplary embodiments, the ASC 865 may establish the location of the mobile asset 120 at the GCP 105 on the electric grid 150, may determine the one or more operating conditions for realizing the energy service based on at least the established location of the mobile asset 120 on the electric grid 150 (e.g., electrical connection of the mobile asset 120 to the electric grid 150), and may send to the mobile asset 120 the determined one or more operating conditions for realizing the energy service. The one or more operating conditions may be determined in accordance with at least one operating constraint associated with the location of the mobile asset 120 on the electric grid 150.

Figure 13:
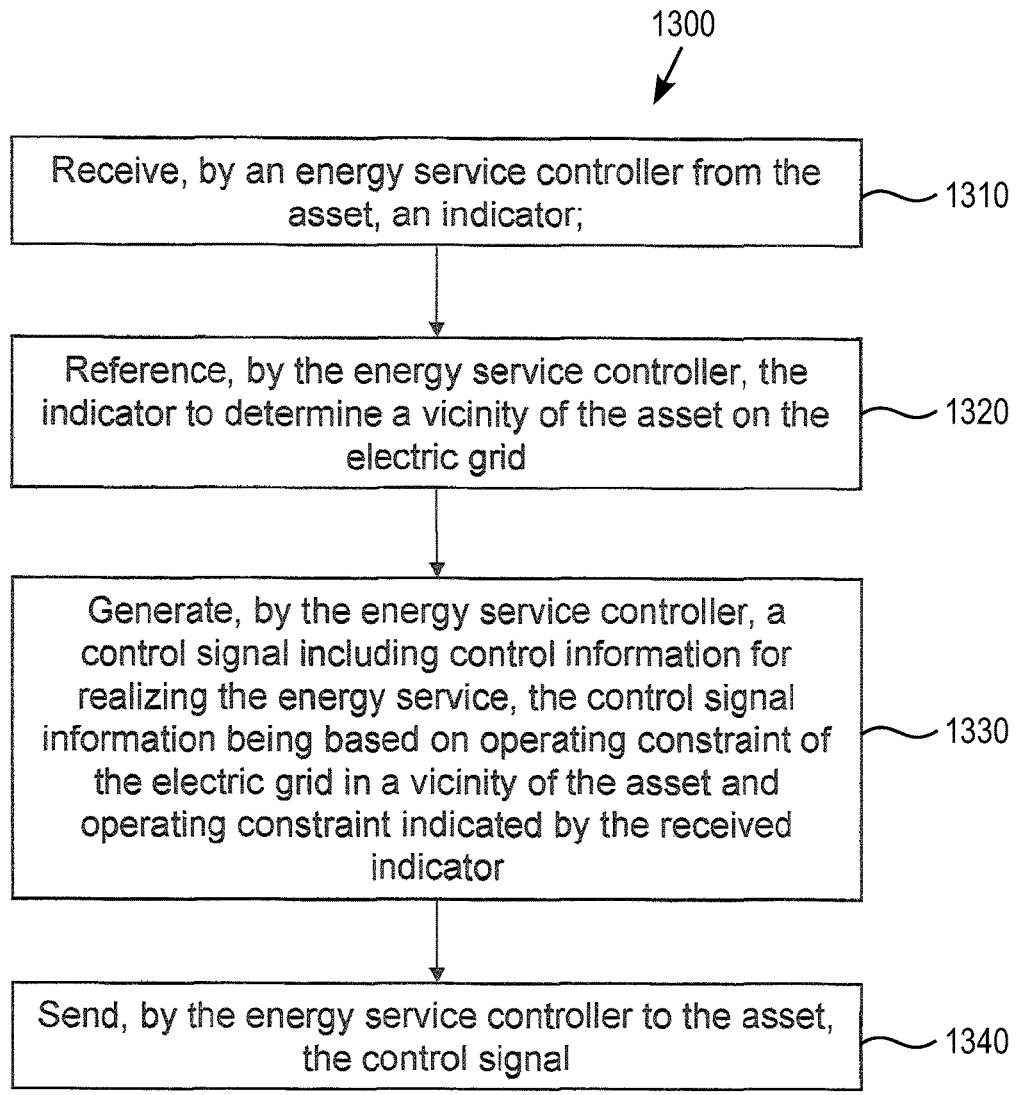
FIG. 13 is a flowchart illustrating a method of managing energy services in accordance with further exemplary embodiments.

FIG. 13 is a flowchart illustrating a method 1300 of managing energy services in accordance with further exemplary embodiments.

Referring to FIG. 13, the method 1300 may manage energy service for the mobile asset 120 connected to the GCP 105 of the electric grid 150. In step 1310, the ASC 865 (or ESC) may receive an indicator indicating, for example, an identifier for the GCP 105 connected to the asset 120 or the identifier of the asset itself. In step 1320, the ASC or ESC 865 may reference the indicator to determine a vicinity of the asset on the electric grid 150. For example, the indicator may be matched with identifiers in the lookup table 866.

In step 1330, the ASC or ESC 865 may generate a control signal including control information (or operation conditions) for realizing the energy service. The control signal information may be based on operating constraint of the electric grid 150 in a vicinity of the asset 120 and operating constraint indicated by the received indicator. For example, the ASC or ESC 865 may model the electric grid 150 in a vicinity of the location of the mobile asset 120 based on the present operating parameters/conditions of the electric grid 150 (e.g., the voltages and/or currents at different points on the electric grid 150 and the electrical properties of the components of the electric grid 150 (e.g., I-V characteristics, thermal characteristics, maximum steady-state ratings and/or peak ratings (operating currents and voltages), among others))). The vicinity of the location of the mobile asset generally refers to a portion of the electric grid 150 electrically surrounding the mobile asset 120 that is sufficiently large to ensure that operation of the mobile asset 120 within the established operating conditions does not cause operational failures of grid equipment or the mobile asset 120. The modeling by the ASC or ESC 865 may determine the energy services to be supplied or consumed by the mobile asset 120 to operate the electric grid 150 in the vicinity of the GCP 105 at nominal voltages and/or current levels without exceeding ratings of the equipment (e.g., transformer and line ratings) in the electric grid 150 and/or without exceeding ratings for the mobile asset 120.

The modeling may include simulations to verify that the mobile asset 120 may: (1) charge or discharge at a particular level or within a particular range of levels within operating constraints of the electric grid 150 (such that overcurrent, and/or overvoltage or undervoltage conditions, among others, do not occur on the electric grid 150); and/or (2) provide particular services (such as frequency stability, VAR support, voltage regulation, or/and voltage support, among others). The ASC or ESC 865 may obtain further operating constraints from the mobile asset 120 and may provide operating conditions (or operating set points) for the mobile asset 120 in accordance with the operating constraints obtained from the mobile asset 120 and/or the operating constraints of the electric grid 150. For example, the mobile asset 120 may constrain the charging of the mobile asset 120 to: (1) a particular time-of-day; (2) a maximum charging current; (3) a maximum charging capacity; and/or (4) different charging or discharging ranges based on charge level of the ESD 122 or based on expected use of the mobile asset 120.

In step 1340, the ASC or ESC 865 may send to the mobile asset 120, the control signal.

In certain exemplary embodiments, the ASC or ESC 865 may include the lookup table 866 (or database) for storing records. Each of the records may include (1) an identifier associated with a respective GCP 105 or 205; and (2) a location (e.g., electrical connection) of the respective GCP 105 on the electric grid 150. The ASC or ESC 865 may reference the location of the mobile asset 120 on the electric grid 150 based on an identifier of the GCP 105 received from the mobile asset 120 by using the lookup table 866. For example, the lookup-table 866 may associate the respective GCP 105 with a point on the electric grid (e.g., a low-voltage side transformer connection). The ASC or ESC 865 may control the operating conditions of the mobile asset 120 in accordance with the modeling results.

Figure 14:
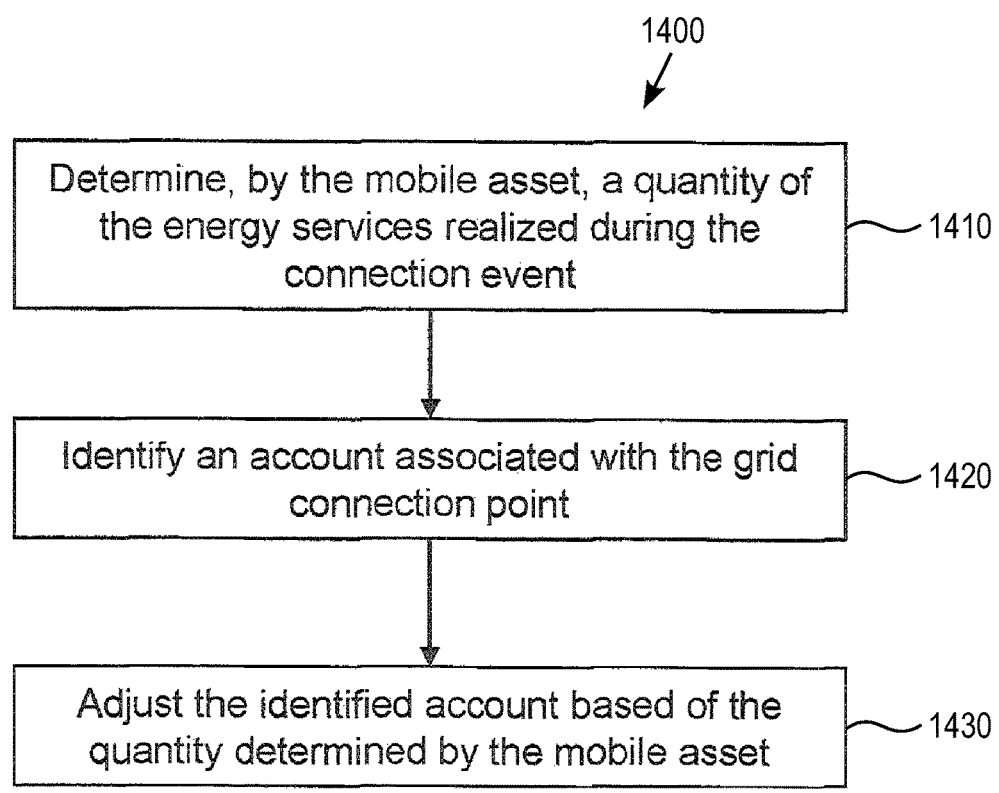
FIG. 14 is a flowchart illustrating a method of managing energy services in accordance with other exemplary embodiments.

FIG. 14 is a flowchart illustrating a method 1400 of managing energy services in accordance with other exemplary embodiments.

Referring to FIG. 14, the method 1400 may manage energy services for the mobile asset 120 connected to the GCP 105 during a connection event. In step 1410, the mobile asset or mobile assets 120 may determine a quantity of the energy services realized during the connection event. In step 1420, the control processor 860 may identify an account associated with the GCP 105 used during the connection event by matching an identifier associated with the GCP 105 (e.g., of the RFID or barcode tag 212) with the associated fixed (billing) account via the MRD 850. In step 1430, the billing engine 870 may adjust the identified account based on the quantity determined by the mobile asset 120.

In various exemplary embodiments, the identification of the account that is associated with the GCP 105 includes: positioning RFID reader 129 or 270 in an operating range of an identification tag 119 or 212 associated with the GCP 105 that is used by the respective asset 120 for the energy service during the connection event; reading, by the identification module 129 or 270 from the identification tag 119 or 212, the identifier of the GCP 105; and referencing the identifier of the GCP 105 with the account that is associated with the GCP 105.

In certain exemplary embodiments, the mobile asset 120 may be registered to a mobile asset account 896 and may determine further quantities of energy services realized during further connection events such that the realized energy services of the mobile asset 120 may be aggregated for billing of the mobile asset account 896.

Figure 15:
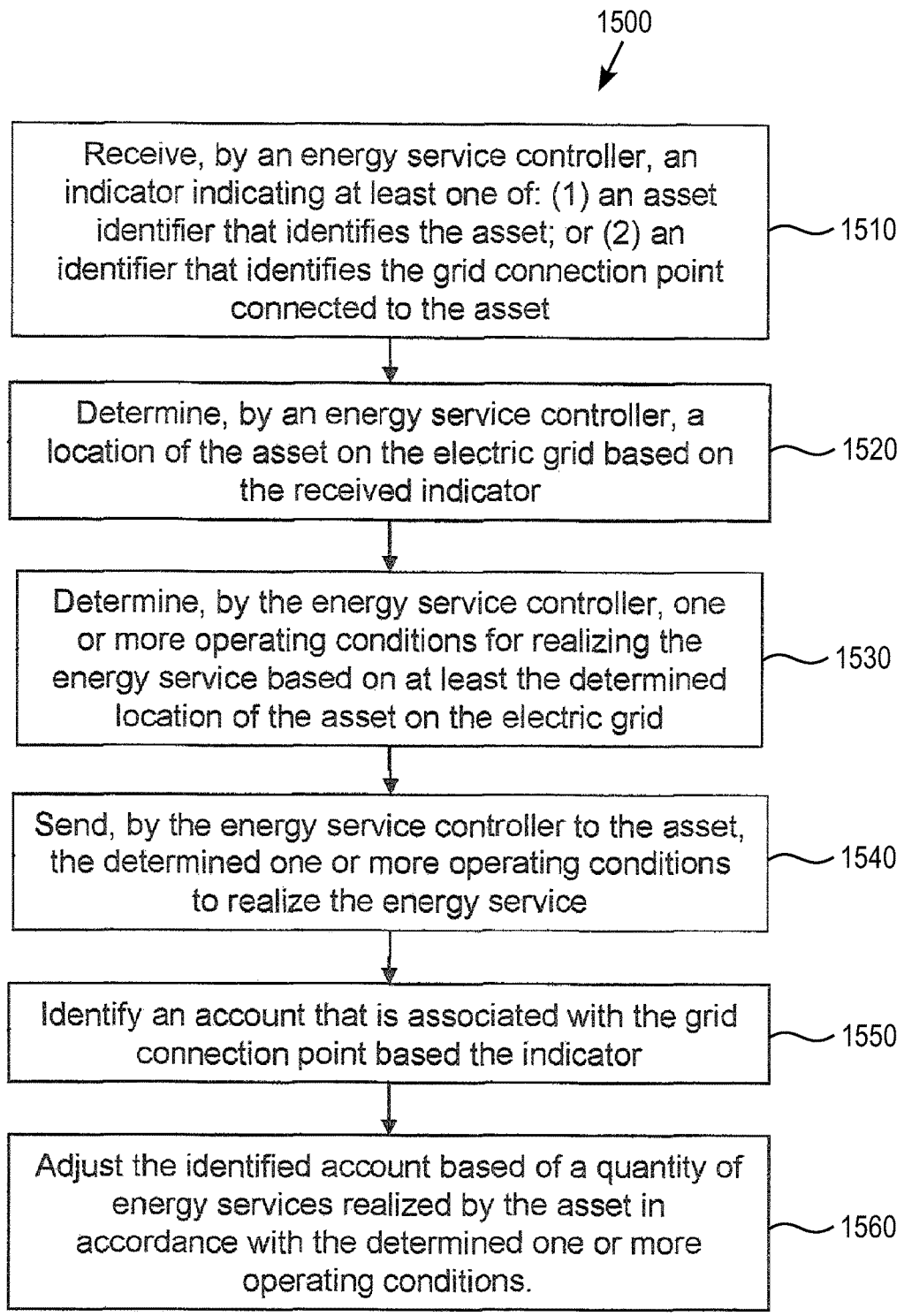
FIG. 15 is a flowchart illustrating a method of managing energy services in accordance with additional exemplary embodiments.

FIG. 15 is a flowchart illustrating a method 1500 of managing energy services in accordance with additional exemplary embodiments.

Referring to FIG. 15, the method 1500 may manage energy service for an asset 120 connected to the GCP 105 of the electric grid 150. In step 1510, the ASC or ESC 865 may receive from the asset 120 (e.g., a mobile asset or a fixed asset) an indicator indicating at least one of: (1) an identifier associated with the asset 120; or (2) an identifier of the GCP 105 connected or coupled to the asset 120. In step 1520, the ASC or ESC 865 may determine a location of the asset 120 on the electric grid 150 based on the received indicator (for example, using the lookup table 866). In step 1530, the ASC or ESC 865 may determine one or more operating conditions for realizing the energy service based on at least the determined location of the asset 120 on the electric grid 150. In step 1540, the ASC or ESC 865 may send to the asset 120, the determined one or more operating conditions for realizing the energy service.

In step 1550, the ATD 855 or billing engine 870 may identify an account that is associated with the GCP 105 based on the indicator. In step 1560, the billing engine 870 may adjust the identified account based on a quantity of energy services realized by the asset 120 in accordance with the determined one or more operating conditions.

For example, the indicator may indicate the asset identifier of the asset 120 and that the asset is stationary, substantially non-moveable or fixed asset or may indicate the identifier of the GCP 105 for the asset 120 and that the asset is a mobile asset (e.g., capable of moving from one GCP 105 to another GCP 105). Responsive to an indication of the asset identifier, the ASC or ESC 865 may search in the look-up table 866 for a predetermined location associated with the asset identifier.

In various exemplary embodiments, the ASC or ESC 865 may send a signal indicating one or more energy services that are offered to the asset 120 and may receive from the asset 120 a selection of one of the offered energy services, as the energy service to be realized. The selection may be automatic (e.g., without user intervention) based on the operating status of the asset 120 or the selection may be by a user via a service notification, for example, using the smartphone 815 or via a display of the asset 120.

In certain exemplary embodiments, the asset 120 (e.g., fixed or mobile asset) may receive one or more operating conditions from the ASC or ESC 865 for realizing the energy service. The received operating conditions may be based on one of: (1) a predetermined location of the asset 120, for example, when the asset is a fixed asset; or (2) the location associated with the GCP 105 connected to the asset 120, for example, when the asset 120 is a mobile asset.

Figure 16:
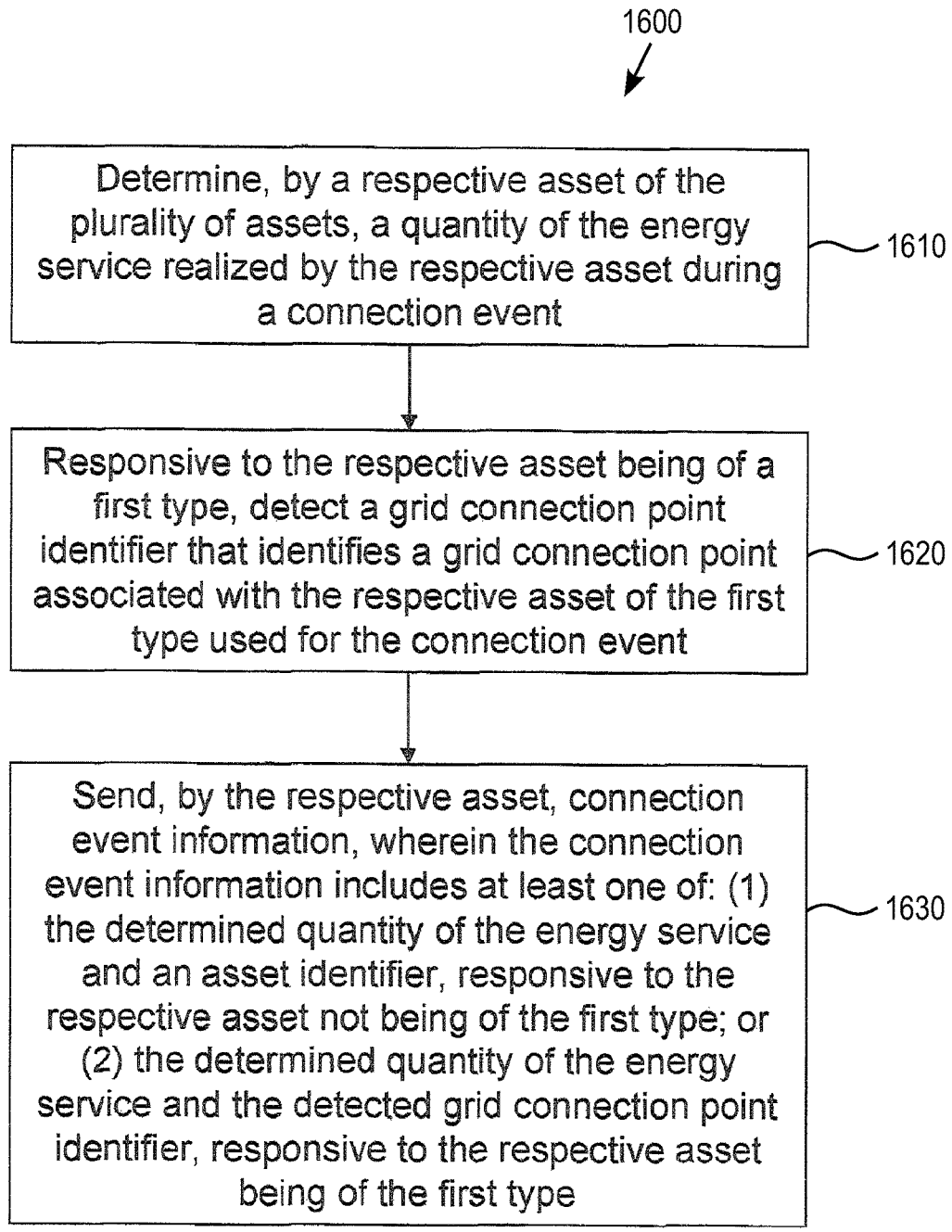
FIG. 16 is a flowchart illustrating a method of managing energy services in accordance with yet further exemplary embodiments.

FIG. 16 is a flowchart illustrating a method 1600 of managing energy services in accordance with further exemplary embodiments.

Referring to FIG. 16, the method may manage energy service for a plurality of assets 120 of different types connected to the GCPs 105. In step 1610, a respective asset 120 of the plurality of assets 120 may determine a quantity of the energy service realized by the respective asset 120 during a connection event. In step 1620, responsive to the respective asset 120 being of a first type (e.g., a mobile type), detecting an identifier of the GCP 105 that identifies the GCP 105 associated with the respective asset 120 of the first type used for the connection event. In step 1630, the respective asset 120 may send connection event information including, for example, at least one of: (1) the determined quantity of the energy service and the asset identifier that identifies the respective asset 120 responsive to the respective asset 120 not being of the first (mobile) asset type; or (2) the determined quantity of the energy service and the detected GCP identifier, responsive to the respective asset 120 being of the first (mobile) asset type.

In certain exemplary embodiments, the quantity to be realized of the selected one of the energy services may be set: (1) by the asset 120; (2) by the ASC or ESC 865; or (3) via negotiation of the ASC or ESC 865 and the asset 120 such that the ASC or ESC 865 may then control the respective asset 120 to achieve the set quantity of the selected energy service.

In certain exemplary embodiments, responsive to (or when) the connection event information does not including the GCP 105 identifier, the ASC or ESC 865 may identify a predetermined account that is associated with the respective asset 120 for realizing the energy service during the connection event; and the billing engine 870 may adjust the predetermined account based on the quantity determined by the respective asset 120.

Figure 17:
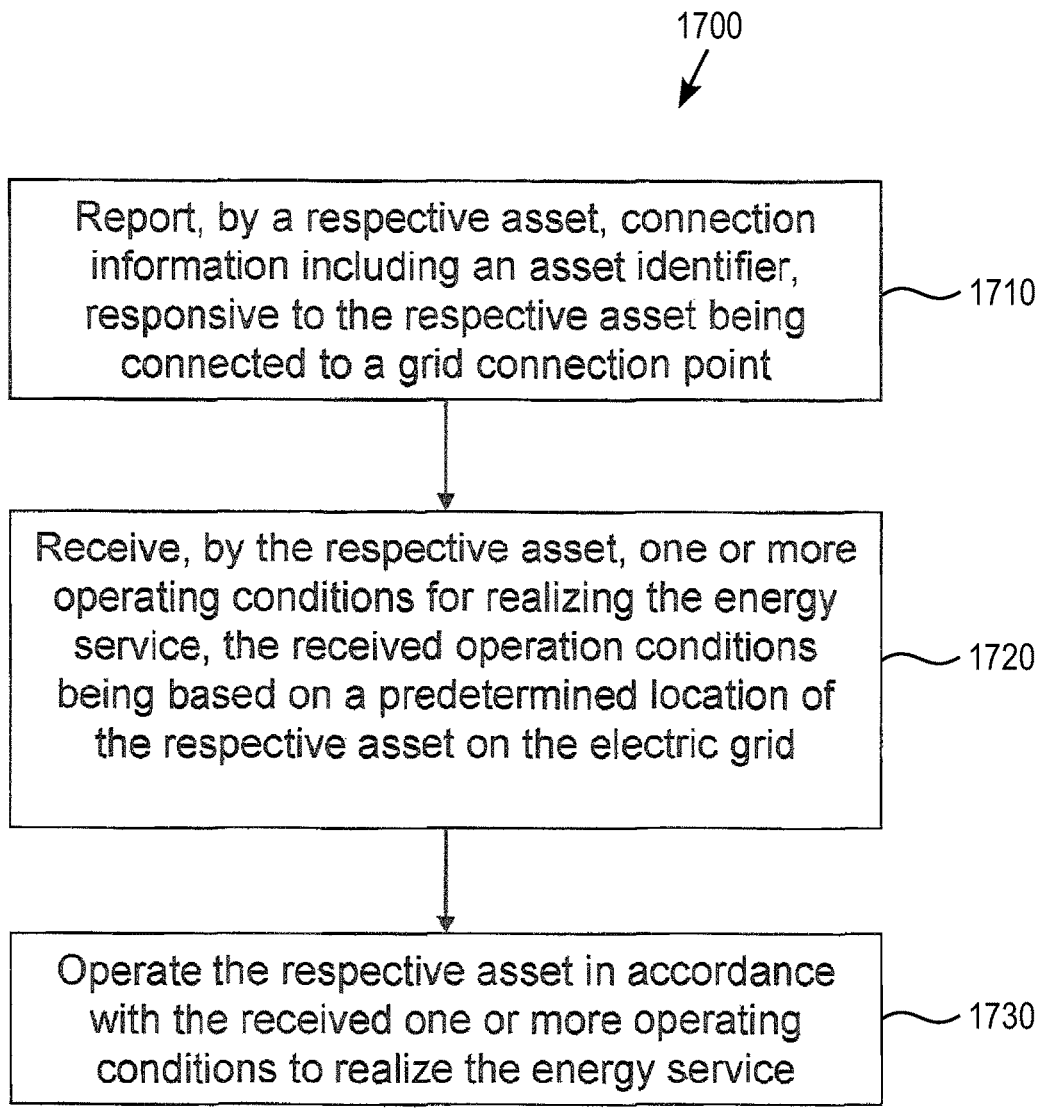
FIG. 17 is a flowchart illustrating a method of managing renewable energy services in accordance with yet other exemplary embodiments.

FIG. 17 is a flowchart illustrating a method 1700 to manage renewable energy services in accordance with yet other exemplary embodiments.

Referring to FIG. 17, the method 1700 may manage energy service for a plurality of the assets 120 of different types connected to GCP 105. In step 1710, the respective asset 120 may report connection information including an asset identifier of the respective asset 120 (responsive to the respective asset 120 being connected to the GCP 105). In step 1720, the respective asset 120 may receive one or more operating conditions for realizing the energy service. The received operating conditions may be based on a predetermined location of the respective asset 120 on the electric grid 150. In step 1730, the respective asset 120 may be operated in accordance with the received one or more operating conditions to realize the energy service.

Figure 18:
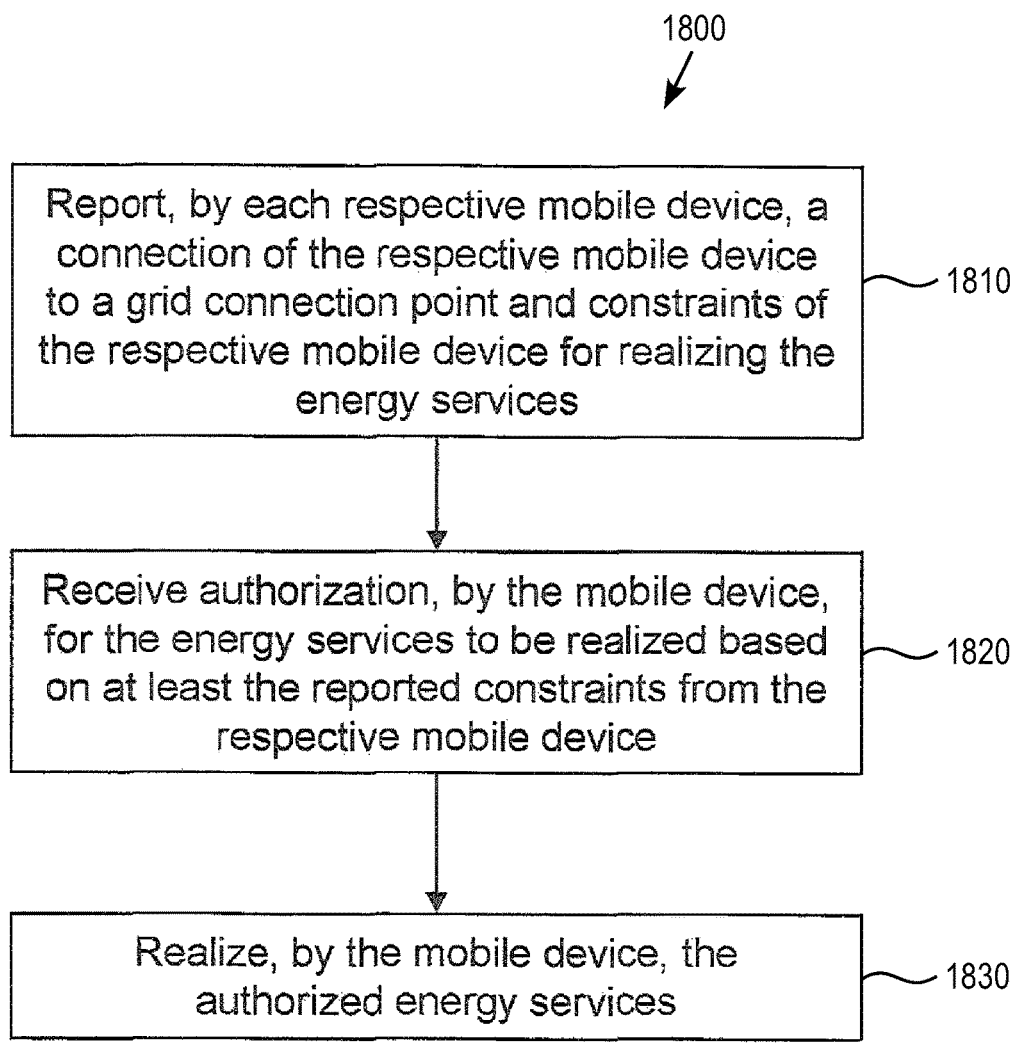
FIG. 18 is a flowchart illustrating a method of managing energy services in accordance with yet additional exemplary embodiments.

FIG. 18 is a flowchart illustrating a method 1800 to manage energy services in accordance with yet additional exemplary embodiments.

Referring to FIG. 18, the method 1800 may manage energy service for a mobile asset 120 connected to the GCP 105 of an electric grid 150. In step 1810, the ASC 865 may receive an identifier associated with the GCP 105 connected to the mobile asset 120. In step 1820, the ASC 865 may determine a location of the mobile asset 120 on the electric grid 150 based on the received identifier. In step 1830, the ASC 865 may determine one or more operating conditions for realizing the energy service in accordance with at least operating constraints associated with the determined location of the mobile asset 120 on the electric grid 150. In step 1840, the ASC 865 may send to the mobile asset 120 the determined one or more operating conditions for realizing the energy service.

Figure 19:
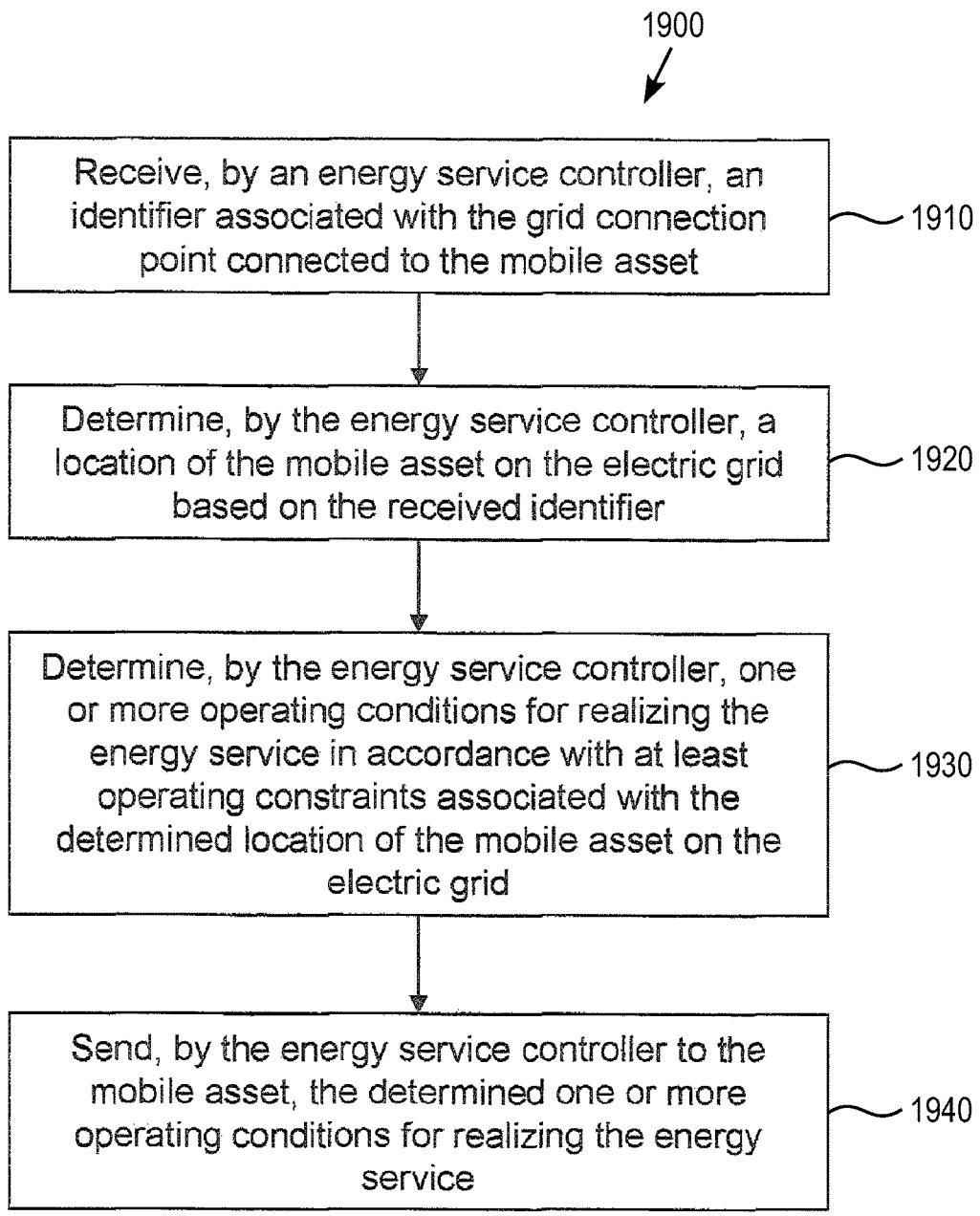
FIG. 19 is a flowchart illustrating a method of managing an electric grid in accordance with other exemplary embodiments.

FIG. 19 is a flowchart illustrating a method 1900 to manage an electric grid in accordance with other exemplary embodiments.

Referring to FIG. 19, the method 1900 may manage the energy services of electric grid 150 having a plurality of MDs 120. The MDs 120 may include an energy storage unit 122 and may be connected to a respective GCP 105 to realize energy services. In step 1910, each respective MD 120 may report a connection of the respective MD 120 to the GCP 105 and constraints of the respective MD 120 for realizing the energy services. In step 1920, the MD 120 may receive authorization for the energy services to be realized based on at least the reported constraints from the respective MD 120. In step 1930, the MD 120 may realize the authorized energy services.

In certain exemplary embodiments, the ASC 865 may determine constraints of the electric grid 150 for realizing the energy services based on the GCP 105 associated with the connection. For example, the ASC 865 may provide authorization to the MD 120. The authorization may include setting the energy services to be realized based on the reported constraints from the MD 120 and the determined constraints determined by the ASC 865.

In certain exemplary embodiments, the MD 120 may permit the realizing of the energy services in response to energy services that satisfy the reported constraints and may block realizing of the energy services in response to energy services that do not satisfy the reported constraints. For example, the authorizing of the energy services to be realized for each respective MD 120 may include modeling, by a modeling unit, behaviors of the plurality of connected MDs 120 and the electric grid 150 to determine the energy services to be realized by each respective, connected MD 120.

Although exemplary embodiments have been described in terms of a mobile device, a mobile asset or a plug-in electric vehicle having an energy storage device, it is contemplated that such assets may not include an energy storage device. In such cases, the mobile asset may adjust current draw from the electric grid to provide energy services to the electric grid.

Although exemplary embodiments have been described in terms of a mobile device, a mobile asset or a plug-in electric vehicle, it is contemplated that other assets, such as fixed assets (e.g., substantially non-movable asset) may be offered energy services. It is also contemplated that a mixture of asset (e.g., fixed and mobile) may be offered such energy services to allow the assets (all of the assets) of a particular entity to be offered energy service regardless of the GCP of the assets.

Figure 20:
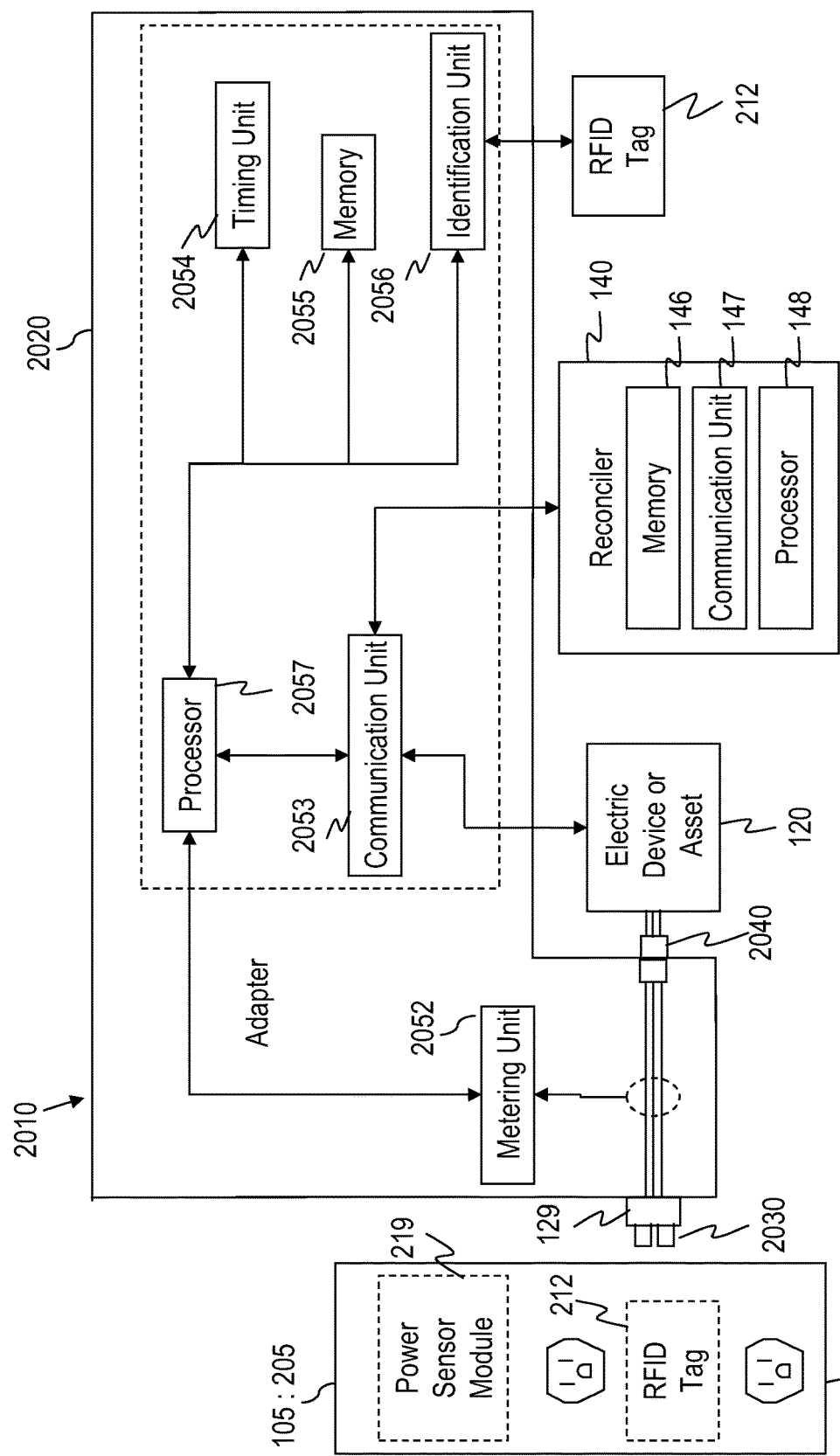
FIG. 20 is a block diagram illustrating a system using the exemplary adapter coupled to an electric device for realizing energy services in accordance with exemplary embodiments.

FIG. 20 is a block diagram illustrating a system using the exemplary adapter in accordance with exemplary embodiments.

Referring to FIG. 20, the adapter 2010 may include: (1) an adapter housing 2020; (2) an electric grid connector 2030 for selectively coupling to or decoupling from the electric grid 150 via the electric outlet or the GCP 105; (3) an electric device connector 2040 for selectively coupling to or decoupling from the electric device 120 (or electric asset including, for example, fixed or mobile asset types); and (4) embedded circuitry 2050 including a processing unit 2060 and a metering unit 2052. The processing unit 2060 may include, a communication unit 2053, a timing unit 2054, memory 2055, and an identification unit 2056 and a processor 2057. In an embodiment, the electric grid connector 2030 comprises RFID reader 129. The electric grid connector 2030 and the electric device connector 2040 may be directly connected to form a feed through connection therebetween. For example, the adapter 2010 may be disposed intermediate to the GCP 105 and the electric device 120 and may include the electric grid connector 2030 (e.g., a first matting connector) configured to selectively, electrically couple to the GCP 105 and the electric device connector 2040 (e.g., a second matting connector) electrically coupled to the first matting connector. The second matting connector may be configured to selectively, electrically couple to the electric device 120. The embedded circuitry 2050 may be an integrated circuit or may include a plurality of interconnected circuits.

The processor 2057 may control operations of the adapter 2010. For example, the processor may control monitoring, by the metering unit 2052, of the energy services realized (e.g., the power consumption or supply of power by the electric device 120). The processor may be connected (or coupled) to the other units, such as the metering unit 2052, the communication unit 2053, the timing unit 2054, the memory 2055, and the identification unit 2056) separately for control and communications of these units.

Although the processor 2057 is shown separately coupled to the metering unit 2052, the communication unit 2053, the timing unit 2054, the memory 2055, and the identification unit 2056, it is contemplated that alternatively a shared communication bus may be used.

In certain exemplary embodiments, the processor 2057 may communicate (e.g., bi-directional communications) externally with other device (e.g., the reconciler 140, ESC 865 and/or the electric device 120) via the communication unit 2053. For example, the processor may communicate with the electric device 120 to receive operating constraints and/or operating information (e.g., any operating constraints, operational parameters or other operational information, among others) of the electric device 120 such as: (1) state-of-charge constraints; (2) charging current constraints; (3) voltage constraints; (4) temperature constraints; (5) present state-of-charge; (6) present voltage; and/or (7) present thermal reading, among others. The communication unit 2053 may receive the operating constraints or operating information of the electric device 120 in a first communication protocol of (e.g., recognized and used by) the electric device 120 and may either relay (e.g. directly report without processor 2057 intervention) the operating constraints and/or operating information of the electric device 120 to the reconciler 140 (e.g., when the communication protocol of the reconciler 140 is the same as the first communication protocol of the electric device 120) or may translate (e.g., convert) the operating constraints and/or operating information of the electric device 120 into a second communication protocol of the reconciler 140 (e.g., when the communication protocol of the reconciler 140 is not the same as the communication protocol of the electric device 120). In this way, the adapter 2010 may provide a communication protocol conversion to enable electric devices 120 of a particular communication protocol to communicate with reconcilers 140 of new or different communication protocols.

In response to the reports of the operating constraints (and/or operating information) by the communication unit 2053 from the adapter 2010, the reconciler 140 or the ESC 865 may send to the communication unit 2053 of the adapter 2010 an energy service signal indicating one or more operating points (e.g., set points or operating conditions) for operation of the electric device 120. The communication unit 2053 may communicate the indicated one or more operating set points to the electric device 120 via the communication protocol of the electric device 120. The energy service signal may be updated based on an anticipated energy service level of the electric device 120. The communication unit 2053 may communicate the updated or adjusted one or more operating set points to the electric device 120.

In certain exemplary embodiments, the anticipated energy service level may be determined by the reconciler 140 or the ESC 865 based on at least the reported quantity of the energy service realized by the electric device 120 and the reported operating constraints of the electric device 120. The anticipated energy service level may be further determined based on reported quantity of the energy service anticipated for the electric grid 150 and/or reported operating constraints of the electric grid 150.

In response to or after receiving the reported electric device information (e.g., the quantity of the energy service realized by the electric device 120 and/or the operating constraints (e.g., including current, voltage and/or thermal constraints) of the electric device 120), the reconciler 140 or ESC 865, based on the electric device information, may determine and may control power consumption to or supply of power from the electric device 120 and/or a charging or discharging profile of the electric device, for example: (1) to manage (or reduce) the charging time of the ESD 122; (2) to ensure charging or discharging safety of the ESD 122; and/or (3) to maintain the ESD's operational life (e.g., battery life).

The metering unit 2052 may be configured to be disposed in the adapter housing 2020 and may measure: (1) one or more voltages associated with (e.g., between or among) the power conductors of the electric device 120; (2) one or more currents associated with (e.g., flowing through) the power conductors of the electric device 2010.

In certain exemplary embodiments, the metering unit 2052 may include one or more current sensors (such as current transformers (CTs) and/or Hall sensors, among others), one or more voltage sensors (such as potential transformers (PTs) and/or voltage probes, and/or one or more thermal probes, among others.

In certain exemplary embodiments, the voltages and/or the currents may be measured at the power conductors of the electric device 120. In alternative exemplary embodiments, the voltages and/or currents may be measured from the conductors disposed in the adapter 2010 that connects the electric grid connector 2030 and the electric device connector 2040.

The metering unit 2052 may measure a quantity of energy services realized by the electric device 120. For example, in response to a selection of an energy service which charges or discharges the electric device 120, the metering unit 2052 may measure the energy (or power) consumed by the electric device 120 or the energy (or power) supplied to the electric grid 150.

In another example, in response to a selection of an energy service for regulating the electric grid 150, the metering unit may register the charging and/or discharging profile of the electric device 120 and the timing unit 2054 may register the timing of this profile. The metering unit 2052 may send the charging and/or discharging profile (e.g., voltage and current profiles of the electric device 120) to the processor 2057 and the timing unit 2054 may send the timing information associated with the electric device 120 providing the regulation services to the processor 2057. The timing information provided by the timing unit 2054 to the processor 2057 may be matched with the metering information from the metering unit 2053 to generate a timed profile of the energy services realized by the electric device 120. The timed profiles may be stored in the memory 2055 and/or may be reported to the reconciler 140 or ESC 865. The reconciler 140 or ESC 865, after receiving the timed profile of the energy services realized, may determine the appropriate compensation for the electric device 120 based on negotiated contract terms or governmental tariffs.

It is contemplated that other energy services, such as frequency support or VAR support, may be implemented with similar timed profiles and that the metering unit 2052 is configured to provide the appropriate measurements, which are subsequently reported as timed profiles to the reconciler 140 or the ESC 865.

The memory 2055 may be coupled to processor 2057. The memory 2055 may store program code to execute the functionality of the adapter 2010 and may store or cache connection event information and/or timed profile information to enable communication of the information with the reconciler 140 or ESC 865.

In certain exemplary embodiments, the metering unit 2053 may measure power (KWh) drawn by the electric device 120. The memory 2055 may store, for example, meter readings (e.g., or other measurements) associated with the initiation and/or end of each charging session to determine the power consumed (stored) during the charging session. For example, the processor 2057 may read the metering unit 2052 at the end of each charging session and may store the readings in the memory 2055. The processor 2057 may store the meter reading with timing information from the timing unit 2056 to indicate the beginning and/or ending of the connection event period. For example, the timing unit 2054 may provide or determine a time, a time range and/or date of a connection event and may send the time, the time range and/or date to be stored in the memory 2055. The memory may store the timing information together with the connection event information. Responsive to the end of a connection event session (e.g., a charging or discharging session), the processor 2057 may send the connection event information including the RFID tag identification information, and the timing information to the reconciler 140 or ESC 865 via the communication unit 2053.

The identification unit 2056 may function summarily to (or the same as) an RFID or barcode reader (e.g., RFID reader 129 or 270) to identify the GCP 105 via the identification tag 119 or 212. For example, the identification unit 2056 may detect (e.g., or read) the identification tag information or identifier associated with the GCP 105 electrically connected or coupled to the electric device 120 and may send the identification tag information or identifier to be stored in the memory 2055. The information associated with each connection event may be stored together as respective records of connection event information. In an embodiment, the GCP 105 may also include an RFID reader 270 and a power sensor module 219.

Although the adapter is described as including separate interconnected operational units, it is contemplated that the processor, the timing unit, the metering unit and the communication unit may have other configurations including configurations in which some or all of these units are integrated together. For example, the communication unit 2053 may be coupled directly or indirectly to (or may be integrated in a single unit with) at least the identification unit 2056 and the metering unit 2052.

In certain exemplary embodiments, the processor 2057 may receive: (1) an offer of energy services to be realized by the electric device 120 from the reconciler 140 or ESC 865 and (2) one or more operating constraints (or operating information including operational parameters and anticipated settings or usage) from the electric device 120. The processor 2057 may select one of the offered energy services, as the selected energy service to be realized by the electric device 120 based on the received one or more operating constraints received from the device. For example, the adapter may select the energy service based on one or more weighted factors including: (1) the anticipated profit margin for the realized electric service; (2) the anticipated or historical usage of the electric device 120 by the owner or user of the electric device 120, (3) the safety parameters specified for the electric device 120; (4) the anticipated incremental maintenance of the electric device 120 associated with the realized electric service and/or the anticipated capability of the electric device 120 (e.g., based on the energy capacity of the ESD 122) after the energy service is realized. The weighting factors may be predetermined based on user preferences, preset, or user selectable based on responses from inquires to a user interface such as the user interface of the smartphone 815 or MD controller 825.

The processor 2057 may determine the selected energy service and may notify using the communication unit 2053 the reconciler 140 or the ESC 865 of the selected energy service. In other exemplary embodiments, the selection of energy service may be determined by the reconciler 140 or ESC 865 based on: (1) the one or more operating constraints provided by the adapter; (2) usage profiles of the electric device 120 stored in the adapter 2053; and/or stored information of the reconciler 140 or the ESC 865 such as electric service rates and anticipated quantities for each electric service offered.

In certain exemplary embodiments, in response to the processor 2057 reporting the quantity of energy services realized by the electric device 120 during the connection event, the reconciler 140, the ASC 865 or the billing engine 870 may adjust and may bill an adjustment of a fixed account 894 associated with an identifier of the GCP 105 (when the electric device 120 is of a mobile type) or may adjust and may bill another account 894 (e.g., a predetermined fixed account associated with the electric device 120 (when the electric device 120 is of a fixed type)).

In certain exemplary embodiments, in response to the processor 2057 reporting the quantity of energy services realized by the electric device 120 during the connection event, the memory 2055 may store the quantity or quantities of energy services realized for a particular electric device 120. The reconciler 140, the ASC 865 and/or the billing engine 870 may adjust and may bill an adjustment of the fixed account 894 associated with an identifier of the GCP 105 (when the electric device 120 is of a mobile type) or may adjust and may bill another account 894 (e.g., a predetermined fixed account associated with the electric device 120 (when the electric device 120 is of a fixed type)).

Figure 21:
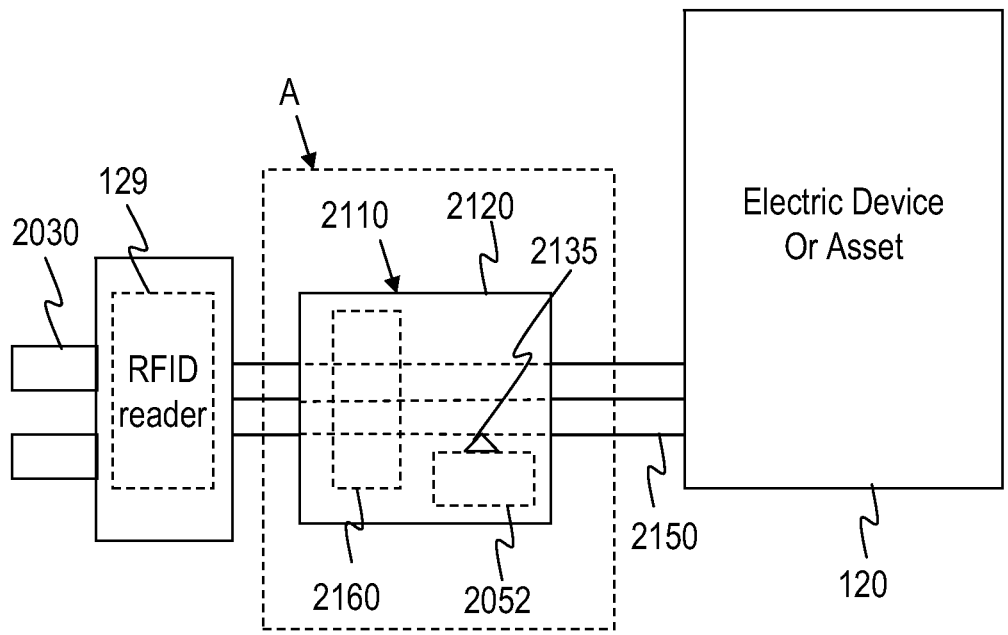
FIG. 21 is a schematic diagram illustrating an exemplary adapter coupled to an electric device for realizing energy services in accordance with other exemplary embodiments.
Figure 22:
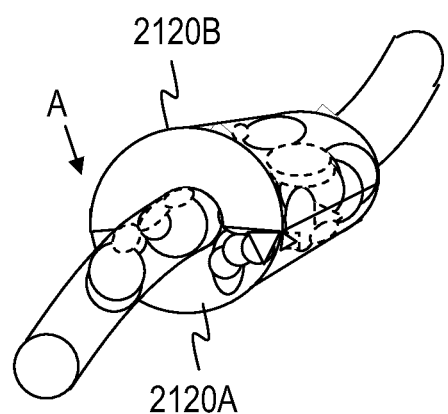
FIG. 22 is a plan view illustrating the other exemplary adapter of FIG. 20.

FIG. 21 is a schematic diagram illustrating an exemplary adapter 2110 coupled to an electric device 120 for realizing energy services in accordance with other exemplary embodiments. FIG. 22 is a partial view of region A of FIG. 21 illustrating the exemplary adapter 2110.

Referring to FIGS. 21 and 22, the adapter 2160 may include a housing 2120, the processor 2057, the communication unit 2053, the timing unit 2054, the identification unit 2056, and the metering unit 2052 (e.g., the detection unit). As shown in FIG. 21, electric grid connector 2030 may include the RFID reader 129. The operation of the units in adapter 2110 are the same as those of adapter 2010 except that adapter 2010 is configured to be intermediate (e.g., in series) between the electric device 120 and the GCP 105 or 205 and adapter 2110 is configured to be disposed around the power conductors 2150 of the electric device 120. For example, the housing 2120 may be configured to be coupled to and to surround power conductors 2150 of the electric device 120 (e.g., the MD or the electric asset). The metering unit 2052 may be disposed in the adapter housing 2120 to detection currents and voltages associated with the power conductors 2150.

In certain exemplary embodiments, the housing 2120 may house the metering unit 2052 and in other exemplary embodiments, the housing 2120 may house the metering unit 2052, and the processing unit 2060.

The adapter housing 2120 may have a first portion 2120A and a second portion 2120B. The first portion 2120A may move relative to the second portion 2120B when opened and the first portion 2120A may be fixed relative to the second portion 2120B to define a through opening for the power conductors 2150 when closed. The power conductors 2150 of the electric device 120 may selectively couple to and may extend through the adapter housing 2120 when the adapter housing 2120 is closed. For example, the adapter 2110 may be coupled to the electric device 120 by moving (e.g., rotating or sliding within a groove) the first portion 2120A relative to the second portion 2120B of the adapter housing 2120 when the adapter housing is opened to surround power conductors 2150 of the device extending through the adapter when the adapter housing 2120 is closed.

The metering unit 2052 may include conductor contactors 2135 electrically connecting the power conductors 2150 to detect a voltage level associated with one or more of the power conductors 2150 of the electric device 120 and one or more current sensors to sense current flow in the power conductors 2150 when the power conductors 2150 extend through the adapter 2110 and the adapter housing 2120 is closed.

The adapter 2110 may attach to the power conductors 2150 (e.g., a power cord or power cable) such that the adapter 2110 may be configured to be movable together with the electric device 120.

In various exemplary embodiments, the adapters 2010 and 2110 may, respectively, measure using the metering unit 2502 a quantity of energy services realized by the electric device 120 may communicate using the communication unit to the ESC 865 quantity information of the energy services actually realized by the electric device 120; and may send using the communication unit to the electric device 120, received updated operating set points for the electric device 120 that are updated by the ESC 865 based on at least the communicated quantity information. The updated operating set points may be updated based on the communicated quantity information and operating constraints of an electric grid coupled to the electric device 120.

Although the metering unit 2052 is illustrated as separate from the processing unit 2060, it is contemplated that the metering unit 2052 may be integrated with the processing unit 2060.

In other exemplary embodiments, a load switch (not shown) may be disposed in series with the electric grid connector 2030 and the electric device connector 2040 to enable cutoff of the electric device or asset 120 via the adapter 2010.

Figure 23:
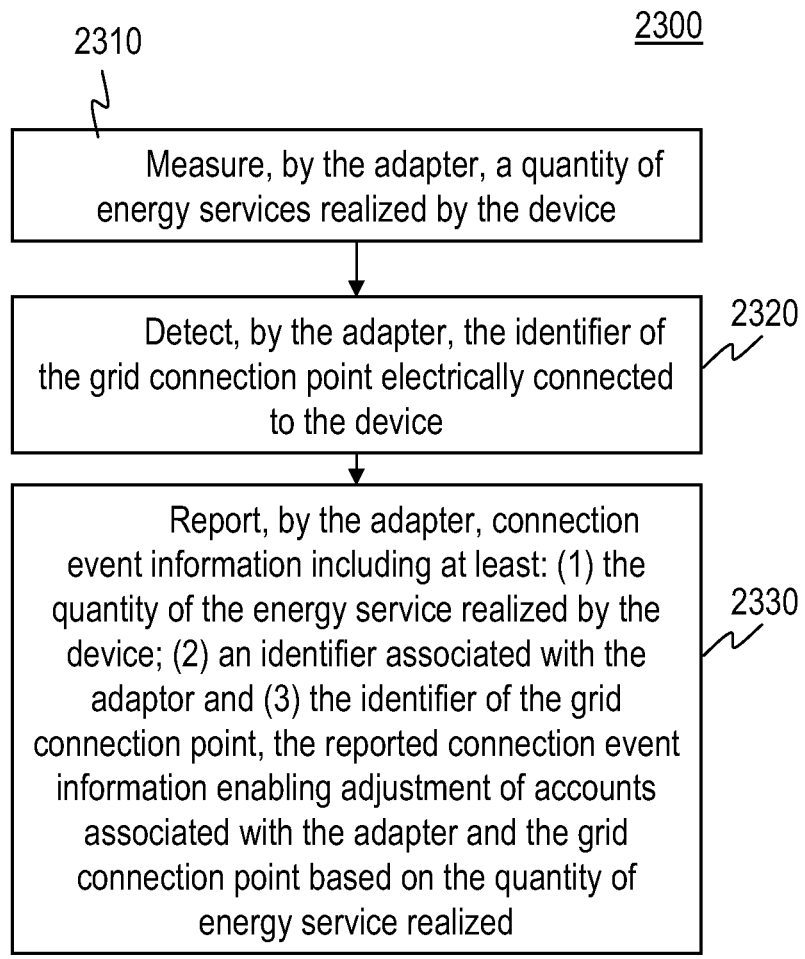
FIG. 23 is a flowchart illustrating a method of managing energy services using an adapter in accordance with exemplary embodiments.

FIG. 23 is a flowchart illustrating a method 2300 of managing energy services using an exemplary adapter 2010 or 2110 in accordance with exemplary embodiments.

Referring to FIG. 23, in step 2310, the method 2300 may manage energy services for the electric device 120 via the GCP 105 using the adapter 2010 or 2110. The GCP 105 may include an identifier. In step 2310, the adapter 2010 or 2110 using the metering unit 2052 may measure a quantity of energy services realized by the electric device 120. In step 2320, the adapter 2010 or 2110 using the identification unit 2056 may detect the identifier (e.g., identification tag information) of the GCP 105 electrically connected to the electric device 120. In step 2330, the adapter 2010 or 2110 may report using the communication unit 2053 connection event information including at least: (1) the quantity of the energy service realized by the electric device 120; (2) an identifier (e.g., stored in memory 2055 of the adapter 2010 or 2110) associated with the adapter 2010 or 2110 and (3) the identifier (e.g., identification tag information) of the GCP 105. The connection event information reported by the adapter 2010 or 2110 enabling adjustment of accounts 894 and 896 associated with the adapter 2010 or 2110 and the GCP 105 based on the quantity of energy service realized.

The adapter 2010 or 2110 may report the connection event information responsive to the electric device 120 completing a connection event.

Figure 24:
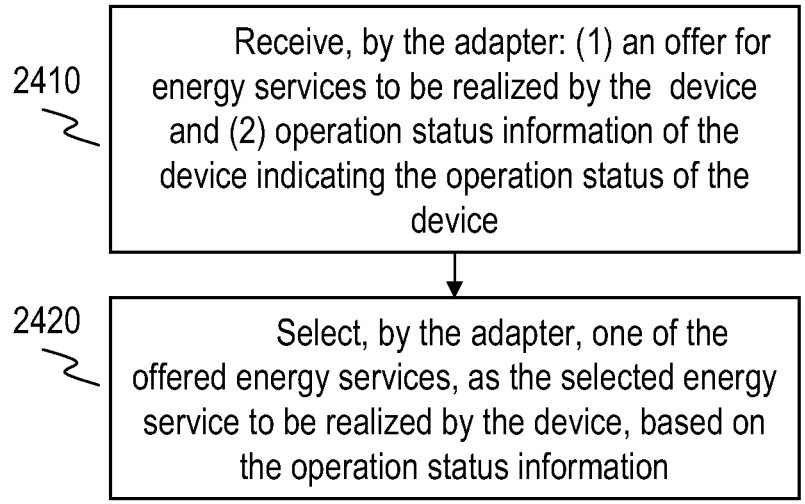
FIG. 24 is a flowchart illustrating a method of managing energy services using an adapter in accordance with other exemplary embodiments.

FIG. 24 is a flowchart illustrating a method 2400 of managing energy services using an exemplary adapter 2010 or 2110 in accordance with other exemplary embodiments.

Referring to FIG. 24, the method 2400 may manage energy services by the mobile device 120 using the adapter 2010 or 2110. In step 2410, the adapter 2010 or 2110 may receive: (1) an offer for energy services to be realized by the mobile device 120 from the ESC 865 using the communication unit 2053; and (2) operation status information of the mobile device 120 indicating the operation status of the mobile device 120 from the mobile device 120 using communication unit 2053. The communication protocols between the adapter 2010 or 2110 and mobile device may be the same protocol as or a different protocol from that of between the adapter 2010 or 2110 and the ESC 865.

In step 2420, the adapter 2010 or 2110 may select one of the offered energy services, as the selected energy service to be realized by the mobile device 120, based on the received operation status information.

Figure 25:
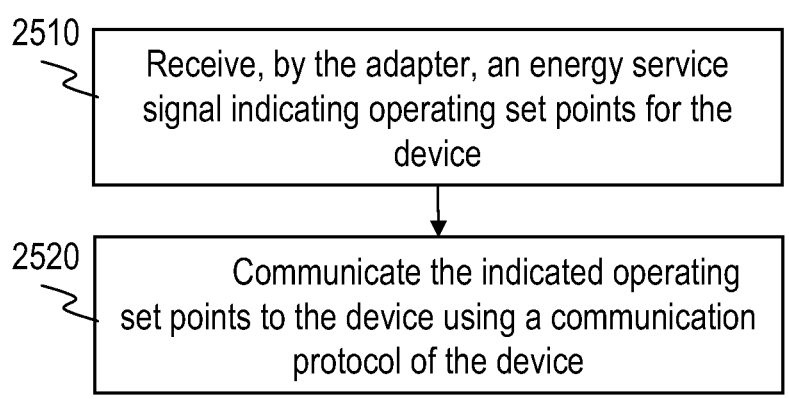
FIG. 25 is a flowchart illustrating a method of managing energy services using an adapter in accordance with further exemplary embodiments.

FIG. 25 is a flowchart illustrating a method 2500 of managing energy services using an exemplary adapter 2010 or 2110 in accordance with other exemplary embodiments.

Referring to FIG. 25, the method 2500 may manage energy services by the mobile device 120 via the GCP 105 using the adapter 2010 or 2110. In step 2510, the adapter 2010 or 2110 may receive using the communication unit 2053 an energy service signal indicating operating set points for the mobile device 120. In step 2520, the adapter 2010 or 2110 may communicate to the mobile device 120 using the communication unit 2053 the indicated operating set points using a communication protocol of the mobile device 120.

In certain exemplary embodiments, the adapter 2010 or 2110 may: (1) measure a quantity of energy services realized by the mobile device 120; (2) communicate to the ESC 865 quantity information of the energy services actually realized by the mobile device 120; and/or (3) send to the mobile device, received updated operating set points for the mobile device 120 that are updated based on at least the communicated quantity information. The updated operating set points may be updated based on the communicated quantity information and operating constraints of the electric grid 150 coupled to the mobile device 120.

Figure 26:
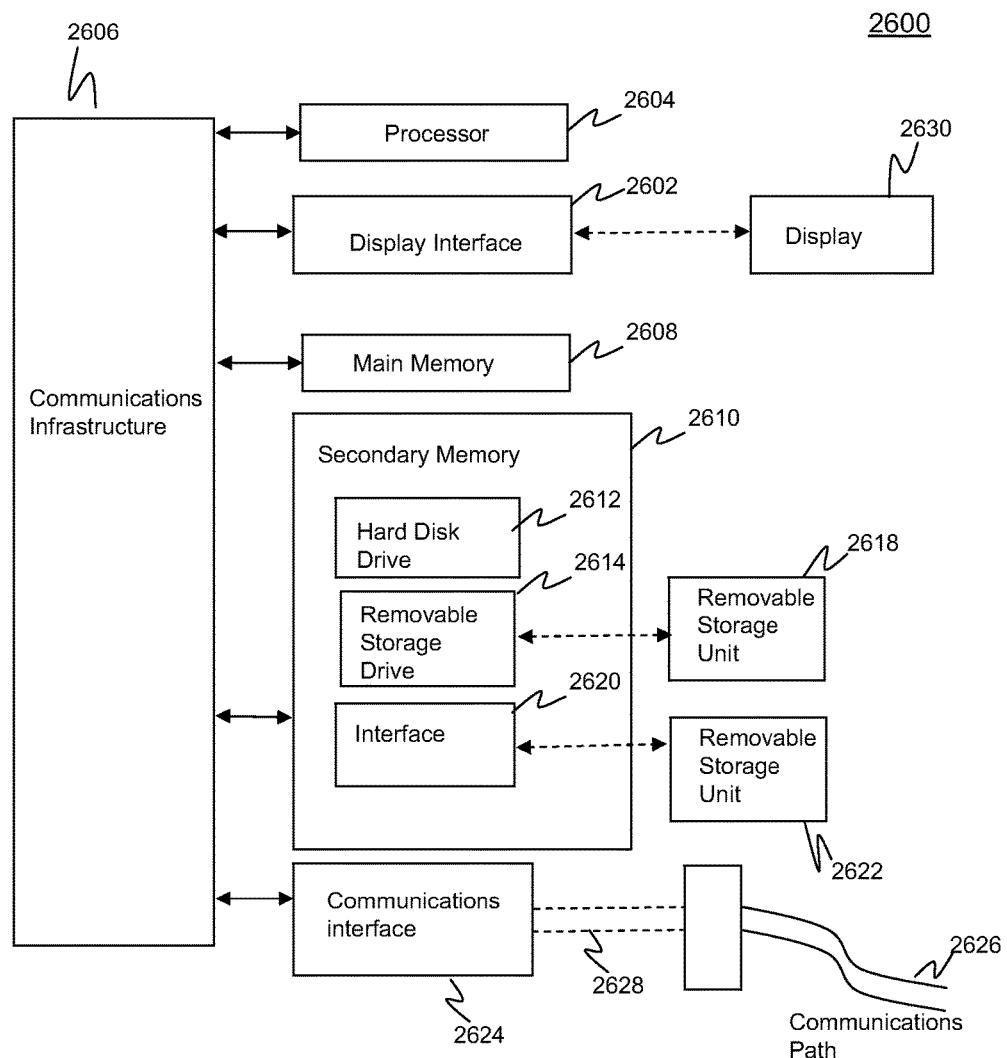
FIG. 26 is a diagram of an example computer system in which embodiments can be implemented.

Although exemplary embodiments have been described in terms of a mobile electric device or a plug-in electric vehicle, it is contemplated that it may be implemented in software on microprocessors/general purpose computers such as the computer system 2600 illustrated in FIG. 26. In various embodiments, one or more of the functions of the various components may be implemented in software that controls a computing device, such as computer system 2600, which is described below with reference to FIG. 26.

Aspects of the present invention shown in FIGS. 1-25, or any part(s) or function(s) thereof, may be implemented using hardware, software modules, firmware, tangible computer readable media having instructions stored thereon, or a combination thereof and may be implemented in one or more computer systems or other processing systems.

FIG. 26 illustrates an example computer system 2600 in which embodiments of the present invention, or portions thereof, may be implemented as computer-readable code. For example, systems 100, 200, 250, 300, 800 and 2010 of FIGS. 1-3, 8 and 20, can be implemented in computer system 2600 using hardware, software, firmware, non-transitory computer readable media having instructions stored thereon, or a combination thereof and may be implemented in one or more computer systems or other processing systems. Hardware, software, or any combination of such may embody any of the modules and components used to implement the systems of FIGS. 1-3, 8 and 20.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 2600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 2604 may be a special purpose or a general purpose processor device. As will be appreciated by persons skilled in the relevant art, processor device 2604 may also be a single processor in a multi-core/multiprocessor system, such system operating alone, or in a cluster of computing devices operating in a cluster or server farm. Processor device 2604 is connected to a communication infrastructure 2606, for example, a bus, message queue, network, or multi-core message-passing scheme.

Computer system 2600 also includes a main memory 2608, for example, random access memory (RAM), and may also include a secondary memory 2610. Secondary memory 2610 may include, for example, a hard disk drive 2612, removable storage drive 2614. Removable storage drive 2614 may comprise a floppy disk drive, a magnetic tape drive, an optical disk drive, a flash memory, or the like.

The removable storage drive 2614 reads from and/or writes to a removable storage unit 2618 in a well known manner. Removable storage unit 2618 may comprise a floppy disk, magnetic tape, optical disk, etc. which is read by and written to by removable storage drive 2614. As will be appreciated by persons skilled in the relevant art, removable storage unit 2618 includes a non-transitory computer usable storage medium having stored therein computer software and/or data.

In alternative implementations, secondary memory 2610 may include other similar means for allowing computer programs or other instructions to be loaded into computer system 2600. Such means may include, for example, a removable storage unit 2622 and an interface 2620. Examples of such means may include a program cartridge and cartridge interface (such as that found in video game devices), a removable memory chip (such as an EPROM, or PROM) and associated socket, and other removable storage units 2622 and interfaces 2620 which allow software and data to be transferred from the removable storage unit 2622 to computer system 2600. Computer system 2600 may also include a communications interface 2624. Communications interface 2624 allows software and data to be transferred between computer system 2600 and external devices. Communications interface 2624 may include a modem, a network interface (such as an Ethernet card), a communications port, a PCMCIA slot and card, or the like. Software and data transferred via communications interface 2624 may be in the form of signals, which may be electronic, electromagnetic, optical, or other signals capable of being received by communications interface 2624. These signals may be provided to communications interface 2624 via a communications path 2626. Communications path 2626 carries signals and may be implemented using wire or cable, fiber optics, a phone line, a cellular phone link, an RF link or other communications channels.

In this document, the terms "computer program medium," "non-transitory computer readable medium," and "computer usable medium" are used to generally refer to media such as removable storage unit 2618, removable storage unit 2622, and a hard disk installed in hard disk drive 2612. Signals carried over communications path 2626 can also embody the logic described herein. Computer program medium and computer usable medium can also refer to memories, such as main memory 2608 and secondary memory 2610, which can be memory semiconductors (e.g. DRAMs, etc.). These computer program products are means for providing software to computer system 2600.

Computer programs (also called computer control logic) are stored in main memory 2608 and/or secondary memory 2610. Computer programs may also be received via communications interface 2624. Such computer programs, when executed, enable computer system 2600 to implement the present invention as discussed herein. In particular, the computer programs, when executed, enable processor device 2604 to implement the processes of the present invention, such as the stages in the methods illustrated by the flowcharts 500, 700, 900, 1000, 1100, 1200, 1300, 1400, 1500, 1600, 1700, 1800, 1900, 2300, 2400 and 2500 of FIGS. 5, 7, 9-19 and 23-25, discussed above. Accordingly, such computer programs represent controllers of the computer system 2600. Where the invention is implemented using software, the software may be stored in a computer program product and loaded into computer system 2600 using removable storage drive 2614, interface 2620, and hard disk drive 2612, or communications interface 2624.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way. Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of managing at least one renewable energy source for supply of power via an electric grid, comprising:
    registering one or more selections of service offerings provided by the at least one renewable energy source selected by customers associated with respective mobile devices;
    supplying power to the mobile devices from the at least one renewable energy source, via the electric grid, in accordance with the registered customer selections;
    continuously monitoring, by a control processor, power supplied from the at least one renewable energy source based on telemetry information from a renewable resource telemetry device;
    determining, by the control processor, aggregated power realized by the mobile devices based on telemetry information received by the control processor from telemetry devices associated with each of the mobile devices; and
    offsetting power output changes from the at least one renewable energy source with the aggregated power realized by the mobile devices by controlling, with the control processor, current operating conditions of the mobile devices so that the aggregate power realized by the mobile devices follows or substantially follows the power supplied from the at least one renewable energy source measured from the renewable resource telemetry device,
    wherein the current operating conditions include operating points of the mobile devices and controlling the operating condition includes adjusting in aggregate the operating points of the mobile devices;
    wherein for each respective mobile device used for balancing of the power:
        determining, by a processor, an operating condition for the respective mobile device in accordance with the measured power of the at least one renewable energy source, wherein the operating condition is an operating point of the respective mobile device,
        sending, by the processor, the determined operating condition to the respective mobile device, and
        adjusting a current operating point of the respective mobile device to the determined operating condition.

2. The method of claim 1, wherein the offsetting of the power output changes from the at least one renewable energy source by the power realized by the mobile devices is controlled such that each of the mobile devices is controlled by:
    reducing power consumption from the electric grid;
    increasing the power consumption from the electric grid;
    reducing power supplied to the electric grid; or
    increasing the power supplied to the electric grid.

3. The method of claim 2, further comprising:
    modeling, by the control processor, the supply of power realizable by each respective mobile device based on operating constraints of the electric grid and of the respective mobile device.

4. The method of claim 3, wherein in response to the power output changes from the at least one renewable energy source decreasing:
    selecting one or ones of the mobile devices that do not have the operating constraints to prevent a reduction of the power consumption by the respective mobile device from the electric grid; or an increase of the power supplied by the respective mobile device to the electric grid; and
    controlling, by the processor, an adjustment of the power realized by the selected one or ones of the mobile devices to offset the decreasing power output from the at least one renewable energy source.

5. The method of claim 4, further comprising:
    determining, for each respective mobile device that is selected, the adjustment of the power realized based on the operating constraints of the respective, selected mobile device and the operating constraints of the electric grid.

6. The method of claim 3, wherein in response to the power output changes from the at least one renewable energy source increasing:
    selecting one or ones of the mobile devices that do not have the operating constraints to prevent an increase of the power consumption by the respective mobile device from the electric grid; or a reduction of the power supplied by the mobile device to the electric grid;
    controlling, by the processor, an adjustment of the power realized by the selected one or ones of the mobile devices to offset the increasing power output from the at least one renewable energy source; and
    determining, for each respective mobile device that is selected, the adjustment of the power realized based on the operating constraints of the respective, selected mobile device and the operating constraints of the electric grid.

7. The method of claim 1, wherein:
    the determining, the sending and the adjusting are repeated based on the measured power from the at least one renewable energy source such that aggregate power realized by the mobile devices substantially follows generation from the at least one renewable energy source.

8. The method of claim 1, wherein the determining of the operating condition for each respective mobile device includes selecting, by the processor, a current operating condition of the respective mobile device such that at least operating constraints of the electric grid and the respective mobile device are not exceeded.

9. The method of claim 1, wherein the balancing of the power realized by the mobile devices with the supply of power from the at least one renewable energy source includes:
modeling, by the processor, the supply of power realizable by the respective mobile device based on operating constraints of the electric grid and the operating constraints of the respective mobile device, as a model result;
aggregating, by the processor, the model result for each respective mobile device, as an aggregated model result; and
comparing, by the processor, the aggregated model result to the measured output to determine an adjustment of the power realized by each respective mobile device.

10. The method of claim 9, wherein the determining of the operating condition for the respective mobile device includes selecting, by the processor, a current operating condition of the respective mobile device based on operating constraints of the electric grid and each of the mobile devices and the comparison of the aggregated model result with the measured output of the at least one renewable energy source.

11. The method of claim 1, wherein the at least one renewable energy source includes one or more of:
a wind generator;
a hydroelectric generator;
a geothermal generator;
a wave generator;
a current generator;
a photovoltaic generator; or
a solar thermal generator.

12. The method of claim 1, wherein:
the electric grid includes one or more energy storage units; and
balancing of the power realized by the mobile devices with the supply of power from the at least one renewable energy source is based on the power output by the renewable source including power consumed or supplied by the one or more energy storage units.

13. The method of claim 1, wherein the power realized by the mobile devices includes one or more of:
the power consumed by the mobile devices; or
the power supplied by the mobile devices.

14. The method of claim 1, wherein the mobile devices include one or more of:
a plug-in electric vehicle;
a mobile computing device;
a personal digital assistant;
portable consumer equipment;
a portable power tool; or
a game system.

15. The method of claim 1, wherein the telemetry information from the renewable resource telemetry device is real-time telemetry information, and the telemetry information from the telemetry devices associated with each of the mobile devices is real-time telemetry information.

16. The method of claim 1, further comprising:
receiving, by an aggregated telemetry database, connection event information of a mobile device to a grid connection point;
aggregating, by the aggregated telemetry database, the connection information of the mobile device; and
sending, by the aggregated telemetry database, the aggregated connection information to the control processor for billing purposes.

17. A control processor for managing at least one renewable energy source for supply of power via an electric grid, comprising:
the control processor configured to:
receive one or more selections of service offerings provided by the at least one renewable energy source from customers associated with respective mobile devices;
continuously monitor power from the at least one renewable energy source based on telemetry information from a renewable resource telemetry device;
determine aggregated power realized by the mobile devices based on telemetry information received by the control processor from telemetry devices associated with each of the mobile devices;
send signals to mobile devices electrically connected to the electric grid to offset power output changes from the at least one renewable energy source with the aggregated power realized by the mobile devices and control current operating conditions of the mobile devices so that the aggregate power realized by the mobile devices during consumption or supply follows or substantially follows the power supplied from the at least one renewable energy source measured from the renewable resource telemetry device, wherein the current operating conditions include operating points of the mobile devices and controlling the operating condition includes adjusting in aggregate the operating points of the mobile devices;
receive measurements of the power supplied from the at least one renewable energy source; and
for each respective mobile device used to balance the power on the electric grid, determine an operating condition for the respective mobile device in accordance with the measured power of the at least one renewable energy source and send the determined operating condition to the respective mobile device.

18. The control processor of claim 17, wherein the control processor signals to the mobile devices to adjust the power realized by the mobile devices to:
reduce power consumption from the electric grid;
increase the power consumption from the electric grid;
reduce power supply to the electric grid; or
increase the power supplied to the electric grid.

19. The control processor of claim 17, wherein the processor is further configured to:
continuously signal the mobile devices such that the power realized by the mobile devices substantially follows the supply of the power from the at least one renewable energy source; and
model the supply of power realizable by each respective mobile device based on operating constraints of the electric grid and operating constraints of the respective mobile device, as model results, aggregates the model results for the mobile devices, as an aggregated model result, and compares the aggregated model result to the monitored power from the at least one renewable energy source to determine an adjustment of the power realized by the mobile devices.

20. A method of managing renewable energy services for plug in-vehicles, comprising:
identifying a fixed account that is associated with a grid connection point used by at least one plug-in electric vehicle for realizing power during a connection event;

determining, by the at least one plug-in electric vehicle, a quantity of the energy realized during the connection event;

adjusting the identified fixed account based on the energy realized by the at least one plug-in electric vehicle during the connection event;

registering the at least one plug-in electric vehicle and one or more selections of service offerings provided by a renewable energy source selected by a customer associated with the at least one respective plug-in electric vehicle, to a renewable energy account;

realizing energy by the at least one plug-in electric vehicle at a plurality of grid connection points associated with respectively different fixed accounts, as a plurality of connection events, in accordance with the registered customer selections;

offsetting power output changes from the selected renewable energy source with the power realized by the at least one plug-in electric vehicle by controlling, with a control processor, a current operating condition of the at least one plug-in electric vehicle so that the power realized by the at least one plug-in electric vehicle measured by an associated telemetry device during consumption or supply follows or substantially follows the power supplied from the selected renewable energy source measured by a renewable resource telemetry device, wherein the current operating condition is an operating point of the at least one plug-in electric vehicle and controlling the operating condition includes adjusting the operating point of the at least one plug-in electric vehicle;

receiving measurements of the power supplied from the renewable energy source;

determining an operating condition for the at least one plug-in electric vehicle in accordance with the measured power of the renewable energy source and sending the determined operating condition to the at least one plug-in electric vehicle;

aggregating, by the control processor, the energy realized by the plug-in electric vehicle during the connection events; and billing, the renewable energy account based on the aggregated energy realized.

21. A method of identifying a grid connection point for utility bill processing of a charging event associated with a renewable energy source for supply of power via an electric grid, comprising:

establishing an identity tag at the grid connection point that uniquely identifies the grid connection point;

receiving, at a mobile charging device, identity tag information to uniquely identify the grid connection point;

registering one or more selections of service offerings provided by the renewable energy source from a customer associated with the respective mobile charging device;

monitoring, by the mobile charging device, charge event information indicating attributes of the charging event;

offsetting power output changes from the renewable energy source with the power realized by the mobile charging device by controlling, with a control processor, a current operating condition of the mobile charging device so that the power realized by the mobile charging device measured by an associated telemetry device during consumption or supply follows or substantially follows the power supplied from the renewable energy source measured by a renewable resource telemetry device, wherein the current operating condition is an operating point of the mobile charging device and controlling the operating condition includes adjusting the operating point of the mobile charging device;

receiving measurements of the power supplied from the renewable energy source;

determining an operating condition for the mobile charging device in accordance with the measured power of the renewable energy source and signaling the determined operating condition to the mobile charging device;

associating, by the mobile charging device, the charge event information with the identity tag information, as associated information, in accordance with the registered customer selections; and sending, by the mobile charging device, the associated information for reconciliation of utility billing accounts associated with the grid connection point and the mobile charging device.

* * * * *